United States Patent
Le et al.

(10) Patent No.: US 10,392,114 B2
(45) Date of Patent: Aug. 27, 2019

(54) AIRCRAFT SEATING ASSEMBLY

(71) Applicant: Encore Seats, Inc., Huntington Beach, CA (US)

(72) Inventors: Gary Tien Le, San Dimas, CA (US); Wade Franklin DeLaney, Costa Mesa, CA (US); Elijah Dobrusin, Long Beach, CA (US); Aram Aris Krikorian, Ladera Ranch, CA (US); Thomas Zachary Lloyd, London (GB); Luke Neil Pearson, London (GB); Nicholas Stanley Borg Carpenter, London (GB); Matthew Vu Hoang, Westminster, CA (US); Thomas Rodolph Eaton, Echo Park, CA (US)

(73) Assignee: ENCORE SEATS, INC., Aliso Viejo, CA (US)

( * ) Notice: Subject to any disclaimer, the term of this patent is extended or adjusted under 35 U.S.C. 154(b) by 0 days.

(21) Appl. No.: 15/692,243

(22) Filed: Aug. 31, 2017

(65) Prior Publication Data

US 2018/0079509 A1 Mar. 22, 2018

Related U.S. Application Data

(63) Continuation of application No. 15/089,366, filed on Apr. 1, 2016, now Pat. No. 9,764,844.
(Continued)

(51) Int. Cl.
*B64D 11/00* (2006.01)
*B64D 11/06* (2006.01)

(52) U.S. Cl.
CPC .......... *B64D 11/0639* (2014.12); *B64D 11/06* (2013.01); *B64D 11/0624* (2014.12);
(Continued)

(58) Field of Classification Search
CPC . B64D 11/06; B64D 11/0624; B64D 11/0639; B64D 11/0647; B64D 11/0648; B64D 11/0649
(Continued)

(56) References Cited

U.S. PATENT DOCUMENTS

| 345,710 A | 7/1886 | Mason |
|---|---|---|
| 2,223,532 A | 12/1940 | Sallop |

(Continued)

FOREIGN PATENT DOCUMENTS

| DE | 3 433 589 | 3/1986 |
|---|---|---|
| DE | 100 29 624 | 1/2002 |

(Continued)

OTHER PUBLICATIONS

International Search Report and Written Opinion in co-pending Patent Application No. PCT/US2014/033071, dated Jul. 28, 2014, in 11 pages.
(Continued)

*Primary Examiner* — Rodney B White
(74) *Attorney, Agent, or Firm* — Knobbe, Martens, Olson & Bear, LLP

(57) ABSTRACT

Components and systems of an aircraft seating assembly are disclosed. The aircraft seating assembly can include a seat pan, a connection frame, and one or more mounts for removably coupling the seat pan to the connection frame. The aircraft seating assembly can include a back support having a removably coupled cushioning member. The aircraft seating assembly can include a tilt system which can allow the back support to articulate relative to the connection frame. The aircraft seating assembly can include a retention system coupled to the back support, the retention system can retain an object in place when in a closed configuration.

19 Claims, 39 Drawing Sheets

Related U.S. Application Data

(60) Provisional application No. 62/146,925, filed on Apr. 13, 2015, provisional application No. 62/146,932, filed on Apr. 13, 2015.

(52) U.S. Cl.
CPC ...... *B64D 11/0647* (2014.12); *B64D 11/0648* (2014.12); *B64D 11/0649* (2014.12)

(58) Field of Classification Search
USPC ........................................ 297/188.04, 188.07
See application file for complete search history.

(56) References Cited

U.S. PATENT DOCUMENTS

| | | | |
|---|---|---|---|
| 2,507,842 A | 10/1947 | Waddill | |
| 2,619,395 A | 11/1952 | Kent | |
| 2,767,895 A | 3/1955 | Smith | |
| D180,710 S | 7/1957 | De Gludice | |
| 3,049,374 A | 8/1962 | Nance | |
| 3,088,771 A | 5/1963 | Weigle | |
| D198,498 S | 6/1964 | Malitte | |
| D198,783 S | 8/1964 | Barecki | |
| 3,333,890 A | 8/1967 | Whitman | |
| 3,393,941 A | 7/1968 | Grosfillex | |
| 3,533,178 A | 10/1970 | Strohmaier | |
| 3,615,118 A | 10/1971 | Buxton | |
| 3,653,713 A | 4/1972 | Reason et al. | |
| 3,785,600 A * | 1/1974 | Padovano | B64D 11/06 248/188.1 |
| 3,795,422 A | 3/1974 | Robinson et al. | |
| D239,148 S | 3/1976 | Smith et al. | |
| 4,004,836 A | 1/1977 | Kristensson | |
| 4,097,088 A | 6/1978 | Meiller | |
| D250,071 S | 10/1978 | Dickerson | |
| 4,184,276 A | 1/1980 | Hernandez | |
| 4,229,040 A * | 10/1980 | Howell | B64D 11/0648 297/440.1 |
| D257,707 S | 12/1980 | Marrujo | |
| 4,307,913 A | 12/1981 | Spiegelhoff | |
| D267,372 S | 12/1982 | Long et al. | |
| D268,972 S | 5/1983 | White | |
| 4,460,215 A | 7/1984 | Chamberlain et al. | |
| 4,466,659 A | 8/1984 | Carpentier et al. | |
| 4,489,978 A * | 12/1984 | Brennan | B60N 2/242 244/118.6 |
| 4,511,178 A * | 4/1985 | Brennan | B64D 11/0638 297/440.1 |
| 4,526,421 A | 7/1985 | Brennan et al. | |
| 4,681,369 A | 7/1987 | Simpson | |
| 4,718,719 A * | 1/1988 | Brennan | B64D 11/06 244/122 R |
| 4,723,732 A | 2/1988 | Gorges | |
| 4,726,621 A | 2/1988 | Muller | |
| 4,757,928 A | 7/1988 | Browne | |
| 4,836,602 A | 6/1989 | D'Almada Remedios et al. | |
| 4,861,103 A * | 8/1989 | Vallee | B64D 25/04 188/377 |
| 4,892,355 A * | 1/1990 | Fend | A47C 3/12 297/440.22 |
| D306,520 S | 3/1990 | McCarthy | |
| 4,911,381 A * | 3/1990 | Cannon | B64D 11/0696 244/122 R |
| 4,936,527 A | 6/1990 | Gorges | |
| 5,118,163 A | 6/1992 | Brittian et al. | |
| D336,379 S | 6/1993 | Veneruso | |
| 5,292,174 A | 3/1994 | Ohnuma | |
| 5,342,112 A | 8/1994 | Padovan | |
| 5,352,020 A | 10/1994 | Wade et al. | |
| 5,375,907 A | 12/1994 | Rogers et al. | |
| 5,409,186 A * | 4/1995 | Chow | B64D 11/06 165/41 |
| 5,485,976 A * | 1/1996 | Creed | B64D 11/06 297/452.55 X |
| 5,499,783 A * | 3/1996 | Marechal | B64D 25/04 188/374 |
| 5,502,912 A | 4/1996 | LeBoff et al. | |
| 5,507,556 A | 4/1996 | Dixon | |
| 5,522,640 A * | 6/1996 | Bilezikjian | B60N 2/4214 188/377 |
| 5,531,404 A * | 7/1996 | Marechal | B64D 25/04 244/118.6 |
| 5,553,923 A * | 9/1996 | Bilezikjian | B64D 11/06 297/232 |
| 5,575,532 A * | 11/1996 | von Rolbicki | B60N 2/68 297/232 |
| 5,597,139 A | 1/1997 | Beroth | |
| 5,611,503 A | 3/1997 | Brauer | |
| 5,657,950 A * | 8/1997 | Han | B64D 11/06 244/122 R |
| 5,695,240 A | 12/1997 | Luria | |
| 5,720,515 A | 2/1998 | Haffner | |
| 5,730,458 A | 3/1998 | Byon | |
| 5,779,312 A | 7/1998 | Nagai | |
| 5,800,013 A | 9/1998 | Branham et al. | |
| 5,836,646 A * | 11/1998 | Salehi | A47C 7/62 297/188.04 |
| 5,878,672 A | 3/1999 | Ostermann et al. | |
| 5,984,347 A | 11/1999 | Blanc-Rosset | |
| 6,006,462 A | 12/1999 | Lackomar | |
| 6,065,806 A | 5/2000 | Miyaguchi | |
| 6,076,768 A | 6/2000 | Durand et al. | |
| 6,092,705 A | 7/2000 | Meritt | |
| D430,761 S | 9/2000 | Haney | |
| 6,176,547 B1 | 1/2001 | Francois et al. | |
| 6,216,927 B1 | 4/2001 | Meritt | |
| D441,210 S | 5/2001 | Mitjans | |
| 6,247,753 B1 | 6/2001 | Alvestad | |
| 6,279,992 B1 | 8/2001 | Plocher | |
| 6,450,571 B1 | 9/2002 | Canni et al. | |
| 6,481,798 B2 | 11/2002 | Romca | |
| 6,494,533 B1 | 12/2002 | Bohler | |
| 6,550,861 B1 | 4/2003 | Williamson | |
| 6,588,848 B2 | 7/2003 | Cheng | |
| 6,592,179 B1 | 7/2003 | Miyazaki | |
| 6,641,214 B2 * | 11/2003 | Veneruso | B60N 2/0232 297/216.15 |
| 6,644,738 B2 | 11/2003 | Williamson | |
| 6,669,295 B2 | 12/2003 | Williamson | |
| 6,672,661 B2 * | 1/2004 | Williamson | B60N 2/015 297/232 |
| D486,330 S | 2/2004 | Lamin et al. | |
| 6,688,694 B1 | 2/2004 | Yu | |
| 6,715,834 B1 | 4/2004 | Liao | |
| 6,739,552 B2 | 5/2004 | Sankrithi et al. | |
| 6,739,664 B2 | 5/2004 | Kinoshita | |
| 6,739,671 B2 | 5/2004 | De Maina | |
| 6,742,840 B2 * | 6/2004 | Bentley | B60N 2/22 297/322 X |
| 6,749,266 B2 | 6/2004 | Williamson | |
| 6,761,398 B2 | 7/2004 | Bentley | |
| 6,763,986 B2 | 7/2004 | Santos et al. | |
| 6,776,457 B2 | 8/2004 | Muin | |
| 6,824,213 B2 | 11/2004 | Skelly | |
| 6,827,026 B2 | 12/2004 | Williamson et al. | |
| 6,886,282 B2 | 5/2005 | Sumner, III et al. | |
| D505,796 S | 6/2005 | Johnson | |
| 6,902,238 B1 | 6/2005 | Abt | |
| 6,960,110 B2 | 11/2005 | Hough | |
| 6,994,401 B1 | 2/2006 | Fischer et al. | |
| 7,066,551 B2 | 6/2006 | Johnson | |
| 7,073,449 B2 | 7/2006 | Pipkin | |
| 7,134,713 B1 | 11/2006 | Tseng | |
| 7,152,719 B2 | 12/2006 | Knaust | |
| 7,178,867 B2 | 2/2007 | Hough | |
| 7,182,402 B1 | 2/2007 | Ahad | |
| 7,252,569 B2 | 8/2007 | Everhart et al. | |
| 7,261,369 B2 | 8/2007 | Ahad | |
| 7,296,858 B2 | 11/2007 | Ruspa | |
| 7,360,649 B2 | 4/2008 | Swaim et al. | |
| 7,390,062 B2 | 6/2008 | Hahn | |
| 7,399,037 B2 | 7/2008 | Schumacher et al. | |

(56) References Cited

U.S. PATENT DOCUMENTS

| | | | |
|---|---|---|---|
| 7,500,716 B2 | 3/2009 | Guerin et al. |
| 7,562,408 B1 | 7/2009 | Johnson et al. |
| 7,611,198 B2 | 11/2009 | Schweizer |
| 7,621,593 B2 | 11/2009 | Dickinson |
| D605,863 S | 12/2009 | Aruga |
| D606,344 S | 12/2009 | Aruga et al. |
| 7,716,797 B2 | 5/2010 | Kismarton et al. |
| 7,726,607 B2 | 6/2010 | Schumacher |
| 7,810,880 B2 | 10/2010 | Spellman |
| 7,866,752 B1 | 1/2011 | Heuser |
| 7,871,039 B2 | 1/2011 | Fullerton et al. |
| D632,105 S | 2/2011 | Aruga et al. |
| 7,954,762 B2 | 6/2011 | Boren et al. |
| 7,971,929 B2 | 7/2011 | Kennard et al. |
| 8,016,361 B2 | 9/2011 | Kismarton et al. |
| 8,020,936 B2 | 9/2011 | Asami et al. |
| 8,028,958 B2 | 10/2011 | Kneller et al. |
| 8,047,613 B1 | 11/2011 | Ahad |
| 8,087,613 B2 | 1/2012 | Fullerton et al. |
| 8,141,948 B2 | 3/2012 | Cassellia et al. |
| 8,146,999 B2 | 4/2012 | Ferguson et al. |
| 8,186,760 B2 | 5/2012 | Kneller et al. |
| 8,205,833 B2 | 6/2012 | Kismarton et al. |
| D665,182 S | 8/2012 | Hilton et al. |
| 8,272,694 B2 * | 9/2012 | Hawkins | B60N 2/181 297/322 X |
| 8,336,965 B2 | 12/2012 | Kismarton et al. |
| 8,393,574 B2 | 3/2013 | Kismarton |
| 8,393,680 B2 * | 3/2013 | Zimmermann | B64D 11/0693 297/248 |
| 8,397,963 B2 | 3/2013 | Singh |
| 8,444,226 B2 | 5/2013 | Driessen et al. |
| 8,464,982 B2 | 6/2013 | Raybell et al. |
| D686,422 S | 7/2013 | Robinson |
| 8,506,015 B2 | 8/2013 | Le et al. |
| 8,517,464 B2 | 8/2013 | Ruiz |
| 8,544,796 B2 | 10/2013 | Pozzi et al. |
| 8,550,564 B1 | 10/2013 | Kismarton et al. |
| 8,590,126 B2 | 11/2013 | Kismarton et al. |
| 8,596,723 B2 | 12/2013 | Ahad |
| 8,596,724 B1 | 12/2013 | Ahad |
| 8,602,499 B2 | 12/2013 | Driessen et al. |
| 8,613,479 B2 | 12/2013 | Schurg et al. |
| 8,636,003 B2 | 1/2014 | Deutscher et al. |
| D701,213 S | 3/2014 | Pajic |
| 8,667,904 B2 | 3/2014 | Pajic |
| 8,696,066 B2 | 4/2014 | Mizobata |
| 8,702,163 B2 | 4/2014 | Westerink |
| 8,714,647 B2 | 5/2014 | Westerink |
| 8,733,840 B2 * | 5/2014 | Westerink | B60N 2/1625 297/322 X |
| D707,999 S | 7/2014 | Takashi et al. |
| 8,763,976 B1 | 7/2014 | Jachim |
| 8,782,835 B2 | 7/2014 | Pozzi |
| 8,826,830 B2 | 9/2014 | Pajic |
| 8,851,565 B2 | 10/2014 | Hontz et al. |
| 8,864,227 B2 | 10/2014 | Funke et al. |
| 8,905,470 B2 | 12/2014 | Shih et al. |
| 8,931,847 B2 | 1/2015 | Cailleteau et al. |
| 8,934,063 B2 | 1/2015 | Boyer, Jr. |
| 8,936,307 B2 | 1/2015 | Heredia |
| D723,819 S | 3/2015 | Takahashi et al. |
| D723,822 S | 3/2015 | Cai et al. |
| D724,338 S | 3/2015 | Nicholas |
| D724,339 S | 3/2015 | Cai et al. |
| 8,974,002 B2 | 3/2015 | Le et al. |
| 8,991,930 B2 | 3/2015 | Laframboise |
| D725,927 S | 4/2015 | Carter |
| 9,016,627 B2 | 4/2015 | Margis et al. |
| 9,045,096 B2 | 6/2015 | Procter et al. |
| 9,067,682 B2 | 6/2015 | Pajic |
| 9,090,352 B2 | 7/2015 | Saada et al. |
| 9,138,055 B2 | 9/2015 | Curtis et al. |
| 9,167,905 B2 | 10/2015 | Pajic |
| 9,168,876 B2 | 10/2015 | Pajic |
| 9,242,733 B2 | 1/2016 | Pajic |
| D750,392 S | 3/2016 | Wilkens |
| 9,290,271 B2 | 3/2016 | Schurg et al. |
| 9,327,836 B2 | 5/2016 | Weitzel et al. |
| 9,352,840 B2 | 5/2016 | Schultheis |
| 9,376,047 B2 | 6/2016 | Ulbrich-Gasparevic et al. |
| 9,403,596 B2 | 8/2016 | Pajic |
| 9,409,647 B2 | 8/2016 | Pajic |
| 9,415,874 B2 | 8/2016 | Curtis et al. |
| 9,511,862 B2 | 12/2016 | Thiele et al. |
| 9,630,717 B2 | 4/2017 | Wilkens |
| 9,656,583 B2 * | 5/2017 | Gaither | B60N 2/66 |
| 9,764,844 B2 | 9/2017 | Le et al. |
| 2001/0033101 A1 | 10/2001 | Plant et al. |
| 2002/0063449 A1 | 5/2002 | Plant et al. |
| 2002/0105219 A1 * | 8/2002 | Riley | B60R 21/207 297/452.2 |
| 2003/0094542 A1 | 5/2003 | Williamson |
| 2003/0094837 A1 | 5/2003 | Williamson |
| 2003/0094840 A1 * | 5/2003 | Williamson | B64D 11/06 297/248 |
| 2003/0094842 A1 | 5/2003 | Williamson |
| 2004/0021349 A1 | 2/2004 | Longtin et al. |
| 2004/0046430 A1 | 3/2004 | Plant et al. |
| 2004/0099766 A1 | 5/2004 | Pratt |
| 2004/0195897 A1 | 10/2004 | Mitjans |
| 2004/0212228 A1 | 10/2004 | Skelly et al. |
| 2005/0184566 A1 | 8/2005 | Baumann et al. |
| 2005/0194828 A1 | 9/2005 | Johnson et al. |
| 2007/0001499 A1 | 1/2007 | Smith |
| 2007/0018494 A1 | 1/2007 | Gutosky, Jr. |
| 2007/0200414 A1 | 8/2007 | Pozzi |
| 2007/0205640 A1 | 9/2007 | Pecorino |
| 2007/0283855 A1 | 12/2007 | Pozzi |
| 2008/0116731 A1 | 5/2008 | Schurg et al. |
| 2008/0169694 A1 * | 7/2008 | Speh | B60N 2/2209 297/300.1 |
| 2009/0108132 A1 * | 4/2009 | Guttropf | B64D 11/06 244/122 R |
| 2009/0217846 A1 | 9/2009 | Harris |
| 2010/0102170 A1 * | 4/2010 | LaConte | B64D 11/06 244/122 R |
| 2010/0289318 A1 * | 11/2010 | Le | B60N 2/68 297/452.2 |
| 2011/0148167 A1 * | 6/2011 | Westerink | B64D 11/06 297/354.12 |
| 2011/0174926 A1 | 7/2011 | Margis et al. |
| 2011/0233339 A1 | 9/2011 | Plant et al. |
| 2011/0266853 A1 | 11/2011 | Zhou |
| 2011/0278885 A1 * | 11/2011 | Procter | B60R 11/0235 297/188.04 X |
| 2012/0091780 A1 * | 4/2012 | Muller | B64D 11/06 297/452.18 |
| 2012/0098322 A1 * | 4/2012 | Muller | B64D 11/06 297/452.18 |
| 2012/0138744 A1 | 6/2012 | Fullerton et al. |
| 2012/0205329 A1 | 8/2012 | Fujita et al. |
| 2012/0292967 A1 * | 11/2012 | Cailleteau | A47C 7/446 297/311 |
| 2012/0298798 A1 | 11/2012 | Henshaw |
| 2013/0002001 A1 | 1/2013 | Allen et al. |
| 2013/0038103 A1 | 2/2013 | Scott |
| 2013/0080357 A1 | 3/2013 | Boren et al. |
| 2013/0093220 A1 | 4/2013 | Pajic |
| 2013/0147240 A1 | 6/2013 | Lee |
| 2013/0264298 A1 | 10/2013 | Shih et al. |
| 2013/0314861 A1 | 11/2013 | Burford |
| 2013/0327255 A1 | 12/2013 | Pajic |
| 2014/0159441 A1 | 6/2014 | Philipzik et al. |
| 2014/0175843 A1 | 6/2014 | Westerink et al. |
| 2014/0175847 A1 * | 6/2014 | Schurg | B64D 11/06 297/188.07 |
| 2014/0284972 A1 | 9/2014 | Rieder et al. |
| 2014/0284973 A1 | 9/2014 | Wolgast et al. |
| 2014/0300162 A1 | 10/2014 | Udriste et al. |
| 2014/0333100 A1 | 11/2014 | Wilkens |
| 2014/0375090 A1 * | 12/2014 | Wegenka | B60N 2/242 297/188.09 |

(56) References Cited

U.S. PATENT DOCUMENTS

| | | | |
|---|---|---|---|
| 2015/0091337 A1 | 4/2015 | Cailleteau et al. | |
| 2015/0091342 A1 | 4/2015 | Cailleteau et al. | |
| 2015/0108798 A1 | 4/2015 | Boyer, Jr. | |
| 2015/0115668 A1 | 4/2015 | Martinak | |
| 2015/0166181 A1* | 6/2015 | Scott | B64D 11/0601 297/248 |
| 2015/0175265 A1* | 6/2015 | Thiele | B64D 11/06 297/188.04 |
| 2015/0227277 A1 | 8/2015 | Margis et al. | |
| 2015/0246645 A1 | 9/2015 | Procter et al. | |
| 2015/0274038 A1 | 10/2015 | Garing | |
| 2015/0284087 A1 | 10/2015 | Henshaw | |
| 2015/0284095 A1 | 10/2015 | Pozzi et al. | |
| 2015/0291073 A1 | 10/2015 | Pajic | |
| 2015/0321614 A1* | 11/2015 | Line | B60R 7/005 297/188.04 X |
| 2016/0009394 A1 | 1/2016 | Felske | |
| 2016/0009398 A1 | 1/2016 | Klettke | |
| 2016/0023618 A1 | 1/2016 | Pajic | |
| 2016/0023765 A1* | 1/2016 | Zheng | B64D 11/0619 297/342 |
| 2016/0023769 A1* | 1/2016 | Zheng | B64D 11/0648 297/452.18 |
| 2016/0031560 A1* | 2/2016 | Zheng | B64D 11/064 297/344.1 |
| 2016/0039523 A1 | 2/2016 | Guttropf et al. | |
| 2016/0039524 A1 | 2/2016 | Zheng et al. | |
| 2016/0114891 A1 | 4/2016 | Pajic | |
| 2016/0152169 A1 | 6/2016 | Zheng et al. | |
| 2016/0272125 A1 | 9/2016 | Barnes | |
| 2016/0274674 A1 | 9/2016 | Valdes et al. | |
| 2016/0297533 A1 | 10/2016 | Le et al. | |

FOREIGN PATENT DOCUMENTS

| | | | |
|---|---|---|---|
| DE | 100 42 495 | 3/2002 | |
| DE | 101 18 496 | 10/2002 | |
| DE | 102 15 058 C1 | 7/2003 | |
| DE | 203 15 554 | 12/2003 | |
| DE | 10 2004 047 609 | 5/2005 | |
| DE | 10 2005 051 138 | 5/2007 | |
| DE | 10 2007 046 130 | 4/2009 | |
| DE | 20 2012 100 251 | 2/2012 | |
| DE | 20 2012 105 089 | 1/2013 | |
| DE | 20 2013 102 887 | 7/2013 | |
| DE | 10 2012 112 942 | 6/2014 | |
| DE | 102012112942 A1 * | 6/2014 | B64D 11/0624 |
| DE | 10 2013 017 696 | 7/2014 | |
| DE | 10 2013 020 439 | 6/2015 | |
| DE | 10 2014 220 549 | 4/2016 | |
| DE | 10 2014 222 672 | 5/2016 | |
| DE | 10 2016 000 818 | 7/2016 | |
| EP | 0 018 662 | 11/1980 | |
| EP | 1 712 421 | 10/2006 | |
| EP | 1708922 | 9/2009 | |
| EP | 2 110 313 | 10/2009 | |
| EP | 1 789 317 B1 | 4/2010 | |
| EP | 2 569 187 | 3/2013 | |
| EP | 2 602 149 | 6/2013 | |
| EP | 2 620 321 | 7/2013 | |
| EP | 2 639 102 | 9/2013 | |
| EP | 2 639 103 | 9/2013 | |
| EP | 2 483 150 | 1/2014 | |
| EP | 2 726 373 | 5/2014 | |
| EP | 2 746 158 | 6/2014 | |
| EP | 2 759 447 | 7/2014 | |
| EP | 2 799 338 | 11/2014 | |
| EP | 2110313 | 1/2015 | |
| EP | 2 877 398 | 6/2015 | |
| EP | 2 917 105 | 9/2015 | |
| EP | 2 981 464 | 2/2016 | |
| EP | 3 063 036 | 9/2016 | |
| FR | 2 577 776 | 8/1986 | |
| FR | 2 923 780 | 5/2009 | |
| FR | 2 982 218 | 5/2013 | |
| FR | 3 024 090 | 1/2016 | |
| GB | 2 438 090 | 11/2007 | |
| JP | 5254747 | 8/2013 | |
| JP | 5600150 | 10/2014 | |
| JP | 5 702 190 | 4/2015 | |
| WO | WO 95/09742 | 4/1995 | |
| WO | WO 00/02745 | 1/2000 | |
| WO | WO 02/32268 | 4/2002 | |
| WO | WO 03/106261 | 12/2003 | |
| WO | WO 2006/029659 | 3/2006 | |
| WO | WO 2007/015832 | 5/2007 | |
| WO | WO 2007/123615 | 11/2007 | |
| WO | WO 2009/098381 | 8/2009 | |
| WO | WO 2011/018930 | 2/2011 | |
| WO | WO 2011/143648 | 11/2011 | |
| WO | WO 2012/064922 | 5/2012 | |
| WO | WO 2012/118096 | 9/2012 | |
| WO | WO 2013/003537 | 1/2013 | |
| WO | WO 2013/055671 | 4/2013 | |
| WO | WO 2013/068316 | 5/2013 | |
| WO | WO 2013/109751 | 7/2013 | |
| WO | WO 2013/166067 | 11/2013 | |
| WO | WO 2014/075040 | 5/2014 | |
| WO | WO 2014/161583 | 10/2014 | |
| WO | WO 2014/163579 | 10/2014 | |
| WO | WO 2014/176017 | 10/2014 | |
| WO | WO 2015/063082 | 5/2015 | |
| WO | WO 2015/157309 | 10/2015 | |
| WO | WO 2016/012693 | 1/2016 | |
| WO | WO 2016/076921 | 5/2016 | |
| WO | WO 2016/140631 | 9/2016 | |
| WO | WO 2016/168200 | 10/2016 | |
| WO | WO 2017/173400 | 10/2017 | |

OTHER PUBLICATIONS

Invitation to Pay Additional Fees in co-pending International Patent Application No. PCT/US2016/027145, dated Jul. 22, 2016 in 10 pages.

International Search Report and Written Opinion in co-pending Patent Application No. PCT/US2016/027145, dated Sep. 12, 2016, in 21 pages.

International Search Report and Written Opinoin in co-pending Patent Application No. PCT/US2017/025599, dated Sep. 4, 2017, in 17 pages.

* cited by examiner

FIG. 18
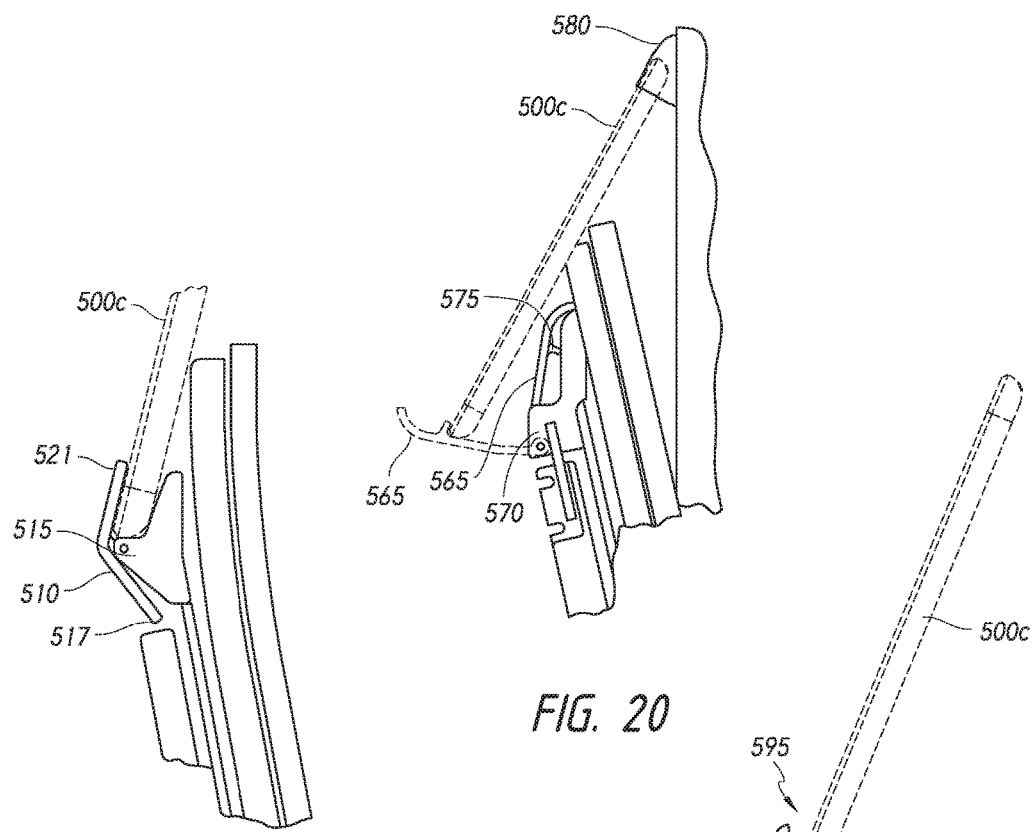
FIG. 19
FIG. 20
FIG. 21

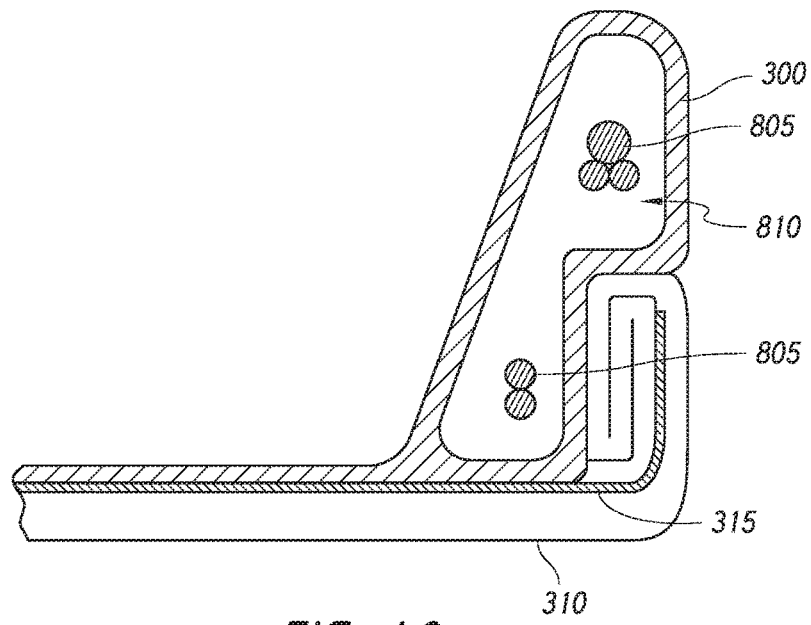
FIG. 48
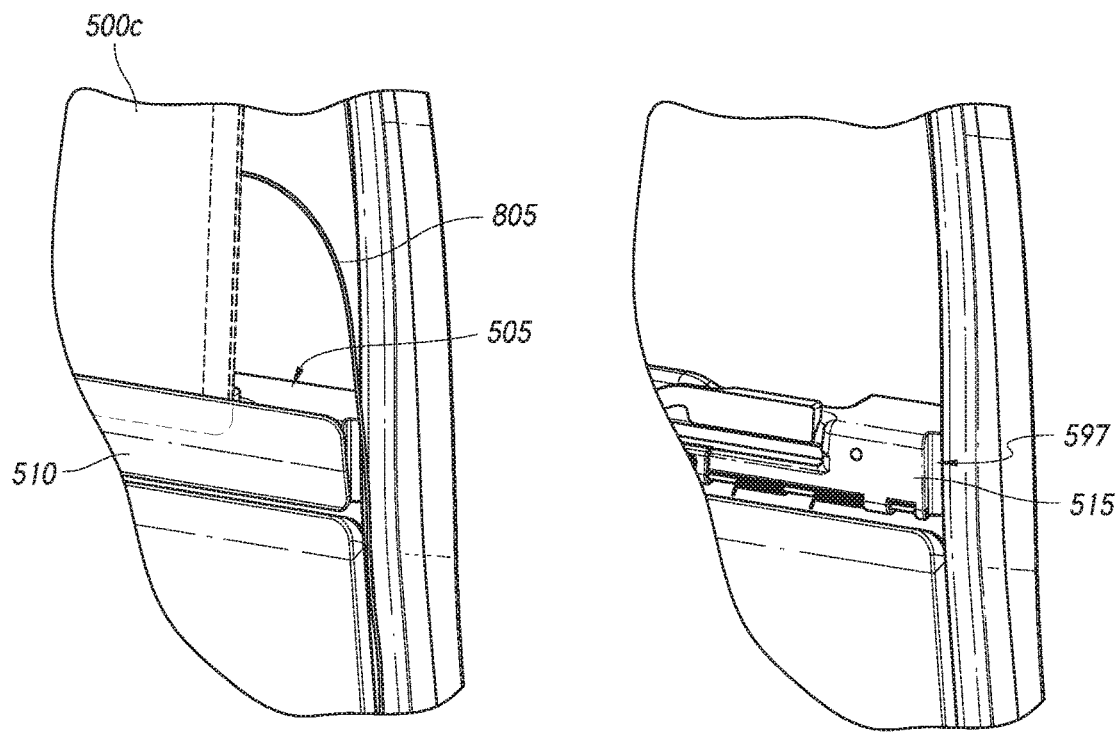
FIG. 49
FIG. 50

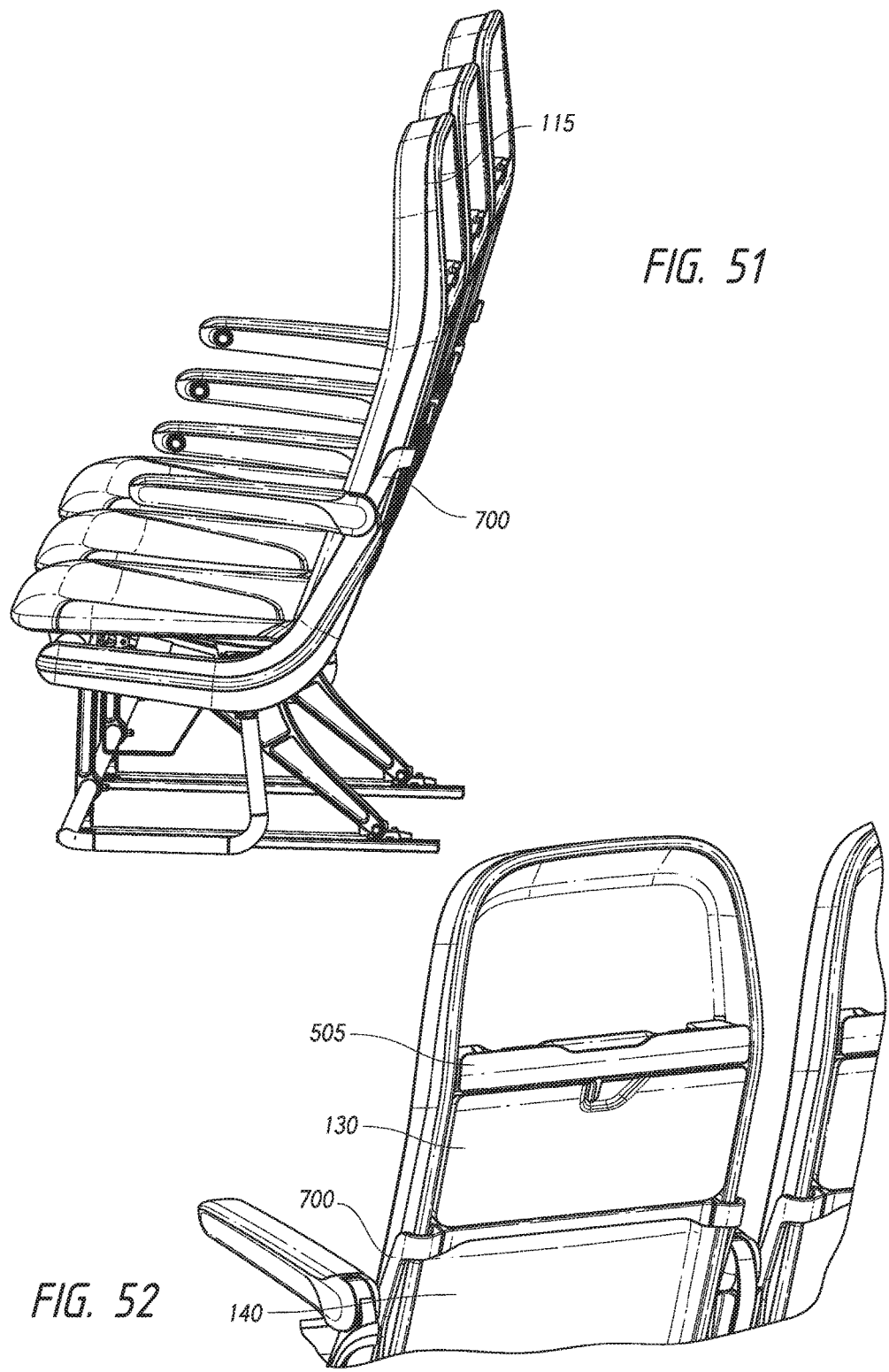

AIRCRAFT SEATING ASSEMBLY

RELATED APPLICATIONS

This application is a continuation of U.S. patent application Ser. No. 15/089,366, filed on Apr. 1, 2016, which claims priority to U.S. Provisional Application Nos. 62/146,925 and 62/146,932, both filed on Apr. 13, 2015. The entire contents of the applications identified above are incorporated by reference herein and made a part of this specification.

BACKGROUND

Field

The embodiments described herein relate generally to seat devices, systems, and methods. In particular, some embodiments described herein relate to aircraft seat devices, systems, and methods.

Background

The structure of aircraft seats plays a significant role in the airline industry. As passenger seating is typically arranged in rows with one or more aisles separating parts of each row, aircraft seating assemblies typically are configured as 2, 3 or 4 seat units. These aircraft seating assemblies have a structure for withstanding forces caused not only due to acceleration and deceleration of the aircraft during normal operation, but also substantial forces caused during emergencies. Significantly, the aircraft seats desirably achieve this performance while being relatively lightweight. Further, while the structural integrity and weight of the seating assemblies is important, the cost of the assemblies is also an important consideration.

While there are many existing aircraft seat assemblies, such seating assemblies and certain components thereof have various limitations and disadvantages.

SUMMARY

Embodiments of an aircraft seating assembly are disclosed which are both compliant with industry regulations and lightweight yet capable of withstanding significant forces. In some embodiments, the aircraft seating assembly can be installed in an aircraft. The assembly can include a seat pan, a connection frame, and one or more mounts. The one or more mounts can removably couple the seat pan to the connection frame. The one or more mounts can be attached to a bottom portion of the seat pan.

In some embodiments, the aircraft seating assembly can include a back support. The back support can include a back support frame and a cushioning member. The cushioning member can be removably coupled to the back support frame.

In some embodiments, the aircraft seating assembly can include a connection frame, a back support, and a tilt system. The back support can be coupled to the connection frame. The tilt system can be coupled to the back support and to the connection frame. The tilt system can allow the back support to articulate relative to a connection frame. The tilt system can include a pivot member and an actuator. The actuator can include a first end and a second end. The actuator can be coupled to the connection frame at the first end and the pivot member at the second end. The actuator can be centrally located relative to a width of a seat of the aircraft seating assembly.

In some embodiments, the aircraft seating assembly can include a connection frame, a back support, and a tilt system. The back support can be coupled to the connection frame. The tilt system can be coupled to the back support and to the connection frame. The tilt system can allow the back support to articulate relative to a connection frame. The tilt system can include a pivot member, a carrier and an actuator. The carrier can be coupled to the connection frame. The actuator can be positioned within the carrier and can be coupled to the pivot member.

In some embodiments, the aircraft seating assembly can include a back support and a retention system. The retention system can be coupled to the back support. The retention system can retain an object in place when in a closed configuration. The retention system can include a base member, a clamp member and a biasing component. The clamp member can be rotatably coupled to the base portion. The biasing component can bias the clamp member into the closed configuration.

BRIEF DESCRIPTION OF THE DRAWINGS

Embodiments of the present disclosure will now be described hereinafter, by way of example only, with reference to the accompanying drawings as indicated below.

FIG. 18 is a front view of another embodiment of a clamp member of the retention system of FIG. 15.

FIG. 19 is a schematic, side view of another embodiment of a retention system.

FIG. 20 is a schematic, side view of another embodiment of a retention system.

FIG. 21 is a schematic, side view of another embodiment of a retention system.

FIG. 48 is a cross-sectional view of an embodiment of a cable management system in a back support frame of an aircraft seat.

FIG. 49 is a perspective view of an embodiment of a cable management system for a personal electronic device.

FIG. 50 is a perspective view of components of the cable management system of FIG. 49

FIG. 51 is a perspective view of an embodiment of an aircraft seating assembly.

FIG. 52 is a rear perspective view of the aircraft seating assembly of FIG. 51.

DETAILED DESCRIPTION

Figure 1:
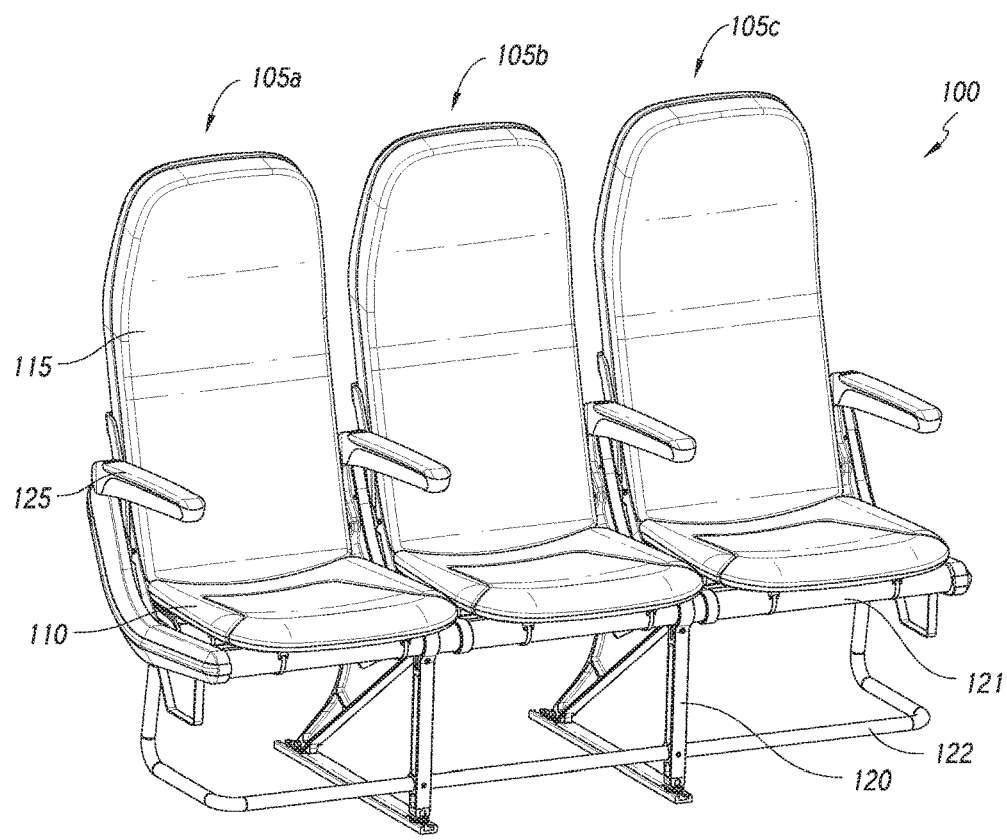
FIG. 1 is a front perspective view of an embodiment of an aircraft seating assembly.

The following detailed description is merely illustrative in nature and is not intended to limit the embodiments of the subject matter or the application and uses of such embodiments. Any implementation described herein as exemplary is not necessarily to be construed as preferred or advantageous over other implementations. Furthermore, there is no intention to be bound by any expressed or implied theory presented in the proceeding technical field, background, brief summary, or the following detailed description.

Certain terminology may be used in the following description for the purpose of reference only, and thus are not intended to be limiting. For example, terms such as "upper", "lower", "above", and "below" refer to directions in the drawings to which reference is made. Terms such as "front", "back", "rear", "left side," and "right side" describe the orientation and/or location of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second", and other such numerical terms referring to structures do not imply a sequence or order unless clearly indicated by the context.

Figure 2:
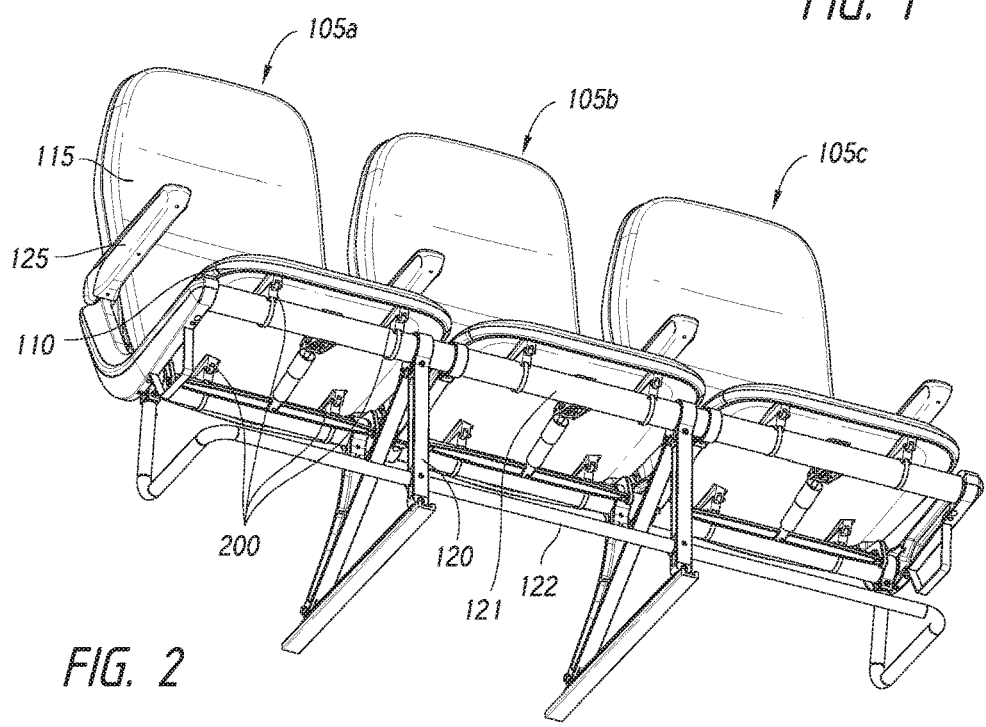
FIG. 2 is a bottom perspective view of the aircraft seating assembly of FIG. 1.
Figure 3A:
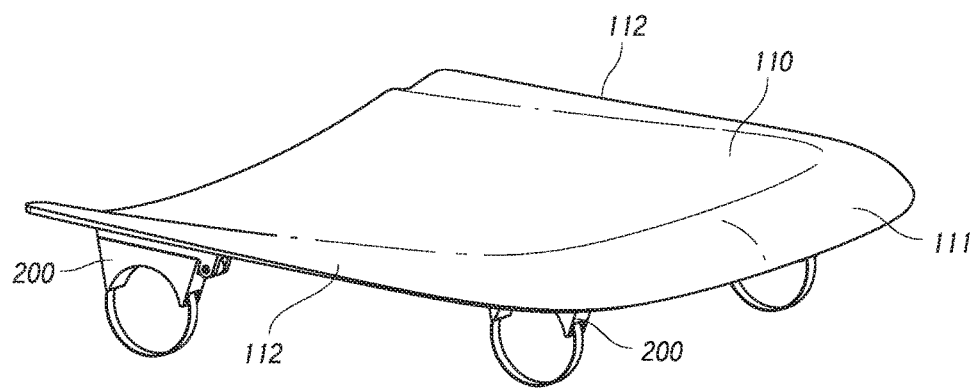
FIG. 3A is a front perspective view of an embodiment of a seat pan.
Figure 3B:
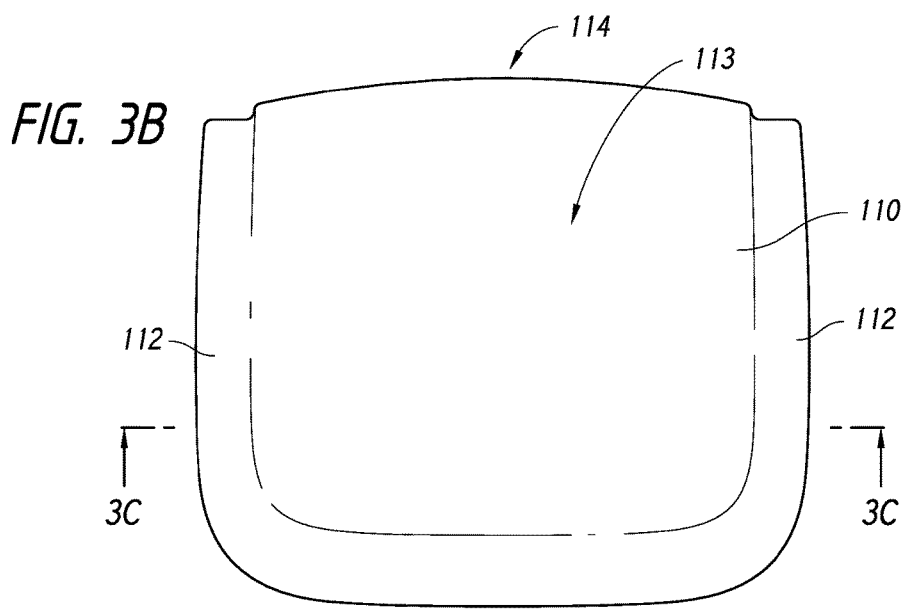
FIG. 3B is a top view of the seat pan of FIG. 3A.
Figure 3C:
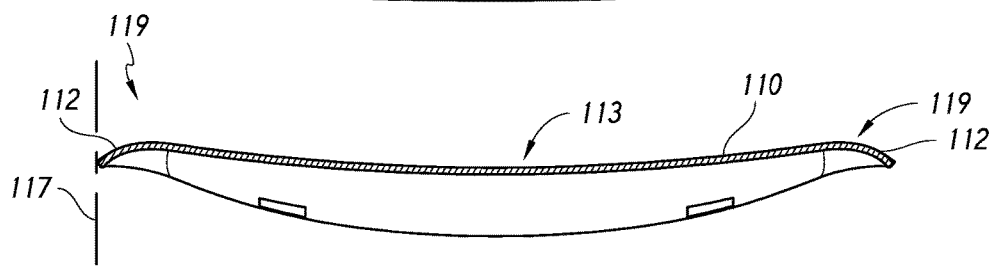
FIG. 3C is a sectional view of the seat pan of FIG. 3B along line "3C."
Figure 3D:
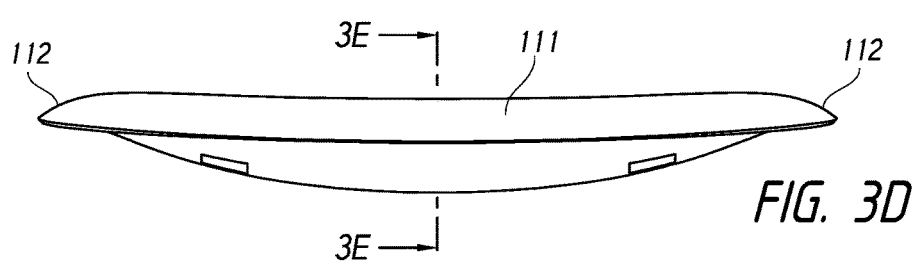
FIG. 3D is a front view of the seat pan of FIG. 3A.
Figure 3E:
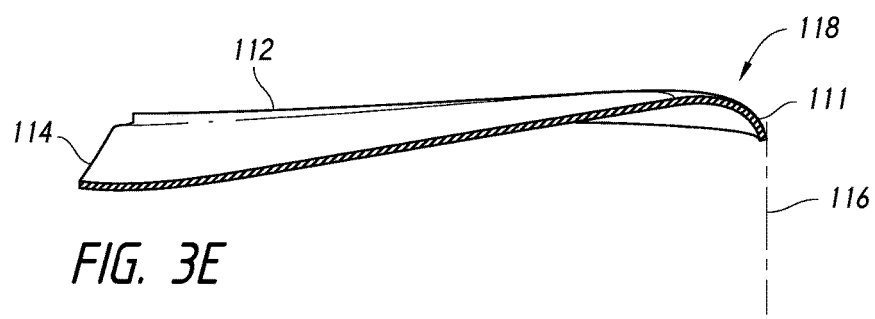
FIG. 3E is a sectional view of the seat pan of FIG. 3D along line "3E."

With reference first to FIGS. 1 and 2, which are illustrations of an embodiment of an aircraft seating assembly 100, the aircraft seating assembly 100 can include three seats 105*a*, 105*b*, 105*c* each of which defines a seating position for one passenger and, typically, for an adult passenger. However, it should be understood that the aircraft seating assembly 100 may be expanded to include additional seats or reduced to include fewer seats. In some embodiments, the aircraft seating assembly 100 can include four seats. In some embodiments, the aircraft seating assembly 100 can include a single seat or two seats. Since the seats 105*a*, 105*b*, 105*c* are similar in design and construction, only seat 105*a* will be described in detail; however, it should be understood that the same, or similar, structures and features can be utilized for seats 105*b*, 105*c*. The first seat 105*a* can include a seat pan 110, a back support 115, a connection frame 120, and an armrest 125. The aircraft seating assembly 100 is designed to be placed within the cabin of an aircraft and attached to the cabin via the connection frame 120.

Seat Pan

With reference now to FIGS. 2-5, in some embodiments the seat pan 110 can be connected to the connection frame 120. As shown in the illustrated embodiment of FIG. 2, in some embodiments the seat pan 110 can be removably coupled to one or more tubes 121 of the connection frame 120, such as a fore tube positioned nearer a front portion 111 of the seat pan 110 and an aft tube positioned nearer a rear portion 114 of the seat pan 110. These tubes 121 can extend along the width of the aircraft seating assembly 100. The seat pan 110 can be removably coupled to these tubes 121 with one or more mounts 200. In the illustrated embodiment, four mounts 200 are attached to a bottom of the seat pan 110 and are attached at four, spaced apart corners of the seat pan 110. In some embodiments, the mounts 200 can advantageously be arranged to allow the seat pan 110 to more easily flex along portions which are spaced from the mounting points of the mounts 200. This greater ability for the seat pan 110 to flex can allow for a more compliant seat pan 110 thereby enhancing comfort for the passenger. As shown in the illustrated embodiment, the mounts 200 can be generally located under the passenger's thighs and buttock to provide substantial support for the passenger. In some embodiments, fewer or greater number of mounts 200 can be used to removably attach the seat pan to the connection frame 120 and/or the mounts 200 can be positioned at other locations relative to the seat pan 110 as desired.

With reference to FIGS. 3A-3E, the seat pan 110 can include features which significantly enhance passenger comfort. For example, as shown in the illustrated embodiment, the seat pan 110 can include a waterfall feature along a front portion 111 of the seat pan 110 and/or along one or both side portions 112 of the seat pan 110. As shown in the illustrated embodiment, the seat pan 110 can have an upward slope from the rear portion 114 of the seat pan 110 towards the front portion 111 of the seat pan 110. Proximate an edge of the front portion 111, the seat pan 110 can slope towards the floor of the aircraft. As shown in the illustrated embodiment, the edge of the front portion 111 of the seat pan 110 can have an angle of about 1 to about 45 degrees relative to a plane 116 perpendicular to the aircraft floor, an angle of about 5 to about 30 degrees relative to the plane 116, an angle of about 10 to about 15 degrees relative to the plane 116, any sub-range within these ranges, and/or any other angle as desired. In some embodiments, the transition from the upward slope to the downward slope can be gradual and can include a generally rounded surface 118.

As shown in the illustrated embodiment, the seat pan 110 can have an upward slope from the central portion 113 of the seat pan 110 towards one or both side portions 112 of the seat pan 110. Proximate an edge of one or both the side portions 112, the seat pan 110 can slope towards the floor of the aircraft. As shown in the illustrated embodiment, the edge of one or both sides portions 112 of the seat pan 110 can have an angle of about 1 to about 45 degrees relative to a plane 117 perpendicular to the aircraft floor, an angle of about 5 to about 30 degrees relative to the plane 117, an angle of about 10 to about 15 degrees relative to the plane 117, any sub-range within these ranges, and/or any other angle as desired. In some embodiments, the transition from the upward slope to the downward slope can be gradual and can include a generally rounded surface 119. In some embodiments, the front portion 111 and/or one or both side portions 112 can be angled towards the floor of the aircraft. The waterfall feature can advantageously enhance passenger comfort by reducing pressure points on a passenger's legs while the passenger is seated. As another example, the seat pan 110 can be relatively flexible to allow for a greater degree of compliancy. This greater flexibility can significantly enhance passenger comfort while the passenger is seated.

Figure 4A:
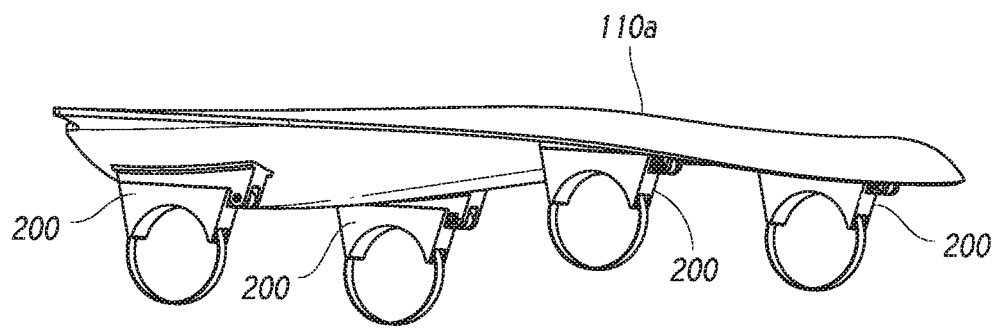
FIG. 4A is a perspective view of the seat pan of FIG. 3A shown in a first configuration.
Figure 4B:
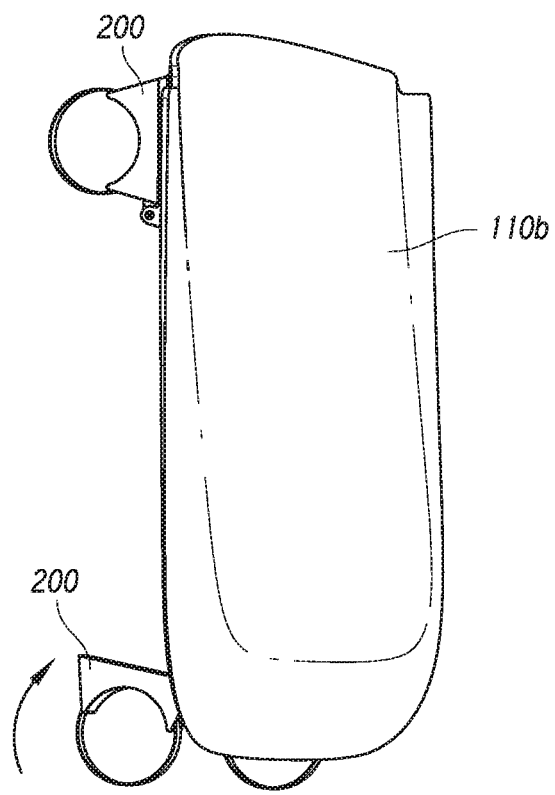
FIG. 4B is a perspective view of the seat pan of FIG. 4A shown in a second configuration.

With reference to FIGS. 4A and 4B, in some embodiments the mounts 200 can allow the seat pan 110 to articulate. In some embodiments, the seat pan 110 can rotate and/or translate relative to the connection frame 120. For example, as shown in the illustrated embodiment, the mounts 200 can allow the seat pan 110 to be rotated from a first configuration 110*a* as shown in FIG. 4A, such as a fully attached configuration, to a second configuration 110*b* as shown in FIG. 4B, such as a maintenance configuration, without having to completely detach the seat pan 110 from the connection assembly 120. For example, to rotate the seat pan 110 in the manner illustrated, only the two rear mounts 200 need to be disconnected. This can advantageously facilitate maintenance, inspection, and assembly of the aircraft seating assembly 100.

Figure 5A:
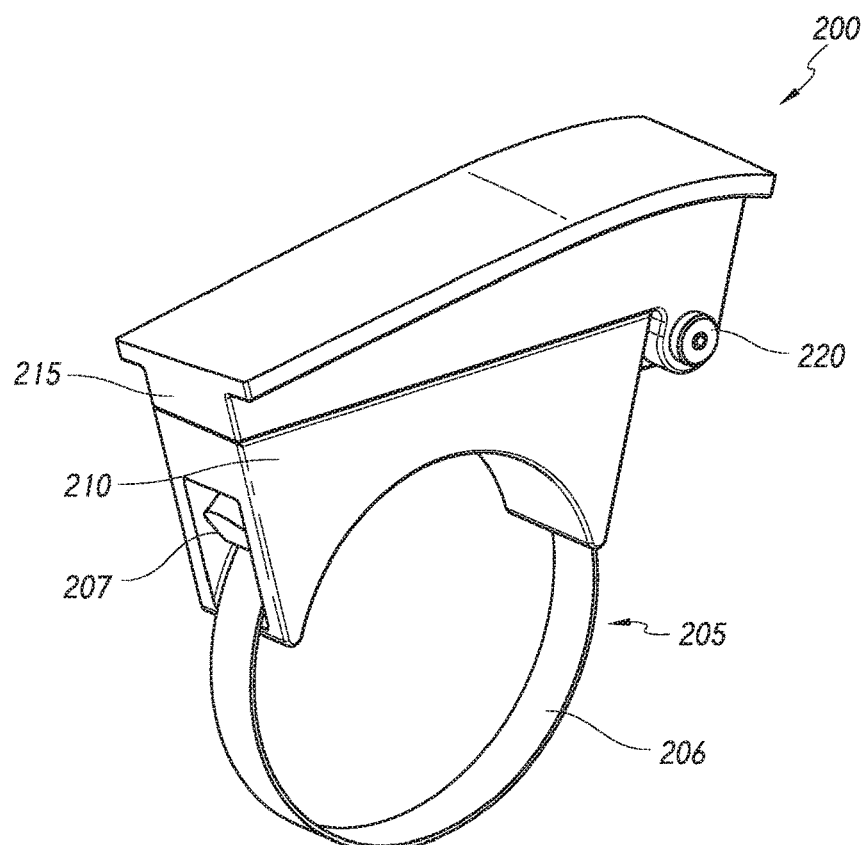
FIG. 5A is a perspective view of an embodiment of a mount of the seat pan of FIG. 3A.
Figure 5B:
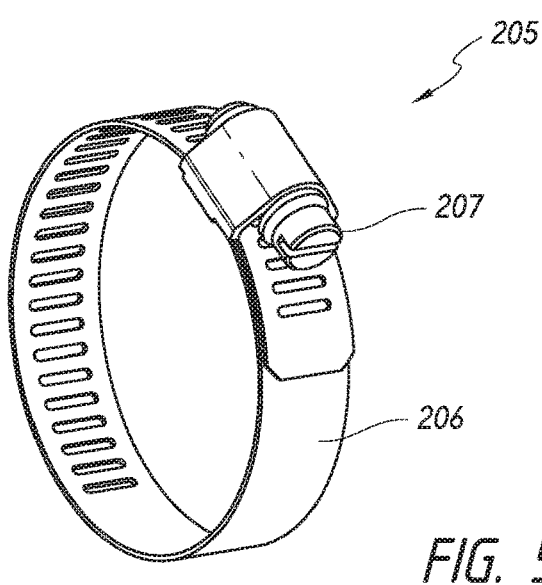
FIG. 5B is a perspective view of an embodiment of a strap of the mount of FIG. 5A.

With reference to FIGS. 5A and 5B, in some embodiments the mounts 200 can include a strap 205 which can releasably couple the mount 200 to the connection frame 120. The strap 205 can be formed from a material having some degree of compliancy such that the strap can be loosened. As shown in FIG. 5B, the strap 205 can include a flexible, elongate member 206 with a coupling member 207. The coupling member 207 can be used to lock the elongate member 206 in a desired position and/or apply tension to the elongate member 206. As shown in the illustrated embodiment, the coupling member 207 can be a worm gear or similar device. This strap-style mount 200 advantageously does not require holes to be drilled along the tube 121 to secure the mount 200 to the connection frame 120. This can be particularly beneficial as such drilling can decrease the strength of the 121. Moreover, as the strap-style mount 200 can be removably coupled to the connection frame 120 without drilling holes, the strap-style mount 200 provides greater flexibility in choosing where to position the seat along the width of the aircraft seating assembly 100. In some embodiments, interior and/or exterior surfaces of the elongate member 206 can be provided with an interior lining to reduce the likelihood of damage to components to which the elongate member 206 is in contact, such as tube 121.

As shown in the illustrated embodiment, the mounts 200 can include a first member 210 and a second member 215. The first and second members 210, 215 can be movable relative to each other. As shown in the illustrated embodiment, the first and second members 210, 215 can be rotatably coupled via a hinge 220. In some embodiments, the first and second members 210, 215 can be translatably coupled to each other in addition to, or in lieu of, being rotatably coupled. In some embodiments, the first member 210 can be attached to the connection frame 120 and the second member 215 can be attached to the seat pan 110. Such a design can allow the seat pan 110 to be rotatable as shown in FIG. 4.

With reference now to FIGS. 53-57, another embodiment of mounts 900, 950 are illustrated which can be used to connect the seat pan 110 to the connection frame 120, such as the tubes 121. The mounts 900, 950 can share the same, or similar, structures and features to mounts 200.

Figure 53:
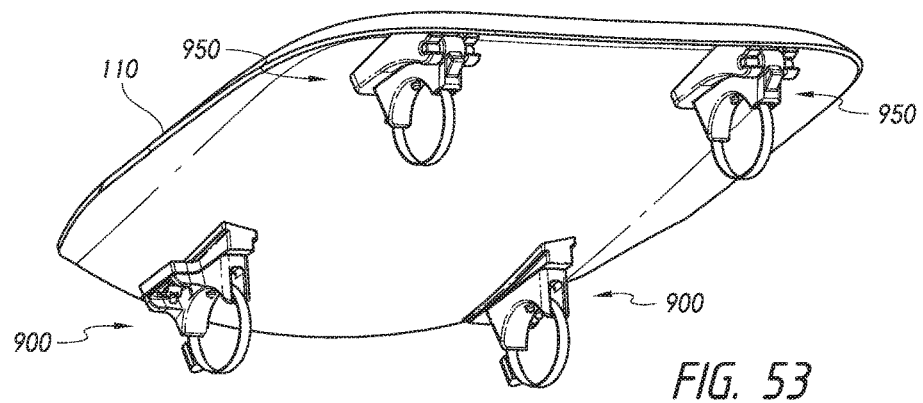
FIG. 53 is a bottom perspective view of a seat pan having another embodiment of mounts.
Figure 54:
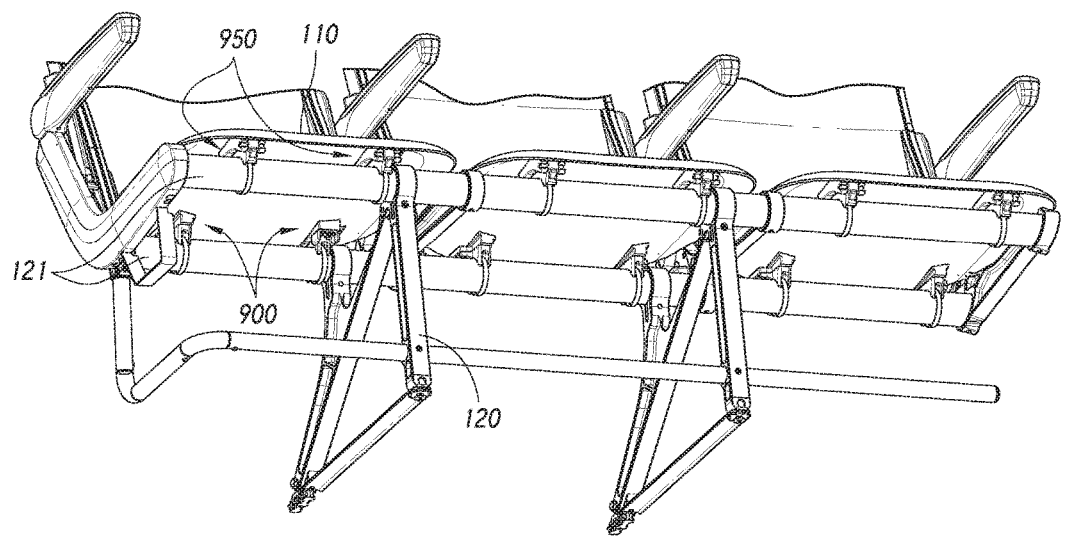
FIG. 54 is a bottom perspective view of the seat pan and mounts of FIG. 53 coupled to an aircraft seating assembly.

With reference first to FIGS. 53 and 54, in some embodiments the seat pan 110 can be removably coupled to one or more tubes 121 of the connection frame 120, such as a fore tube positioned nearer a front portion 111 of the seat pan 110 and an aft tube positioned nearer a rear portion 114 of the seat pan 110. These tubes 121 can extend along the width of the aircraft seating assembly 100. The seat pan 110 can be removably coupled to these tubes 121 with one or more mounts 900, 950. In the illustrated embodiment, two mounts 900 and two mounts 950 are attached to a bottom of the seat pan 110 and are attached at four, spaced apart corners of the seat pan 110, with the mounts 900 being positioned nearer a rear portion 114 of the seat pan 110 and the mounts 950 being positioned nearer a front portion 111 of the seat pan 110. However, it should be understood that the mounts 900 and the mounts 950 can be positioned at any position on the seat pan 110 including the reverse of the configuration described above.

In some embodiments, the mounts 900, 950 can advantageously be arranged to allow the seat pan 110 to more easily flex along portions which are spaced from the mounting points of the mounts 900, 950. This greater ability for the seat pan 110 to flex can allow for a more compliant seat pan 110 thereby enhancing comfort for the passenger. As shown in the illustrated embodiment, the mounts 900, 950 can be generally located under the passenger's thighs and buttock to provide substantial support for the passenger. In some embodiments, fewer or greater number of mounts 900, 950 can be used to removably attach the seat pan to the connection frame 120.

Figure 55A:
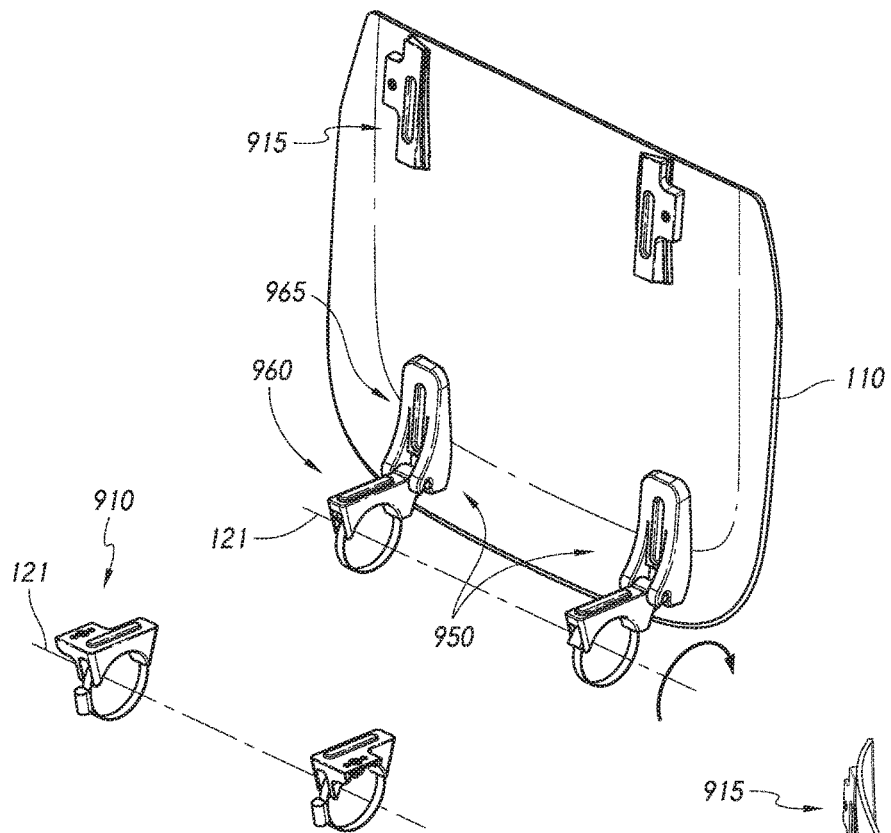
FIG. 55A is a schematic view of the seat pan and mounts of FIG. 53 in a second configuration.
Figure 55B:
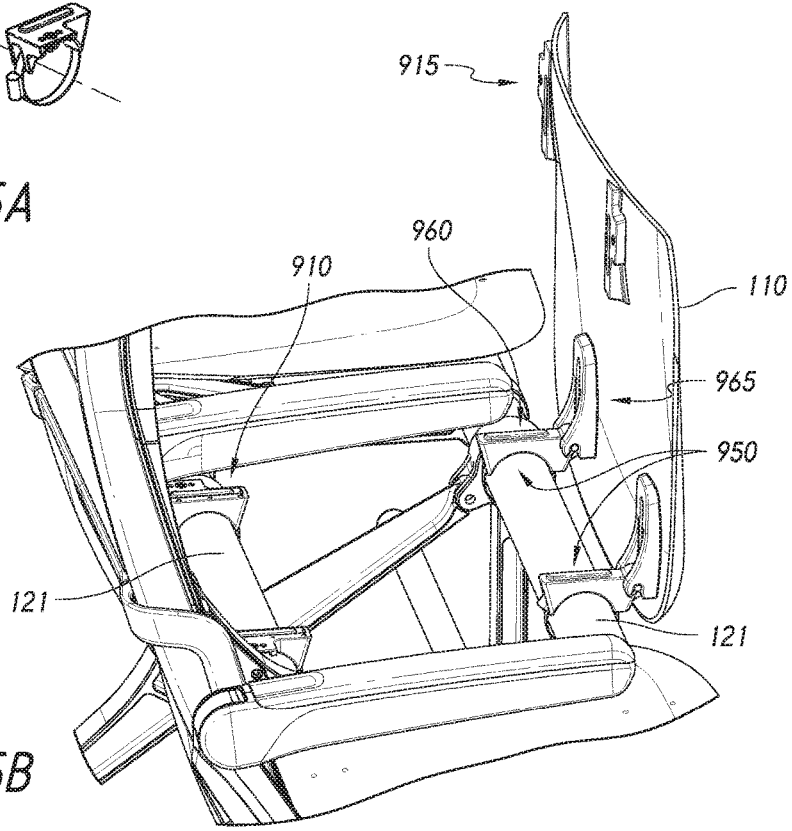
FIG. 55B is a top perspective view of the seat pan and mounts of FIG. 53 coupled to an aircraft seating assembly in a second configuration.
Figure 56:
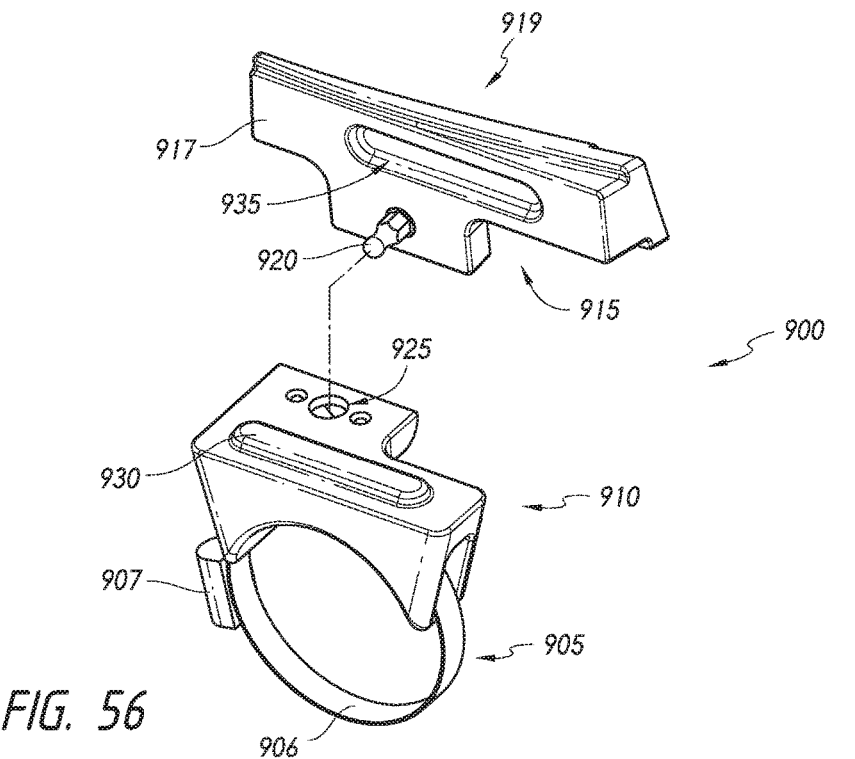
FIG. 56 is a side view of a mount shown in FIG. 53 in a second configuration.
Figure 57:
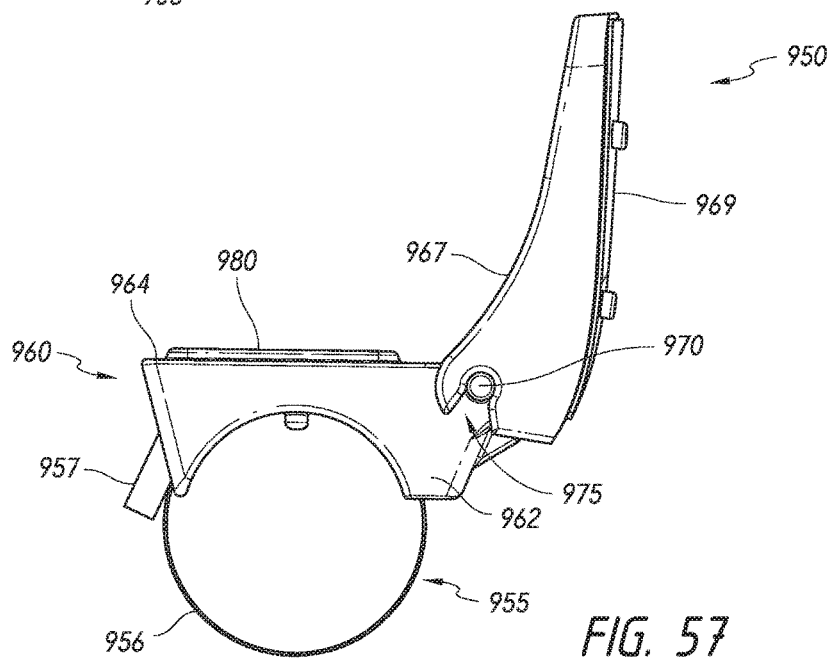
FIG. 57 is a side view of a mount shown in FIG. 53 in a decoupled configuration.
Figure 58:
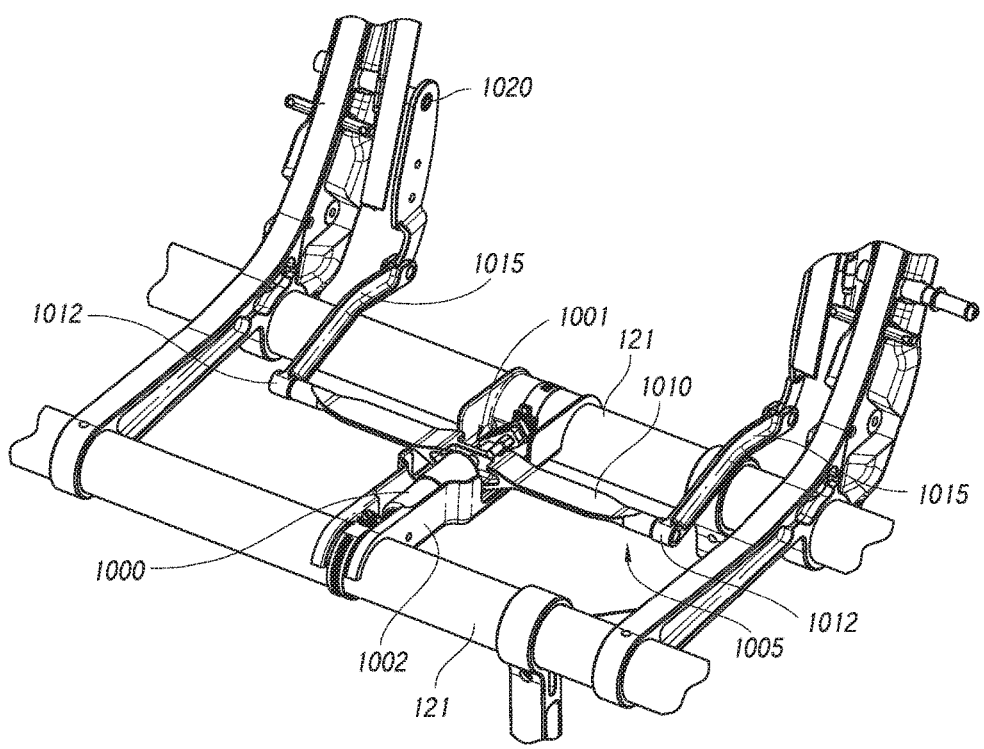
FIG. 58 is a top perspective view of another embodiment of a tilt system.

With reference to FIGS. 55-57, in some embodiments the mounts 900, 950 can include straps 905, 955 which can releasably couple the mounts 900, 950 to the connection frame 120. Straps 905, 955 can be formed from a material having some degree of compliancy such that the strap can be loosened. As shown in FIGS. 56 and 57, the straps 905, 955 can include flexible, elongate members 906, 956 with coupling members 907, 957. These can be similar to elongate member 206 and coupling member 207 described above. The coupling members 907, 957 can be used to lock the elongate members 906, 956 in a desired position and/or apply tension to the elongate members 906, 956. For example, the coupling members 907, 957 can be a worm gear or similar device. These strap-style mounts 900, 950 advantageously do not require holes to be drilled along the tube 121 to secure the mounts 900, 950 to the connection frame 120. In some embodiments, interior and/or exterior surfaces of the elongate members 906, 956 can be provided with an interior lining to reduce the likelihood of damage to components to which the elongate members 906, 956 are in contact, such as tube 121. In some embodiments, the elongate members 906, 956 and/or coupling members 907, 957 can have different constructions.

As shown in FIG. 55, the mounts 900, 950 can allow the seat pan 110 to be rotated relative to the tubes 121 of the connection assembly 120. For example, as shown in the illustrated embodiment, the seat pan 110 is rotated clockwise about a fore tube 121. In some embodiments, portions of the mounts 900, 950 can retained on the tubes 121 while other portions of the mounts 900, 950 can be disengaged. In some embodiments, engagement and disengagement can be via a "quick disconnect" coupling mechanism, such as a snap-fit coupling, thereby facilitating removal. In some embodiments, this arrangement can be reversed. For example, the seat pan 110 can be rotated in a counter-clockwise direction along an aft tube 121.

With reference next to FIG. 56, the mount 900 can include a first member 910 and a second member 915. The first and second members 910, 915 can be movable relative to each other. As shown in the illustrated embodiment, the first and second members 910, 915 can be removably coupled via a coupling mechanism. The coupling mechanism can be a "quick disconnect" coupling mechanism such as a ball stud fastener 920 and corresponding receiver 925 which can facilitate coupling and decoupling the first and second members 910, 915. In some embodiments, the first and second members 910, 915 can be coupled and decoupled without the use of tools. As shown in the illustrated embodiment, the second member 915 can include the ball stud fastener 920 which can extend downwardly from a bottom surface 917 of the second member 915. The first member 910 can include the stud receiver 925 which can open upwardly along an upper surface 912 of the first member 910. Other types of coupling mechanisms can be used, such as mechanical coupling mechanisms including clips, screws, hook-and-loop fasteners, chemical coupling mechanisms such as adhesives, any other coupling mechanism as desired, and/or any combination of coupling mechanisms.

In some embodiments, the mount 900 can include features which can reduce or inhibit translational and/or rotational motion. For example, the mount 900 can include a protrusion 930 and a corresponding detent or recess 935 in which the protrusion 930 can be received. As shown in the illustrated embodiment, the first member 910 can include the protrusion 930 along an upper surface 912 of the first member 910. The second member 915 can include the detent or recess 935 which can open downwardly of the bottom surface 917 of the second member 915. When the first and second members 910, 915 are coupled, the protrusion 930 can be received within the detent or recess 935 which can inhibit translation in a horizontal plane and/or rotation along an axis perpendicular to the horizontal plane. This can advantageously reduce stresses applied to the coupling mechanism, such as the ball stud fastener 920 and corresponding receiver 925.

In some embodiments, an upper surface 919 of the second member 915 can be coupled to the bottom of the seat pan 110 such as via mechanical coupling mechanisms including clips, screws, hook-and-loop fasteners, chemical coupling mechanisms such as adhesives, any other coupling mechanism as desired, and/or any combination of coupling mechanisms. The upper surface 919 of the second member 915 can be correspondingly shaped to the bottom surface of the seat pan 110. For example, the upper surface 919 of the second member 915 can include a curve.

With reference to FIG. 57, the mount 950 can include a first member 960 and a second member 965. The first and second members 960, 965 can be movable relative to each other. As shown in the illustrated embodiment, the first and second members 960, 965 can be rotatably coupled via a coupling mechanism. The coupling mechanism can be a "quick disconnect" coupling mechanism such as a pin 970 and corresponding slot 975 which can facilitate coupling and decoupling the first and second members 960, 965. In some embodiments, the first and second members 960, 965 can be coupled and decoupled without the use of tools. As shown in the illustrated embodiment, the first member 960 can include the pin 970 which can extend laterally outward from a side surface 962 of the first member 960. The second member 965 can include the slot 975. This can allow the first and second members 960, 965 to be rotatably coupled. Other types of rotatable couplings can be used.

As shown in the illustrated embodiment, the first and second members 960, 965 can be shaped such that the first and second members 960, 965 can be maintained in at an angle between about 70 degree to about 150 degrees relative to each other, between about 80 degrees to about 130 degrees relative to each other, between about 90 degrees to about 110 degrees relative to each other, any sub-range within these ranges, generally perpendicular relative to each other, or any other angle as desired. For example, the front surface of the first member 960 can include a stop which can contact a surface of the second member 965 upon reaching a desired angle. In some embodiments, further rotation beyond this angle can allow the slot 975 to disengage the pin 970 thereby decoupling the first member 960 from the second member 965. This can beneficially reduce the likelihood of damage due to over-rotation of the seat pan 110. In some embodiments, the slot 975 can be disengaged from the pin 970 by applying a force on the second member 965 in a direction opposite the opening of the slot 975. For example, as shown in the illustrated configuration of FIG. 57, the second member 965 can be decoupled from the first member 960 by applying a force on the second member 965 in a vertical direction.

In some embodiments, the mount 950 can include features which can reduce or inhibit translational and/or rotational motion. For example, the mount 950 can include a protrusion 980 and a corresponding detent or recess (not shown) in which the protrusion 980 can be received. As shown in the illustrated embodiment, the first member 960 can include the protrusion 980 along an upper surface 964 of the first member 960. The second member 965 can include the detent or recess which can open downwardly of the bottom surface 967 of the second member 965. When the first and second members 960, 965 are coupled, the protrusion 980 can be received within the detent or recess which can inhibit translation in a horizontal plane and/or rotation along an axis perpendicular to the horizontal plane.

In some embodiments, an upper surface 969 of the second member 965 can be coupled to the bottom of the seat pan 110 such as via mechanical coupling mechanisms including clips, screws, hook-and-loop fasteners, chemical coupling mechanisms such as adhesives, any other coupling mechanism as desired, and/or any combination of coupling mechanisms. The upper surface 969 of the second member 965 can be correspondingly shaped to the bottom surface of the seat pan 110. For example, the upper surface 969 of the second member 965 can include a curve.

Figure 22:
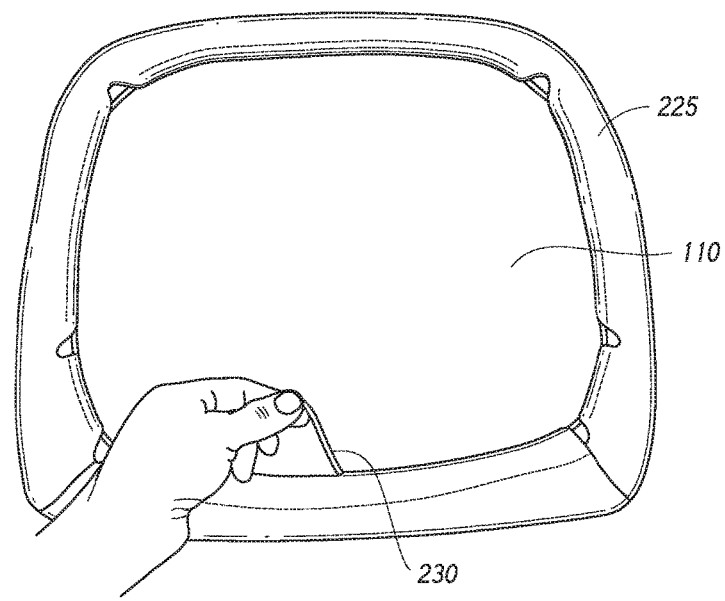
FIG. 22 is a bottom view of an embodiment of a seat pan and an upholstery cover.

With reference now to FIG. 22, in some embodiments an upholstery cover 225 can be removably coupled to the seat pan 110 using a draw string 230. As shown in the illustrated embodiment, the draw string 230 can extend along a periphery of the upholstery cover 225 such that the cross-sectional dimension of the periphery can be reduced by increasing tension in the draw string 230. This reduction in cross-sectional dimension can allow the upholstery cover 225 to be secured to the seat pan 110. A standard tensioner (not shown) and/or a string locking mechanism can be used to apply tension to and/or retain tension in the draw string 230 to lock the cover 225 in place Use of a draw string 230 coupling mechanism can beneficially facilitate installation of the cover 225 to the seat pan 110. Moreover, this can reduce and/or eliminate the use of Velcro on the cover 225 and the seat pan 110. Moreover, the draw string 230 can beneficially reduce variations, such as misalignment, wrinkles, and the like, between the upholstery covers on each seat.

Back Support

With reference now to FIGS. 6-12, in some embodiments the back support 115 can include a back support frame 300 and a cushioning member 305 which can be removably coupled to the back support frame 300 using a "quick disconnect" coupling mechanism. This can advantageously allow the cushioning member 305 to be quickly installed and/or removed for maintenance of the cushioning member 305 and/or portions underlying the cushioning member 305 such as the back support frame 300. Moreover, this can allow the cushioning member 305 to be assembled very quickly on an assembly line with consistent fit, form, and function.

Figure 6:
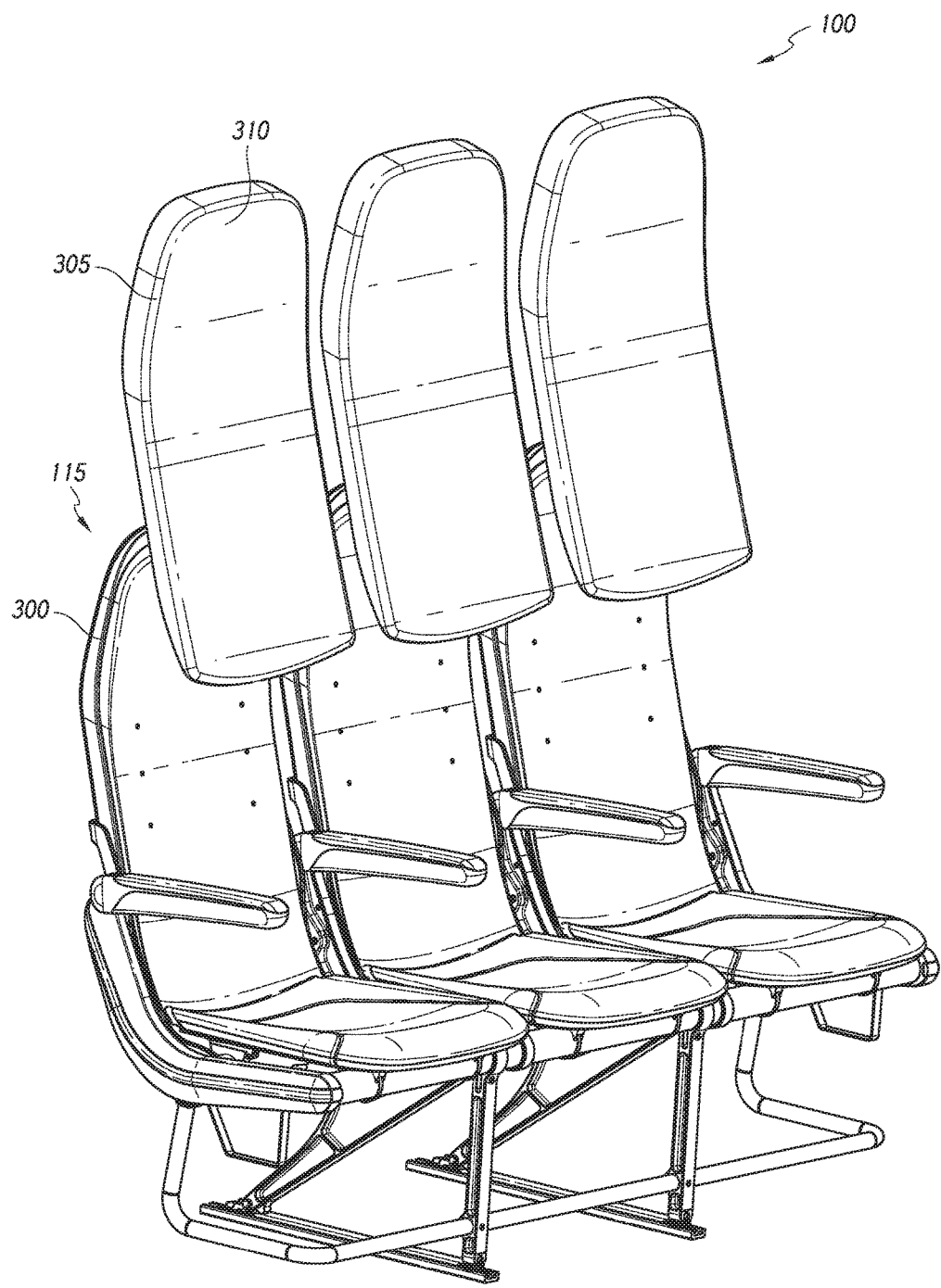
FIG. 6 is a front perspective view of an embodiment of an aircraft seating assembly with a removable cushioning member.
Figure 8:
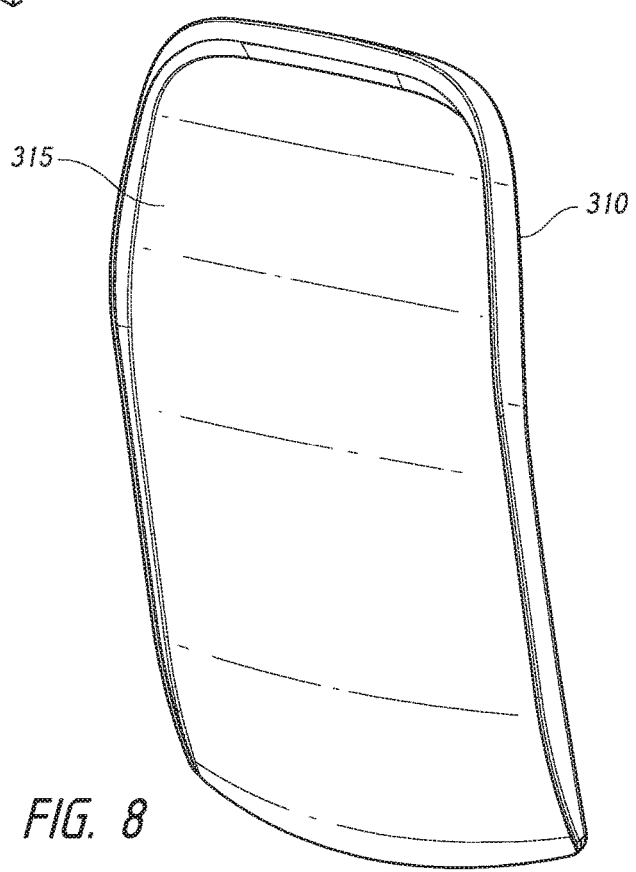
FIG. 8 is a rear perspective view of an embodiment of a cushioning member of the aircraft seating assembly of FIG. 6.

With reference to FIGS. 6 and 8, as shown in the illustrated embodiment, the cushioning member 305 can slide in from the top and couple to the back support frame 300. In some embodiments, the cushioning member 305 can include a cover 310 and a cushion frame 315. The cushion frame 315 can serve as a support structure for the cover 310. As shown in the illustrated embodiment, the cover 310 can be a soft, upholstered cloth cover; however, other types of materials can be used, such as foam cushion, or a combination of such materials. The cushion frame 315 can be relatively rigid or semi-rigid which can provide stiffness to the cover 310. The stiffness of the cushion frame 315 can allow the cushioning member 305 to retain its shape while still allowing some degree of compliancy to enhance passenger comfort.

One or more coupling members 320 can be used to couple the cushioning member 305 to the back support frame. In some embodiments, components of coupling members 320 can be attached to a rear portion of the cushion frame 315 and corresponding components of coupling members 320 can be attached to a front portion of the back support frame 300. In some embodiments, five to seven coupling members 320 can be used to ensure a secure connection between the cushioning member 305 and the back support frame 300 while still maintaining ease of installation and removal.

Figure 7:
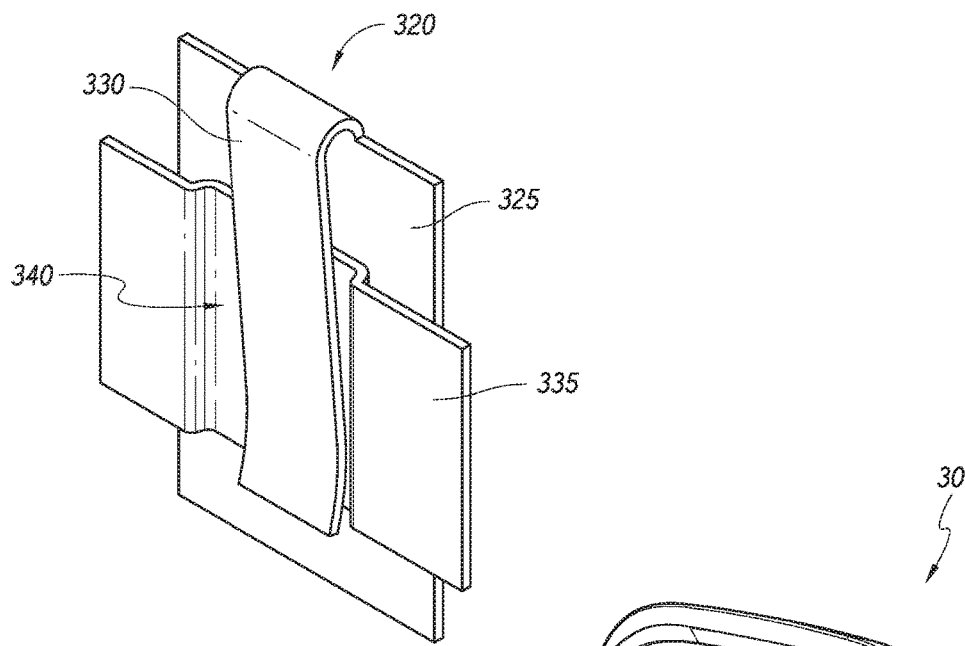
FIG. 7 is a perspective view of an embodiment of a coupling member for coupling a cushioning member with a back support frame.

With reference to FIG. 7, in some embodiments, the coupling member 320 can include a first member 325, such as a plate, having a hook 330 and a second member 335 having a corresponding receptacle 340 for receiving the hook 330. A set of first members 325 can be fastened, via a mechanical and/or chemical fastener, such as screws, bolts and/or adhesives, on a rear portion of the cushion frame 315 and a set of second members 335 can be fastened, via a mechanical and/or chemical fastener, such as screws, bolts and/or adhesives, on a front portion of the back support frame 300. In some embodiments, the coupling members 320 can include tabs, clips, keyways, pins, and/or slots in addition to, or in lieu of, the hook 330 and receptacle 340.

Figure 9:
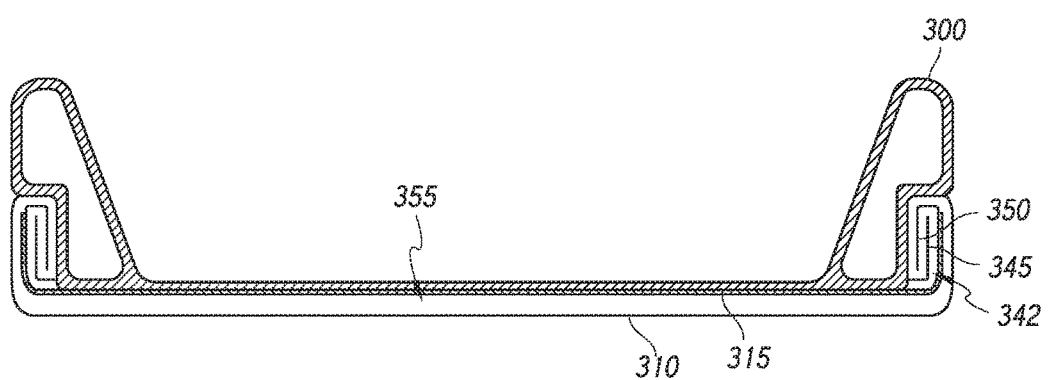
FIG. 9 is a cross-sectional view of a seat of the aircraft seating assembly of FIG. 6.
Figure 10:
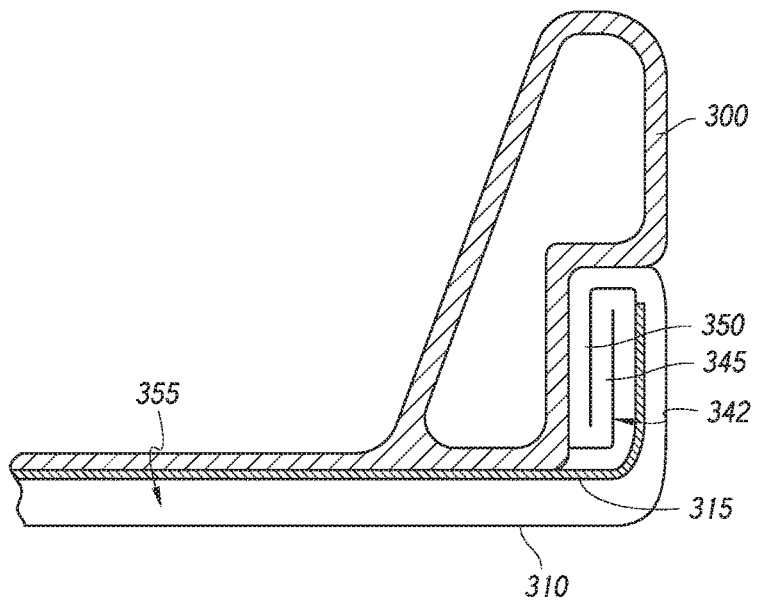
FIG. 10 is an enlarged view of the cross-sectional view of FIG. 9.
Figure 11:
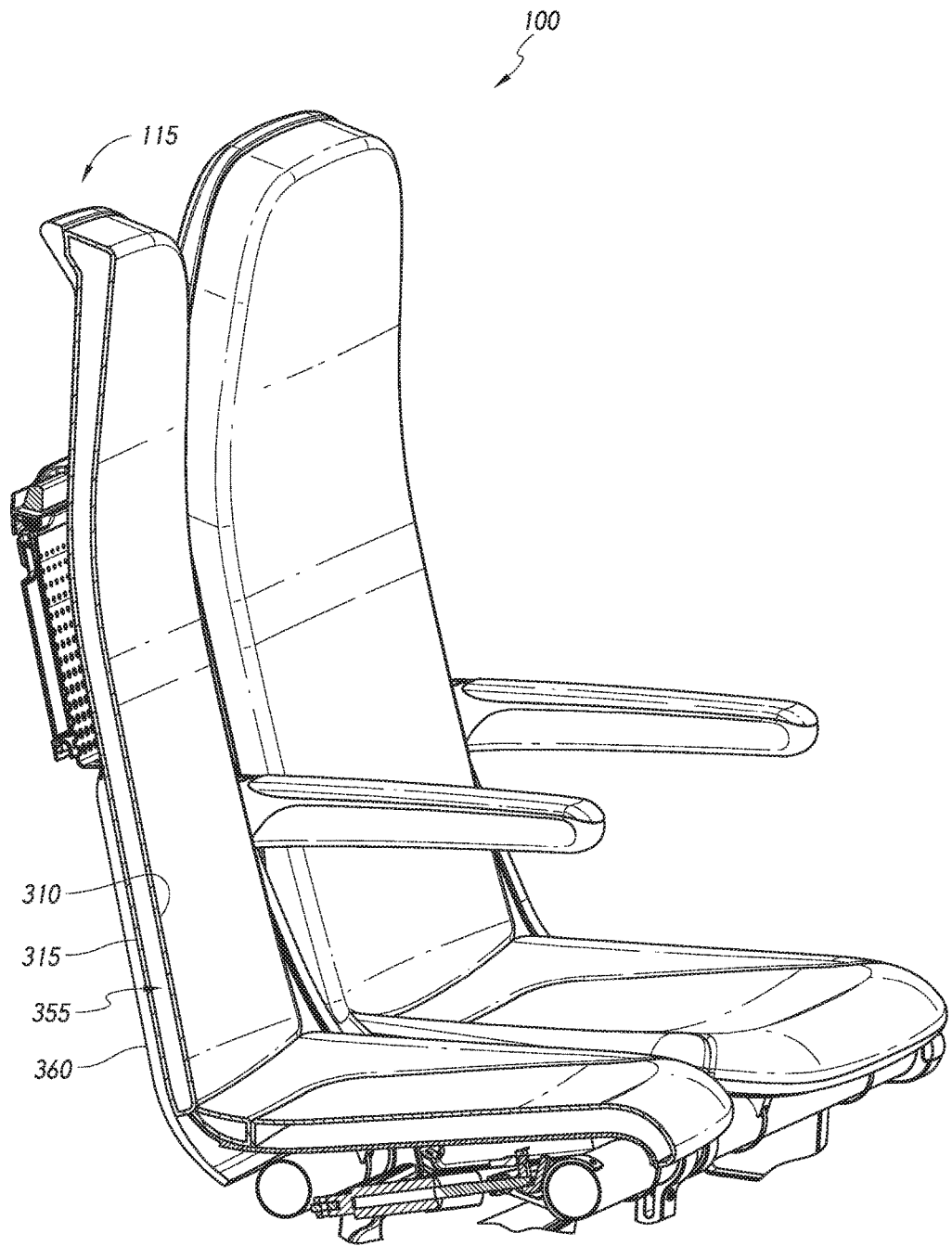
FIG. 11 is a cross-sectional view of an embodiment of the aircraft seating assembly of FIG. 6.
Figure 12:
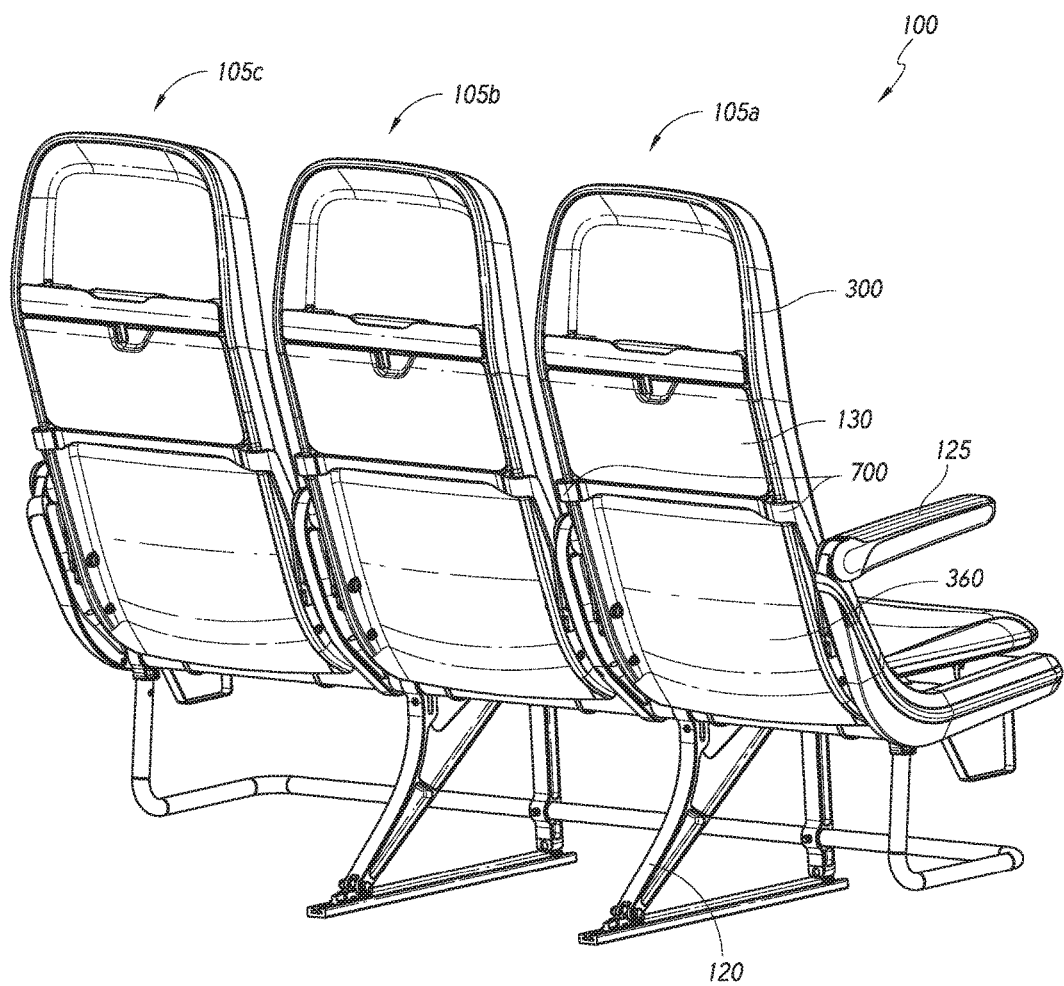
FIG. 12 is a rear perspective view of the aircraft seating assembly of FIG. 1.
Figure 13:
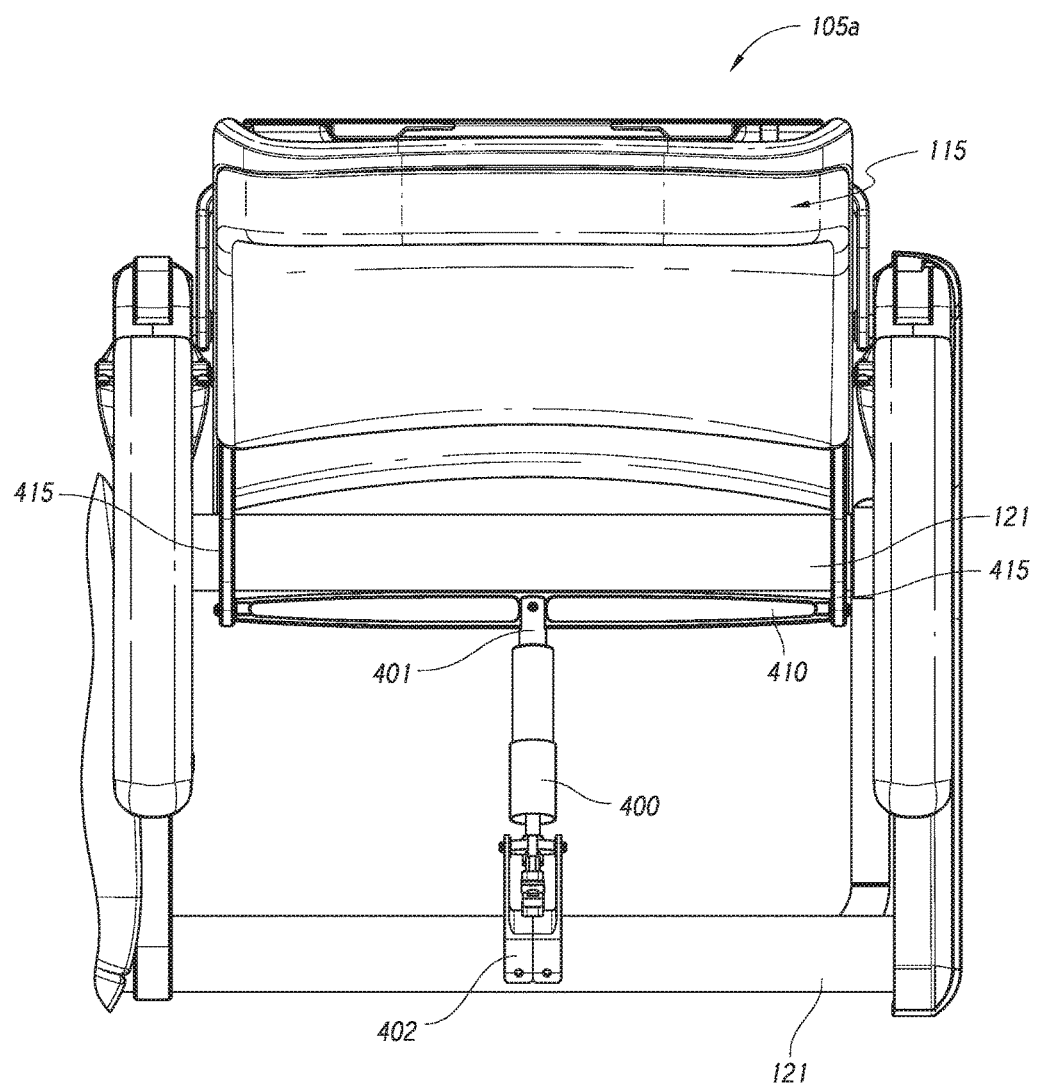
FIG. 13 is a top view of a tilt system of an aircraft seat.

With reference to FIGS. 9-11, in some embodiments the back support 115 can include a locking channel 342. As shown in the illustrated embodiment, the locking channel 342 can be positioned along side portions of the back support frame 300. For example, the back support frame 300 can include a locking member 345, such as a rail, which cooperates with a corresponding locking member 350, such as a corresponding rail, of the cushioning member 305. The locking member 350 can extend from the cushion frame 315. In some embodiments, the locking members 345, 350 can include corresponding features to retain the two members 345, 350 in a certain position. For example, the locking members 345, 350 can include snap-fit connections, detents, protrusions, and other types of connectors. In some embodiments, the locking members 345, 350 can serve as alignment members with the back support frame 300 and cushioning member 305 being retained in a certain position via other locking mechanisms, such as the coupling members 320. This can advantageously facilitate the process of coupling the cushioning member 305 to the back support frame 300 together via the coupling members 320.

In some embodiments, the cover 310 can be positioned relative to the cushion frame 315 such that a gap 355 is present between the cover 310 and the cushion frame 315. This gap 355 can allow the cushion frame 315 to deflect in response to forces applied to the cover 310, for example, by a seated passenger. As shown in the illustrated embodiment, this arrangement of the cover 310 and cushion frame 315 can allow a degree of flexibility around the lumbar area. The rigidity of the cushion frame 315 and/or the cushioning member 310, as well as the positioning of the cushioning member 310 relative to the cushion frame 315, can be advantageously selected to provide a desired amount of flexibility in the lumbar area.

In some embodiments, the back support 115 can include a wall portion 360 positioned rearward of the cushion frame 315. The wall portion 360 can be sufficiently rigid such that it can reduce the likelihood that a passenger seated behind the occupant of the seat 105a can contact the cushion frame 315 thereby potentially causing movement of the cushioning member 305 and affecting the passenger seated on the cushioning member 305. In some embodiments, the wall portion 360 can be formed from a more rigid material and/or include structures to increase rigidity. In some embodiments, the material can be similar to the cushion frame 315 but manufactured to be thicker. As shown in the illustrated embodiment, the wall portion 360 is separate and independent of the cushioning member 310 and the cushion frame 315. As such, contact with the wall portion 360 would likely not impact the comfort of the seated passenger.

Figures 23, 24:
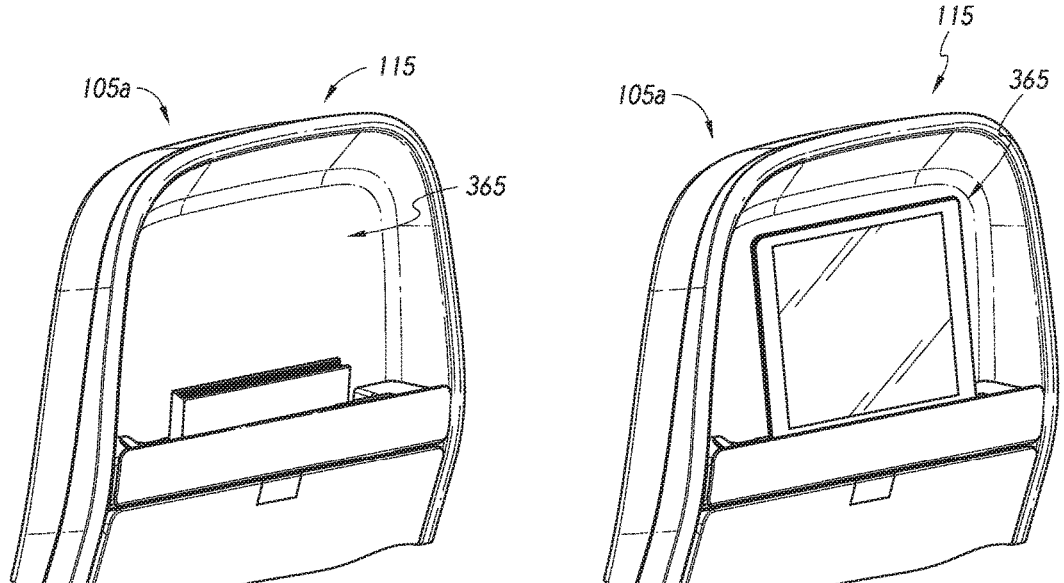
FIG. 23 is a rear perspective view of another embodiment of an aircraft seat.
FIG. 24 is a rear perspective view of another embodiment of an aircraft seat with a personal electronic device retained on a retention system.
Figure 25:
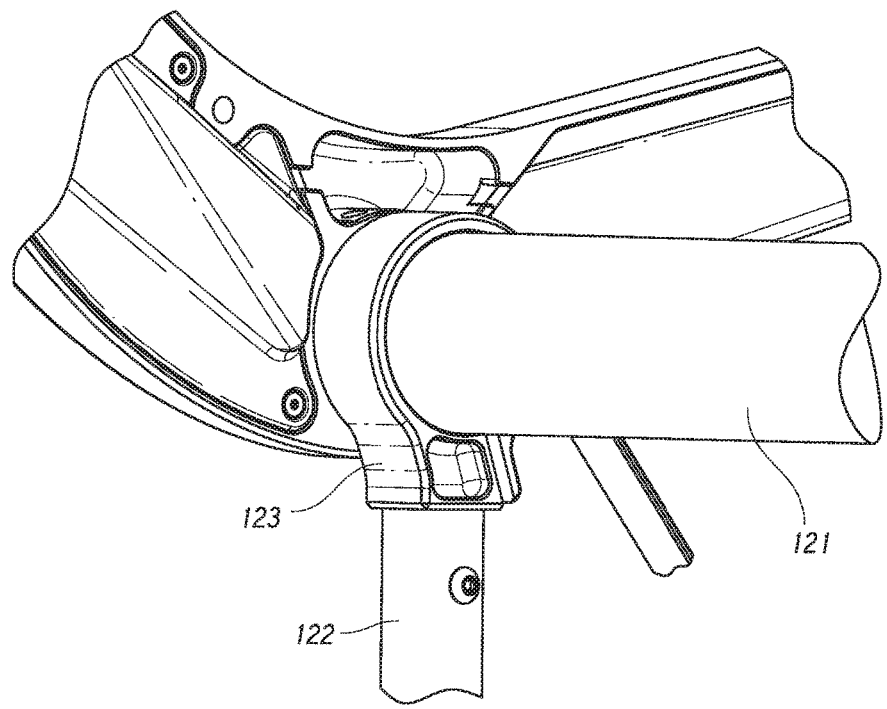
FIG. 25 is a rear perspective view of an embodiment of a mount for coupling a baggage bar to a connection frame.
Figure 26:
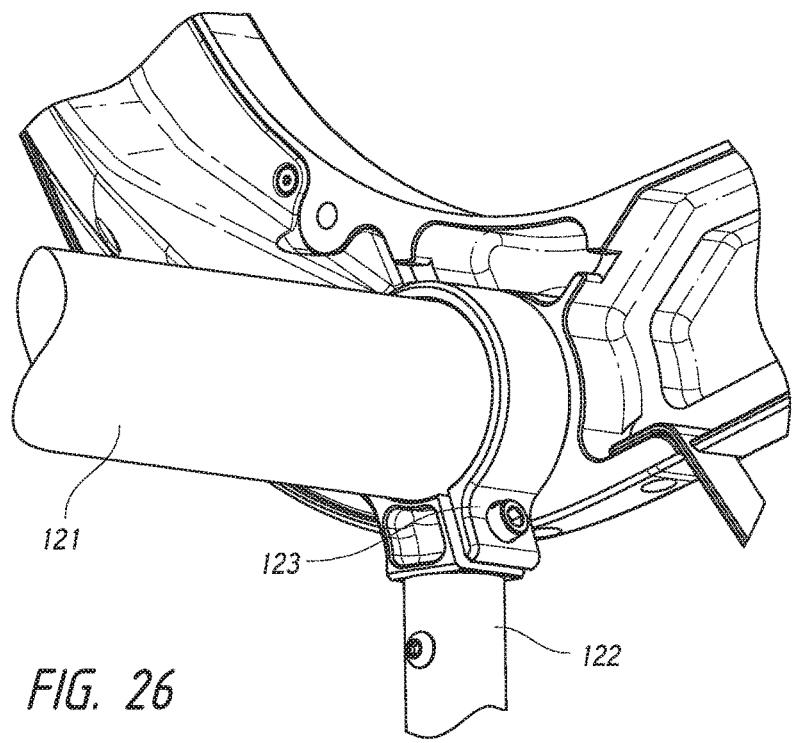
FIG. 26 is a front perspective view of the mount of FIG. 25.

With reference now to FIGS. 23 and 24, the back support 115 can include a desirably recessed area 365. This can advantageously provide provides usable space that has little impact to passenger living space behind the seat. In some embodiments, the open area 365 can be for airline/operator use to store miscellaneous literature, magazines, or safety briefing cards. In some embodiments, the open area 365 can be for passenger use to temporarily store personal items, such as personal electronic devices: tablets, phones, e-readers, media players, or items that could be held while the tray table is being used. In some embodiments, the open area 365 can also house integrated seat options such as in-flight entertainment (ife) components (video monitor, usb, audio jacks, credit card reader, handsets, etc.).

Tilt System

Figure 14A:
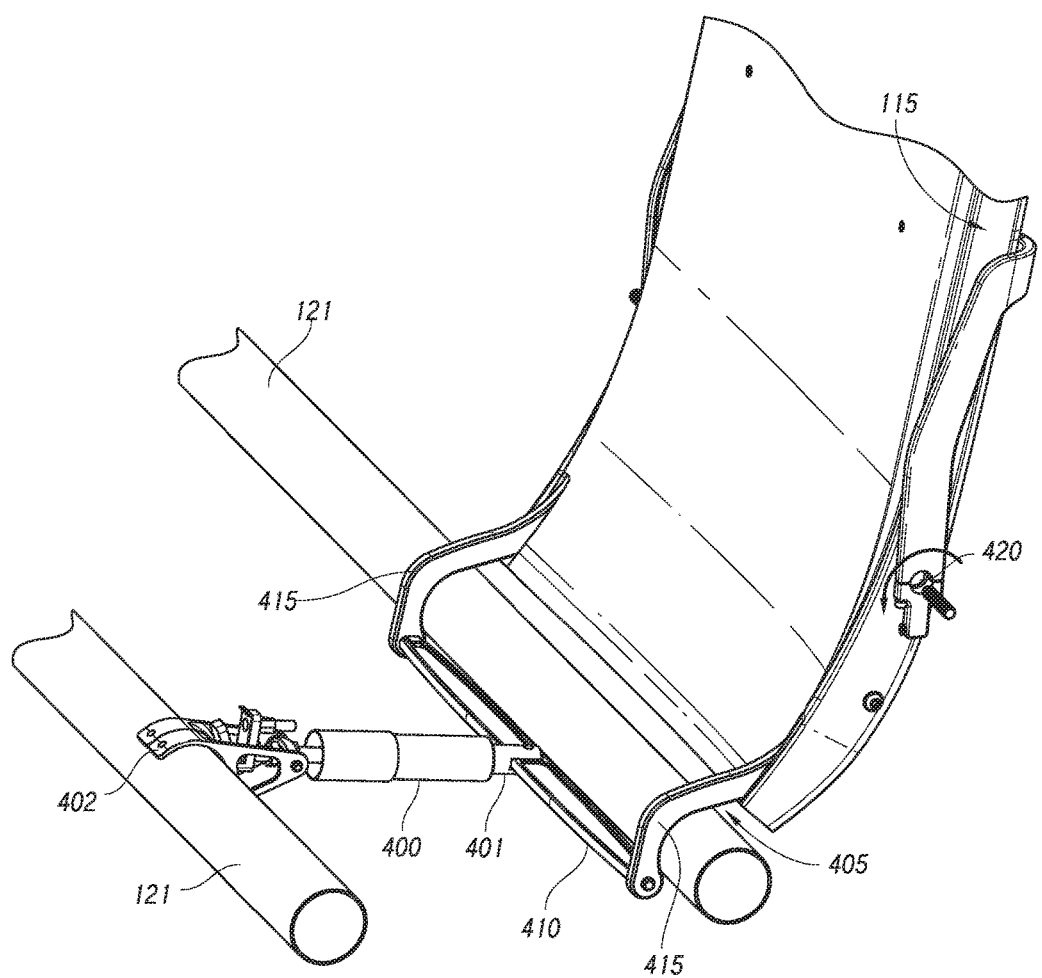
FIG. 14A is a perspective view of the tilt system of FIG. 13.
Figure 14B:
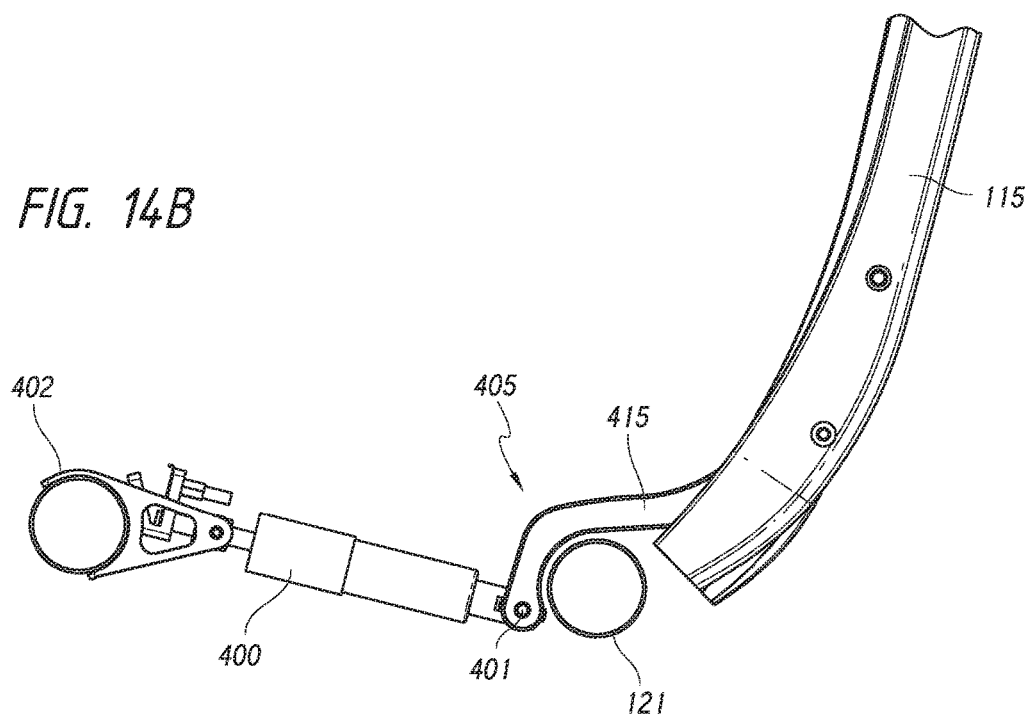
FIG. 14B is a side view of the tilt system of FIG. 13 in a first position.
Figure 14C:
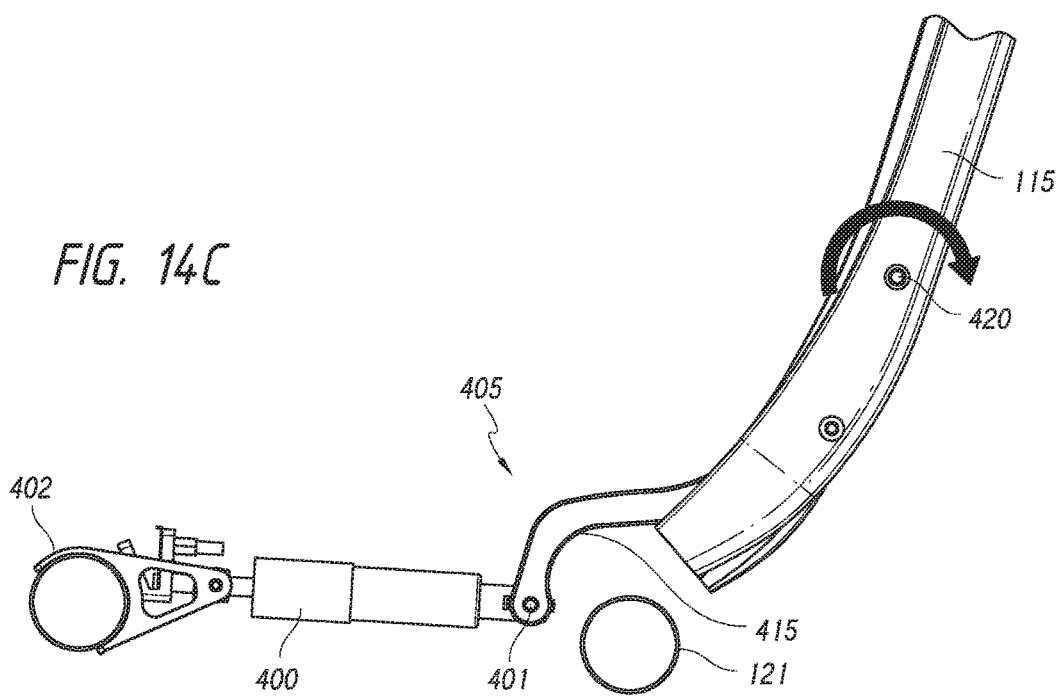
FIG. 14C is a side view of the tilt system of FIG. 13 in a second position.

With reference now to FIGS. 13 and 14A-D, in some embodiments the aircraft seating assembly 100 can include a movement subassembly such as a tilt system which can allow portions of a seat, such as back support 115, to rotate relative to other portions of the seat. This can be beneficial in allowing the back support 115 to recline thereby enhancing passenger comfort. In some embodiments, the tilt system can include an actuator 400 for controlling the change in tilt or angular orientation of the back support 115. For example, the tilt system can allow the back support 115 to transition from a standard, upright position as shown in FIG. 14B to a reclined position as shown in FIG. 14C. In some embodiments, the actuator 400 can be activated to allow tilting of the back support 115 by pressing a button on the seat.

As shown in the illustrated embodiment, the actuator 400 can be attached to a pivot member 405 at a first end 401 of the actuator 400 and to a portion of the connection frame 120, such the tube 121, at a second end 402 of the actuator 400. As shown in the illustrated embodiment, the pivot member 405 can include a cross bar 410 and quadrants 415. The actuator 400 can be attached to the cross bar 410 and the quadrants 415 can be positioned over a portion of the connection frame 120, such as the tube 121, and be pivotally coupled to the back support 115 at a pivot location 420 of the back support 115. As shown in the illustrated embodiment, when the back support 115 is at least partially in a reclined position, the quadrants 415 can be positioned further outward from the tube 121. In some embodiments, the actuator 400 can be activated to allow tilting of the back support 115 by pressing a button on the seat.

As shown in the illustrated embodiment, the actuator 400 can be centrally located relative to a width of the seat 105a which can advantageously allow for a more equalized distribution of forces on components of the tilt system during tilting of the back support 115 and head impact. Moreover, the centralized location of the actuator 400 can advantageously allow for a more symmetric back support 115 and assembly design. Additionally, as shown in the illustrated embodiment, the tilt system can be independent from the seat pan 110 and thus does not require the bottom pan to articulate when the back support 115 is articulated. In some embodiments, the actuator 400 can be positioned within a middle portion of the seat, such as a middle half of the seat with a quarter of the width on both sides of the middle half. In some embodiments, the actuator 400 can be positioned within a middle portion of the seat, such as a middle third of the seat with a third of the width on both sides of the middle third. In some embodiments, the actuator 1000 can be positioned within a middle portion of the seat, such as a middle quarter of the seat.

The tilt system can also serve as an energy absorbing system for the seat 105a. For example, the tilt system allows the back support 115 to rotate forward when subject to a forwardly directed force on a rearward portion of the back support 115. This can be caused, for example, by the head of a passenger seated behind the seat 105a striking the back support 115, such as during abrupt movements of the aircraft. Accordingly, by allowing the back support 115 to rotate forward when subject to such a force, the force applied to the passenger's head can be reduced.

Figure 14D:
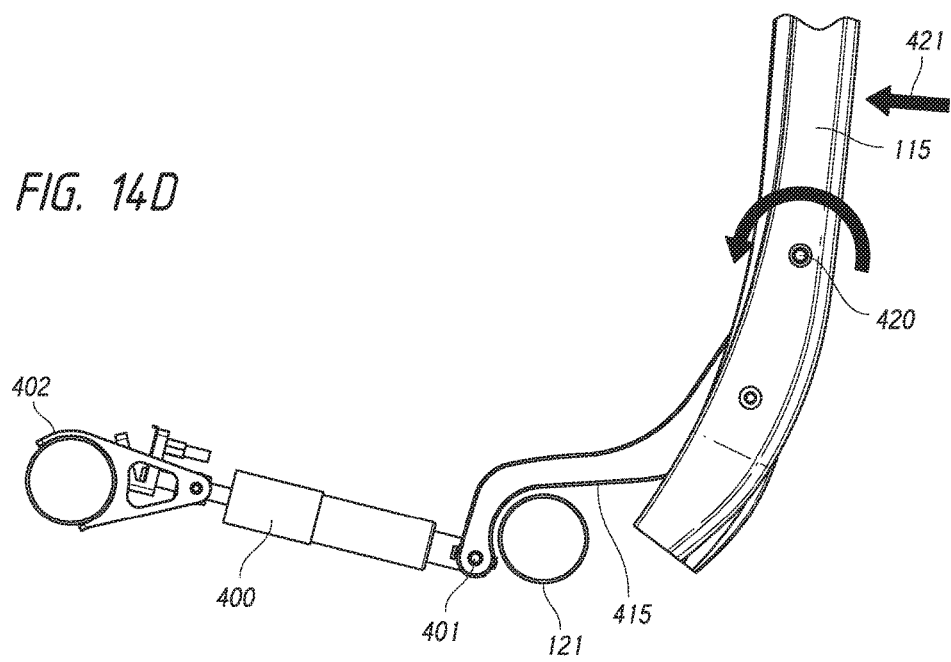
FIG. 14D is a side view of the tilt system of FIG. 13 in third position.
Figure 15:
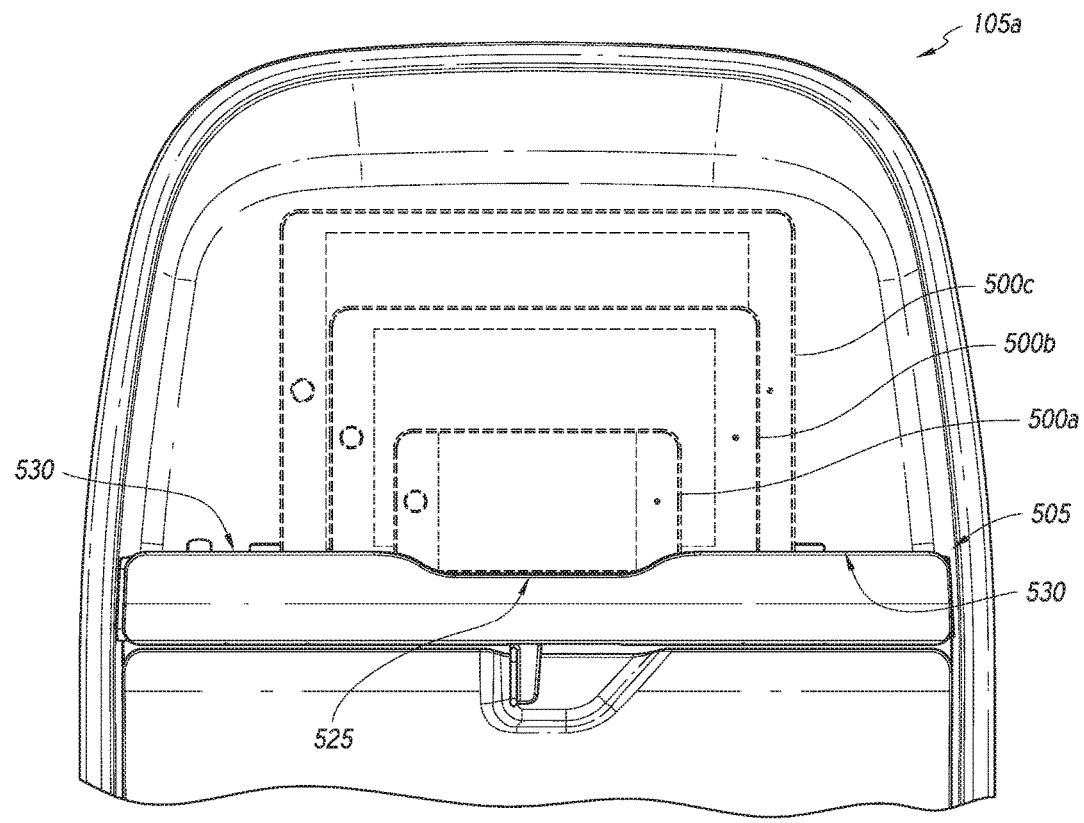
FIG. 15 is a rear view of an embodiment of a retention system of an aircraft seat.
Figure 16:
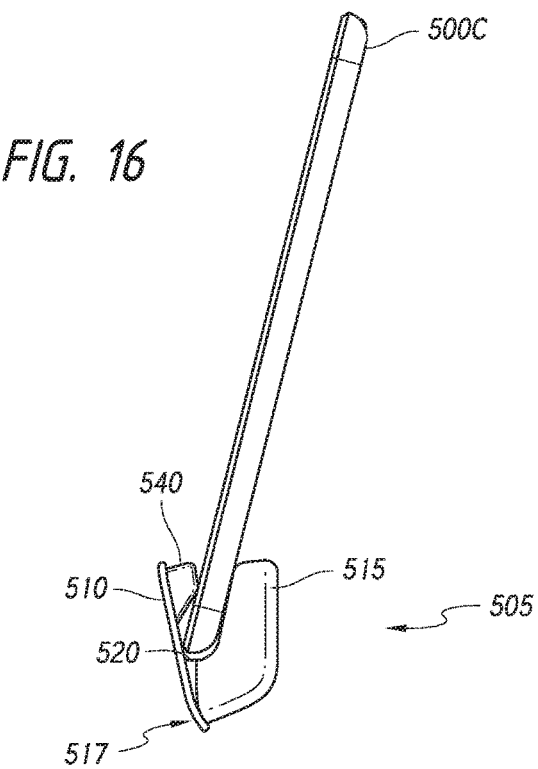
FIG. 16 is a side view of the retention system of FIG. 15.

As shown in the illustrated embodiment, the geometry of the quadrants 415 is designed to limit rotation when the quadrants 415 contact the aft base tube 121. With reference particularly to FIG. 14D, in the event of a frontwardly-directed force 421 being applied to the back support 115, the back support 115 can pivot in a frontward direction which is further frontward than the standard, upright position illustrated in FIG. 14B. In such an event, the quadrants 415 can contact the base tube 121 while still allowing the back support 115 to pivot further frontward to displace and/or absorb additional energy imposed by the frontwardly-directed force 421. In some embodiments, the quadrants 415 can contact the base tube 121 while in the standard, upright position. This can advantageously isolate movements to the back support 115 and the quadrants 415 and can relieve downstream components (cross bar 410, actuator 400, etc.) of some, if not a majority, of such forces. This reduction in parts subjected to significant forces, as well as the symmetric geometry of the system, provides more consistent, reliable, and predictable energy absorbing qualities.

With reference now to FIGS. 58-62, in some embodiments the tilt system can include an actuator 1000 for controlling the change in tilt or angular orientation of the back support 115. The tilt system can include the same, or similar, structures and features to the tilt system described above in connection with FIGS. 13 and 14A-D. For example, the tilt system can allow the back support 115 to transition from a standard, upright position similar to that shown in FIG. 14B to a reclined position similar to that shown in FIG. 14C. In some embodiments, the actuator 1000 can be activated to allow tilting of the back support 115 by pressing a button on the seat.

As shown in the illustrated embodiment, the actuator 1000 can be attached to a pivot member 1005 at connection location 1001 of the actuator 1000. The actuator 1000 can be positioned within a carrier 1002 which can be attached to tubes 121, such as a fore tube 121 and an aft tube 121. The carrier 1002 can be attached to one or both tubes 121 via a clamp. This can beneficially retain the positioning of the actuator 1000 such that the actuator 1000 is retained within the same plane when transitioned from an upright position to a reclined position and from the reclined position to the upright position. This can beneficially increase the usable storage area beneath the actuator 1000 as the actuator 1000 does not rotate or pivot when the tilt system is used. In some embodiments, use of a carrier 1002 can enhance the robustness of the tilt system.

As shown in the illustrated embodiment, the pivot member 1005 can include a cross bar 1010 and quadrants 1015. In some embodiments, the cross bar 1010 can be rotatably coupled at ends 1012 to the quadrants 1015. This can allow the cross bar 1010 to rotate relative to the quadrants 1015. In some embodiments, the cross bar 1010 can be movably coupled to the carrier 1002. For example, the cross bar 1010 can be translatably coupled to the carrier 1002 via use of a fastener 1014 which can slide within a slot 1004 of the carrier 1002. The actuator 1000 can be attached to the cross bar 1010 and the quadrants 1015 can be positioned over a portion of the connection frame 120, such as the tube 121 including but not limited to the aft tube 121. The quadrants 1015 can be pivotally coupled to the back support 115 at a pivot location 1020.

As shown in the illustrated embodiment, the actuator 1000 can be centrally located relative to a width of the seat 105a which can advantageously allow for a more equalized distribution of forces on components of the tilt system during tilting of the back support 115 and head impact. Moreover, the centralized location of the actuator 1000 can advantageously allow for a more symmetric back support 115 and assembly design. In some embodiments, the tilt system can be independent from the seat pan 110 and thus does not require the bottom pan to articulate when the back support 115 is articulated. In some embodiments, the actuator 1000 can be positioned within a middle portion of the seat, such as a middle half of the seat with a quarter of the width on both sides of the middle half. In some embodiments, the actuator 1000 can be positioned within a middle portion of the seat, such as a middle third of the seat with a third of the width on both sides of the middle third of the seat. In some embodiments, the actuator 1000 can be positioned within a middle portion of the seat, such as a middle quarter of the seat.

Figure 59:
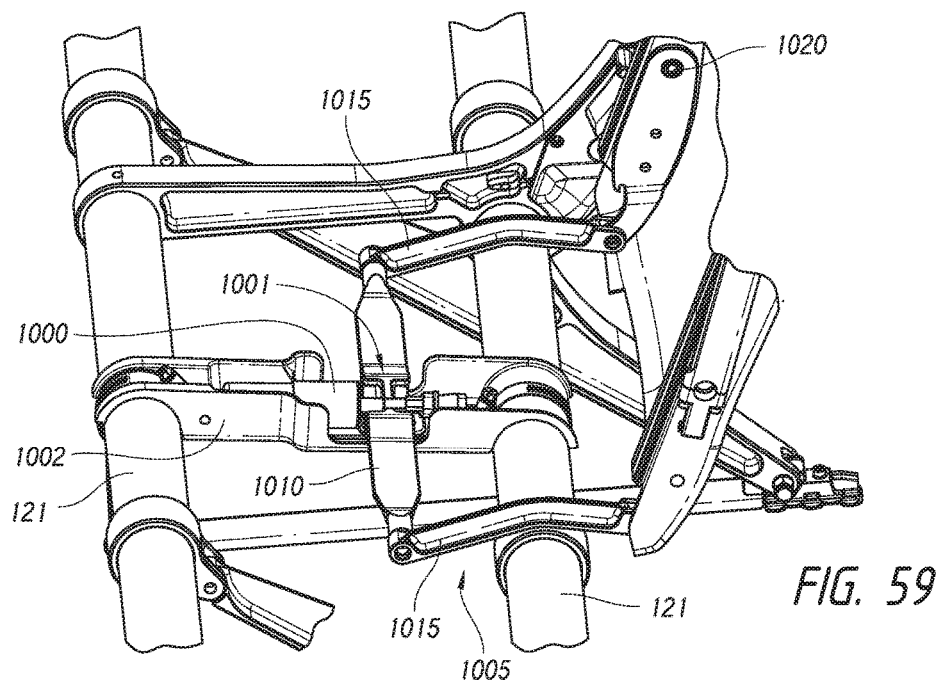
FIG. 59 is a top perspective view of the tilt system of FIG. 58 in a first position.
Figure 60:
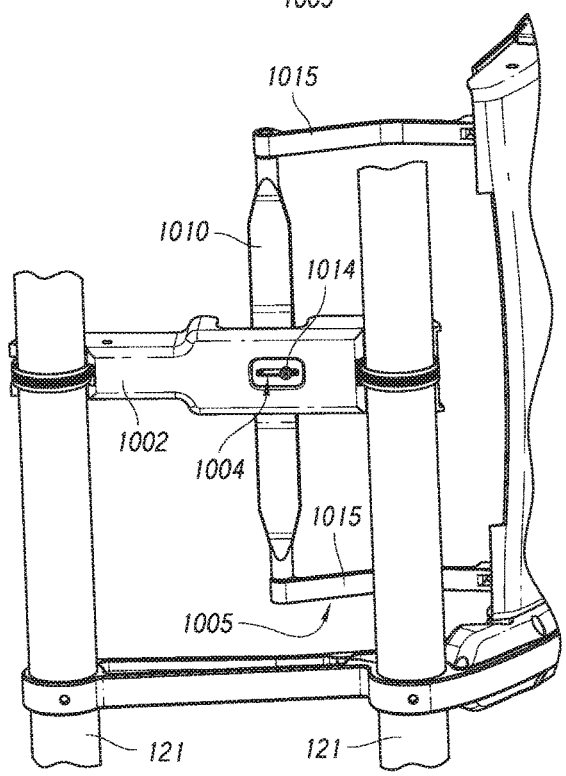
FIG. 60 is a bottom perspective view of the tilt system of FIG. 58 in a first position.
Figure 61:
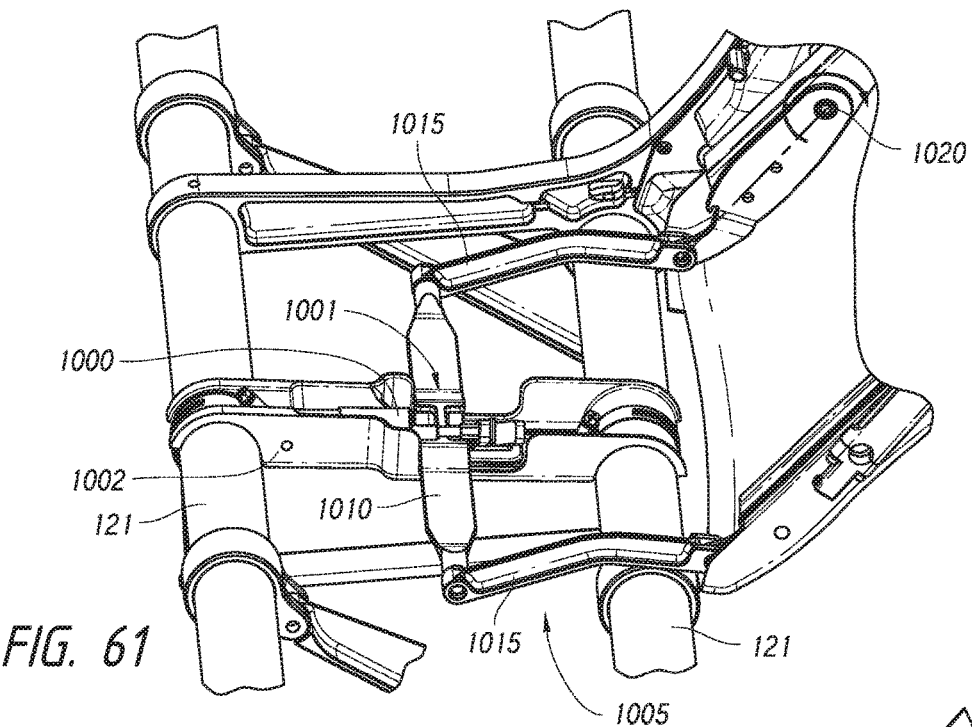
FIG. 61 is a top perspective view of the tilt system of FIG. 58 in a second position.
Figure 62:
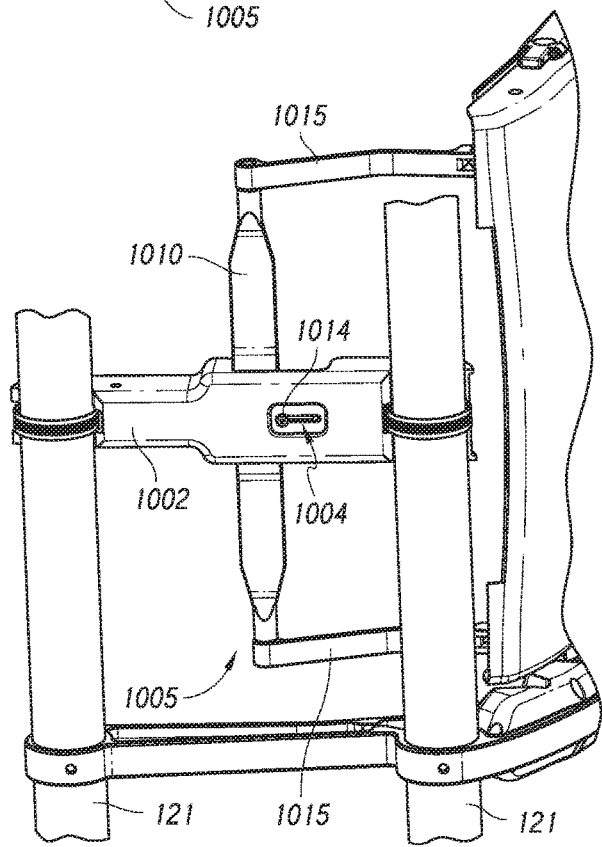
FIG. 62 is a bottom perspective view of the tilt system of FIG. 58 in a second position.

FIGS. 59 and 60 illustrate the positioning of actuator 1000, connection location 1001, and the pivot member 1005 when the back support 115 is in an upright position. FIGS. 61 and 62 illustrate the positioning of actuator 1000, connection location 1001, and the pivot member 1005 when the back support 115 is in an upright position. As shown in these Figures, during the transition of the back support 115 from the upright position to the reclined position, the cross member 1010 of the pivot member 1005 can translate frontwards towards the fore tube 121. When the back support 115 is transitioned back to the upright position from the reclined position, the cross member 1010 of the pivot member 1005 can translate rearwards towards the aft tube 121. The tilt system can also serve as an energy absorbing system for the seat 105a similar to that described above in connection with FIGS. 14A-14D.

Retention System

With reference now to FIGS. 15-21, the aircraft seating assembly 100 can include a retention system, such as retention system 505, to retain an object therein. For example, the retention systems can be used to retain a personal electronic device (PED), including small-sized PEDs such as a phone 500a, a medium-sized PED such as a mini tablet 500b, and/or a large-sized PED such as a full-size tablet 500c. Preferably, the retention systems are positioned such that the object retained within the retention system are within a seated passenger's line of sight; however, the retention systems can also be positioned at other locations of the seat. As shown in the illustrated embodiments, the retention systems are positioned along an upper portion of the seat 105a.

With reference to FIGS. 15-17A, the retention system 505 can include a clamp member 510 coupled to a base member 515. The base member 515 can be attached to a portion of the seat 105a, such as the back support 115. In the illustrated embodiment, the first end 517 of the clamp member 510 can be rotatably coupled to the base member 515 and can include a biasing member such that the clamp member 510 is biased towards a closed or clamped position. For example, the clamp member 510 can include a hinge portion 518 having an aperture 519 through which a rotatable coupling can be received for coupling the clamp member 510 to the base member 515. As shown in the illustrated embodiment, the clamp member 510 can include protrusion 520 which can serve as a surface upon which the object, such as personal electronic device 500c, can rest. In some embodiments, such as that illustrated in FIG. 19, the clamp member 510 can be rotatably attached to the base member 515 along a portion of the clamp member 510 between the first end 517 and second end 521 of the clamp member 510.

In some embodiments, the clamp member 510 can include a lower portion 525. This lower portion 525 can beneficially reduce the likelihood that the clamp member 510 will block a passenger's view of the object, such as a screen of a PED, when the object is retained by the clamp member 510. As shown in the illustrated embodiment, the lower portion 525 can be positioned centrally along the clamp member 510 as a passenger may be likely to position the PED centrally relative to the width of the clamp member 510; however, the lower portion 525 can be positioned along other portions of the clamp member 510 as desired. The clamp member 510 can include one or more raised portions 530 which can facilitate a passenger's grasping of the clamp member 510 to rotate the clamp member 510 relative to the base member 515 in order to insert an object into the retention system 505 and/or remove an object from the retention system 505.

Figure 17A:
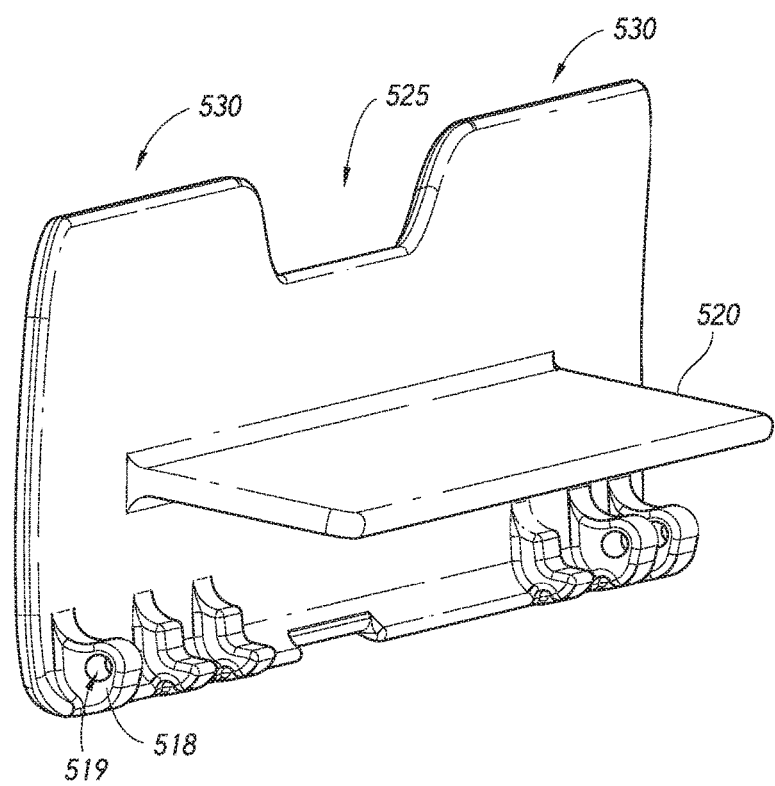
FIG. 17A is a side perspective view of an embodiment of a clamp member of the retention system of FIG. 15.
Figure 17B:
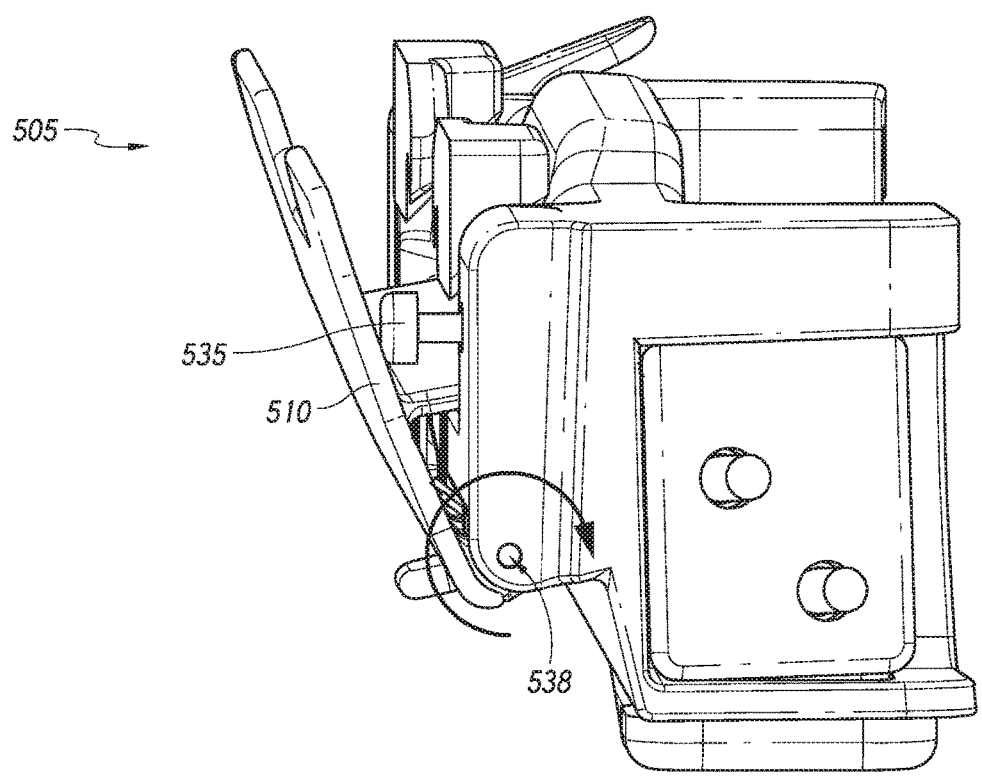
FIG. 17B is a side perspective view of an embodiment of a damper system of the retention system of FIG. 15.
Figure 63:
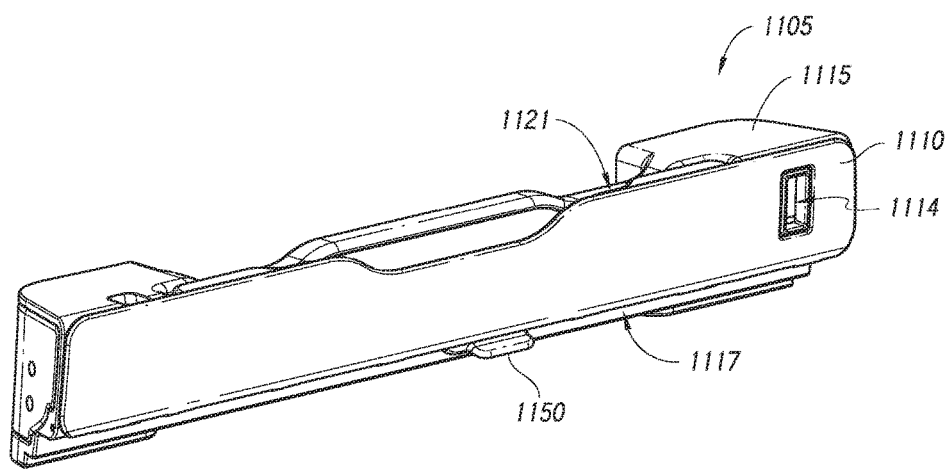
FIG. 63 is a front perspective view of another embodiment of a retention system.

With reference to FIG. 17B, in some embodiments the retention system 505 can include one or more dampers 535. In some instances, the dampers 535 can be used in conjunction with biasing members to apply a force in a direction opposite that of the force applied by a biasing member of the retention system 505. This can advantageously control the velocity, and the force, of the clamp member 510 thereby reducing the likelihood of damage to objects positioned within the retention system 505. In the illustrated embodiment, the damper 535 is a linear damper attached to the base member 515. In some embodiments, the damper 535 can be one or more rotational damper 1135 (as shown in FIG. 63). The rotational damper can be positioned along, or to rotate along, an axis of rotation 538 of the clamp member 510.

With reference to FIG. 18, in some embodiments the clamp member 510 can include one or more raised ridges 540 projecting outwardly from an inner surface of the clamp member 510. In some embodiments, the raised ridges 540 can have a first thickness along a first portion 545 of the ridge 540 and a second thickness along a second portion 550 of the ridge 540. As shown in the illustrated embodiment, the first thickness can be less than the second thickness. This can beneficially allow the clamp member 510 to more securely retain a wider range of PED sizes. In some embodiments, the raised ridges 540 can include additional thicknesses along other portions. In some embodiments, the raised ridges 540 can have a constant thickness throughout. In some embodiments, the one or more ridges 540 can be formed from a material having a low shore hardness, such as rubber, to reduce the likelihood of scratching surfaces of the object. In some embodiments, the one or more ridges 540 can be formed from a material having a high friction coefficient to more strongly secure the object to the retention system 505.

Figure 64:
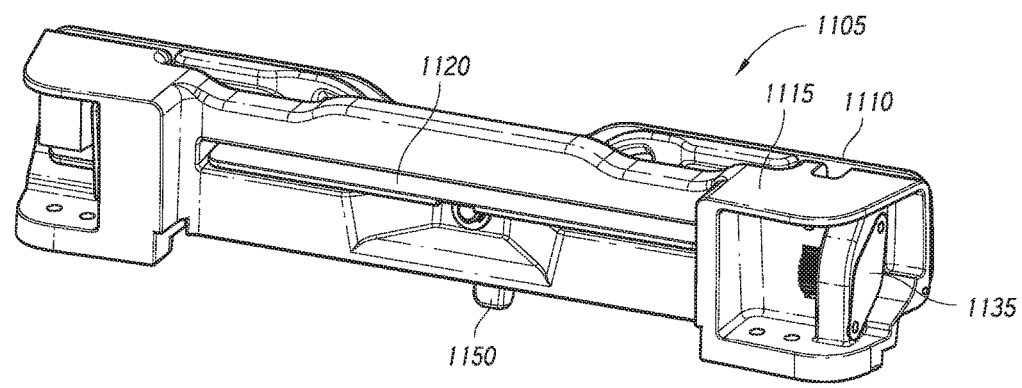
FIG. 64 is a rear perspective view of the retention system of FIG. 63.
Figure 65:
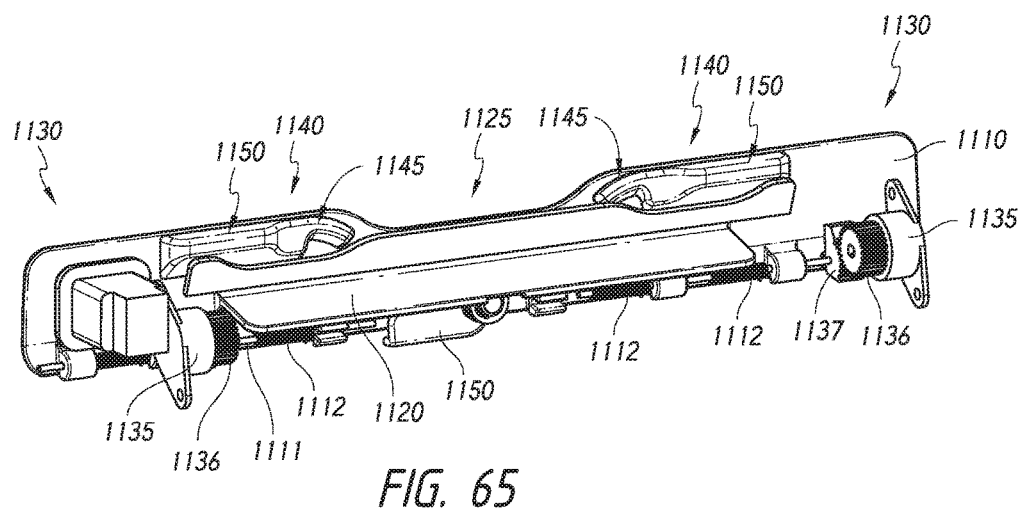
FIG. 65 is a rear perspective view of an embodiment of a clamp of the retention system of FIG. 63.

With reference to FIGS. 63-65, the retention system 1105 can include a clamp member 1110 coupled to a base member 1115. The retention system 1105 can include the same, or similar, structures and features to the retention systems 505 described above. The base member 1115 can be attached to a portion of the seat 105*a*, such as the back support 115. In the illustrated embodiment, the first end 1117 of the clamp member 1110 can be rotatably coupled to the base member 1115. The clamp member 1110 can include a shaft 1111 at or proximate the first end 1117 to rotatably couple the clamp member 1110 to the base member 1115. The clamp member 1110 can include a biasing member such that the clamp member 1110 is biased towards a closed or clamped position. For example, one or more biasing members 1112, such as a torsion springs, can form part of the rotatable coupling. As shown in the illustrated embodiment, the one or more biasing members 1112 can be in line with the shaft 1111. In some embodiments, the clamp member 1110 can be rotatably attached to the base member 1115 along a portion of the clamp member 1110 between the first end 1117 and second end 1121 of the clamp member 1110 similar to that illustrated in FIG. 19. The clamp member 1110 can include a latch 1150.

As shown in the illustrated embodiment, the clamp member 1110 can include protrusion 1120 which can serve as a surface upon which the object, such as personal electronic device 500*c*, can rest. The clamp member 1110 can include a one or more ports 1114 which can provide a power and/or data connection. For example, the one or more ports 1114 can be a power outlet, a USB port, and the like. This can advantageously allow a user to plug in their personal electronic device to the seat.

With reference to FIG. 65, in some embodiments, the clamp member 1110 can include a lower portion 1125. This lower portion 1125 can beneficially reduce the likelihood that the clamp member 1110 will block a passenger's view of the object, such as a screen of a PED, when the object is retained by the clamp member 1110. As shown in the illustrated embodiment, the lower portion 11125 can be positioned centrally along the clamp member 1110 as a passenger may be likely to position the PED centrally relative to the width of the clamp member 1110; however, the lower portion 1125 can be positioned along other portions of the clamp member 1110 as desired. The clamp member 1110 can include one or more raised portions 1130 which can facilitate a passenger's grasping of the clamp member 1110 to rotate the clamp member 1110 relative to the base member 1115 in order to insert an object into the retention system 1105 and/or remove an object from the retention system 1105.

In some embodiments the clamp member 1110 can include one or more raised ridges 1140 projecting outwardly from an inner surface of the clamp member 1110. In some embodiments, the raised ridges 1140 can have a first thickness along a first portion 1145 of the ridge 1140 and a second thickness along a second portion 1150 of the ridge 1140. As shown in the illustrated embodiment, the first thickness can be less than the second thickness. This can beneficially allow the clamp member 1110 to more securely retain a wider range of PED sizes. In some embodiments, the raised ridges 1140 can include additional thicknesses along other portions. In some embodiments, the raised ridges 1140 can have a constant thickness throughout. In some embodiments, the one or more ridges 1140 can be formed from a material having a low shore hardness, such as rubber, to reduce the likelihood of scratching surfaces of the object. In some embodiments, the one or more ridges 1140 can be formed from a material having a high friction coefficient to more strongly secure the object to the retention system 1105.

In some embodiments the retention system 1105 can include one or more dampers 1135. In some instances, the one or more dampers 1135 can be used in conjunction with one or more biasing members 1112 to apply a force in a direction opposite that of the force applied by a biasing member of the retention system 1105. This can advantageously control the velocity, and the force, of the clamp member 1110 thereby reducing the likelihood of damage to objects positioned within the retention system 1105. In the illustrated embodiment, the damper 1135 is a rotational damper attached to the base member 1115. A rotational damper 1135 can be beneficial in that it can apply a relatively constant amount of damping throughout the range of motion of the clamp member 1110.

In the illustrated embodiment, the damper 1135 can have a rotatable member 1136 which engages with a ramped feature 1137 of the clamp member 1110. The rotatable member 1136 can rotate as the clamp member 1110 is pivoted relative to the base member 1115. In some embodiments, the rotatable member 1136 and the ramped feature 1137 can include engagement structures, such as teeth, to reduce the likelihood of slippage between the rotatable member 1136 and the ramped feature 1137. In some embodiments, the damper 1135 can be positioned along, or to rotate along, an axis of rotation of the clamp member 1110. For example, the damper 1135 can rotate along an axis of the shaft 1111.

In some embodiments, such as that illustrated in FIG. 20, the retention system 560 can include a fold-out tray member 565 which can be rotatably attached to a base member 570. The tray member 565 can include various ridges 575 to allow for variable positioning, such as tilt, of the object retained thereon. In some embodiments, the retention system 560 can include a slot or pocket 580 to retain an upper portion of the object. In some embodiments, such as that illustrated in FIG. 21, the retention system 590 can include a slot 595 formed in the base member 596.

Connection Frame

With reference to FIGS. 1, 2, 25 and 26, in some embodiments a baggage bar 122 of the connection frame 120 can be attached to a tube 121 via a mount 123. The design of the mount 123 can advantageously allow and upper portion of baggage bar 122 to be placed anywhere along the length of the tube 121. This can be beneficial as it can allow the same mount 123 to be used on any type of seat assembly.

Figure 27A:
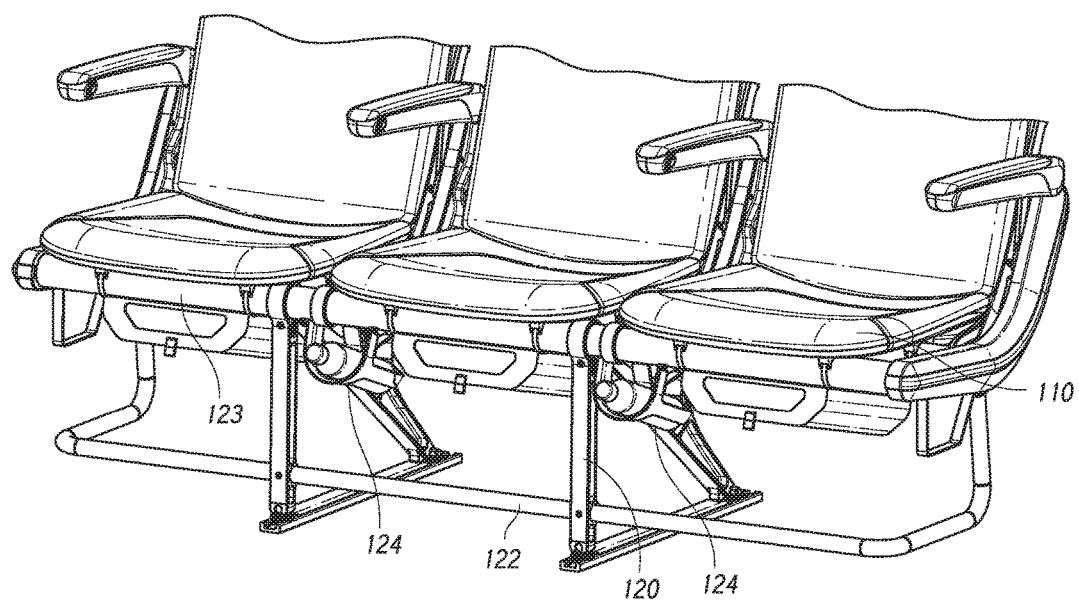
FIG. 27A is a front perspective view of an embodiment of an aircraft seating assembly having a storage compartment.
Figure 27B:
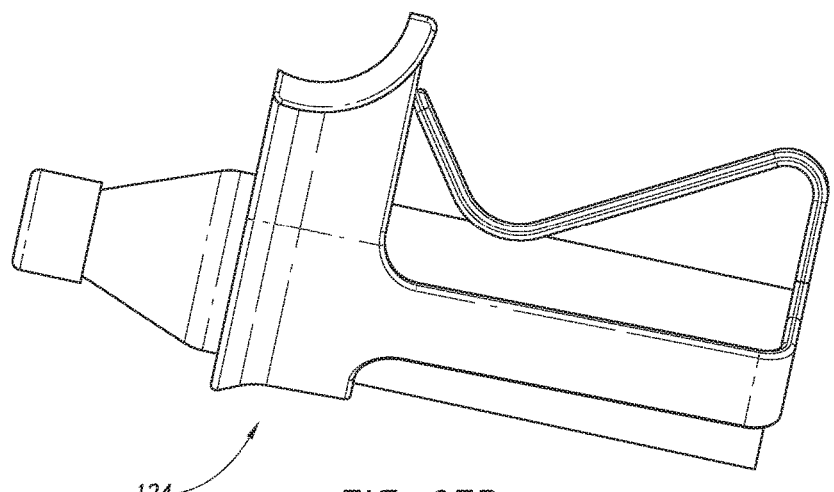
FIG. 27B is a side view of the storage compartment of FIG. 27A.
Figure 28:
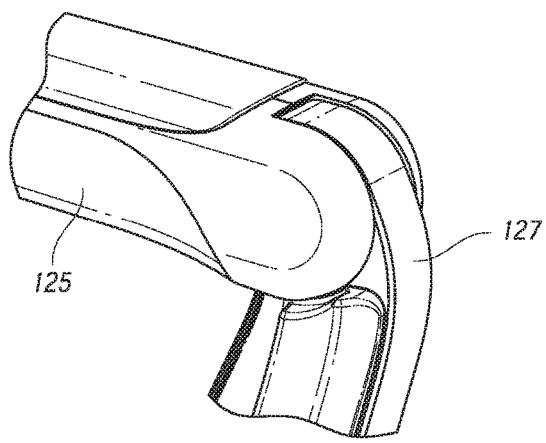
FIG. 28 is a rear perspective view of an embodiment of an armrest in a first configuration.
Figure 29:
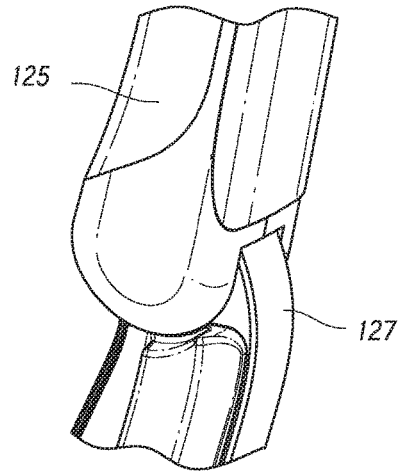
FIG. 29 is a rear perspective view of the armrest of FIG. 28 in a second configuration.
Figure 30:
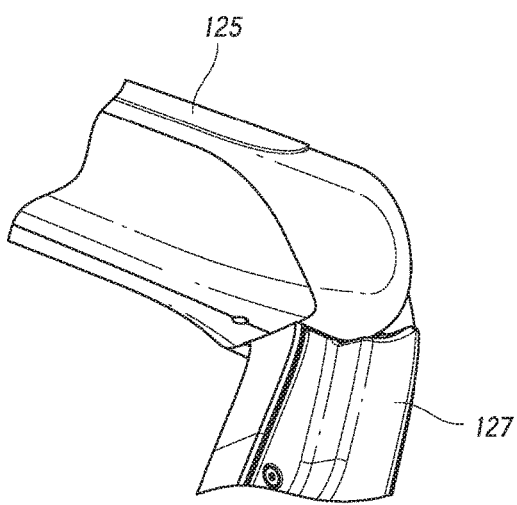
FIG. 30 is a front perspective view of the armrest of FIG. 28.
Figure 31:
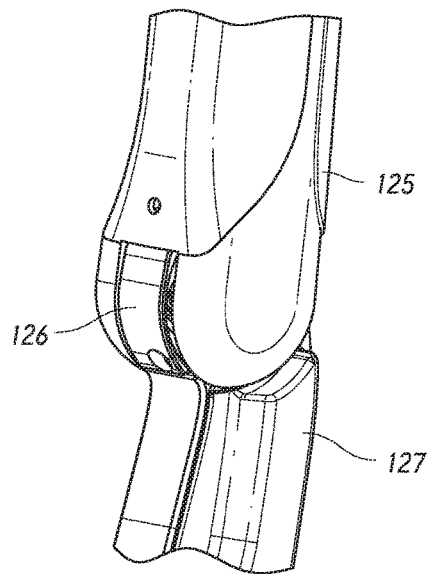
FIG. 31 is a front perspective view of the armrest of FIG. 29.
Figure 32:
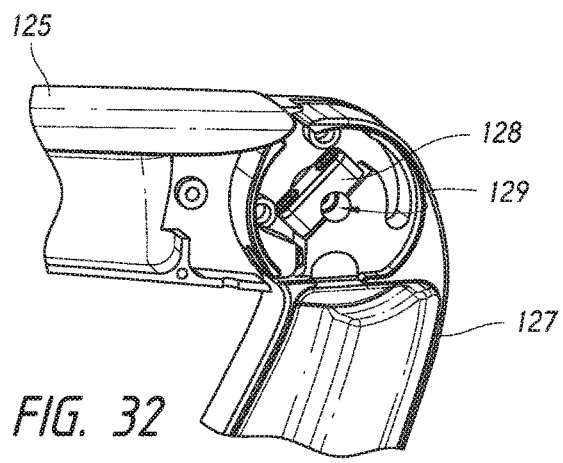
FIG. 32 is a partial, cross-sectional view of the armrest of FIG. 28.

With reference to FIGS. 27A and 27B, in some embodiments a storage compartment 124 can be positioned under the seat pan 110. As shown in the illustrated embodiment, the storage compartment 124 can be attached to a tube 121 of the connection frame 120. The location of the storage compartment 124 can improve living space because it is located underneath the seat pan 110 while still being located above a typical location for luggage stored under a seat. The tilt of the storage compartment 124 can allow the passenger to more easily store and retrieve an object therein. In some embodiments, the storage compartment 124 can be sized and shaped to store water bottles of various sizes during flight.

Armrest

With reference to FIGS. 28-32, in some embodiments the armrest 125 can be designed to reduce the likelihood of finger pinching. As shown in the illustrated embodiment, concentric shapes of the armrest 125, finger guard 126, and spreader 127 can reduce or eliminate the areas of potential finger pinch as armrest travels through its range of motion With reference to FIG. 32, in some embodiments the armrest 125 can be rotatably coupled to a spreader 127. As shown in the illustrated embodiment, the armrest can include a clamp member 128 which can be tightened against the spreader 127. In some embodiments, the clamp member 128 can be tightened via two fasteners, such as screws or bolts, on opposite sides of an aperture 129 for receiving a rotatable coupling, such as an armrest pivot shaft, between the armrest 125 and the spreader 127. Use of fasteners on opposite sides of the aperture 129 can provide a more consistent distribution of clamping force against the rotatable coupling and can reduce looseness in the armrest. Moreover, the illustrated spreader 127 and clamp member 128 design can beneficially allow for quick adjustment of friction force to resist up and down rotation of armrest to stow and deploy and/or removal of the armrest 125 from the spreader 127. For example, the fasteners can be tightened to increase friction force and can be loosened to reduce friction force. In some embodiments, a friction bearing insert can be positioned between the clamp member 128 and the spreader 127 to provide a more consistent friction force.

Figure 33:
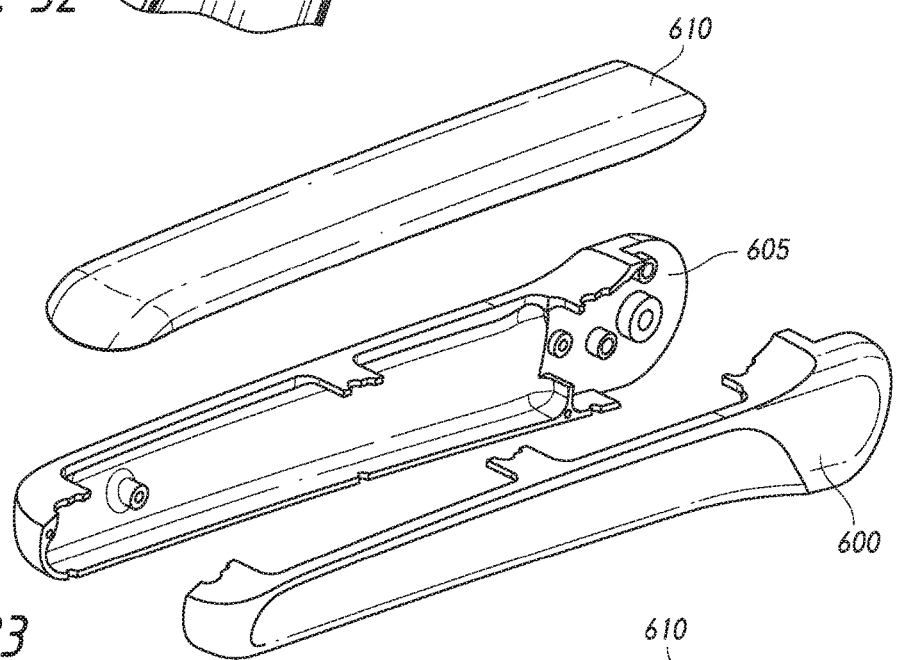
FIG. 33 is a perspective view of an embodiment of an armrest having multiple components.
Figure 34:
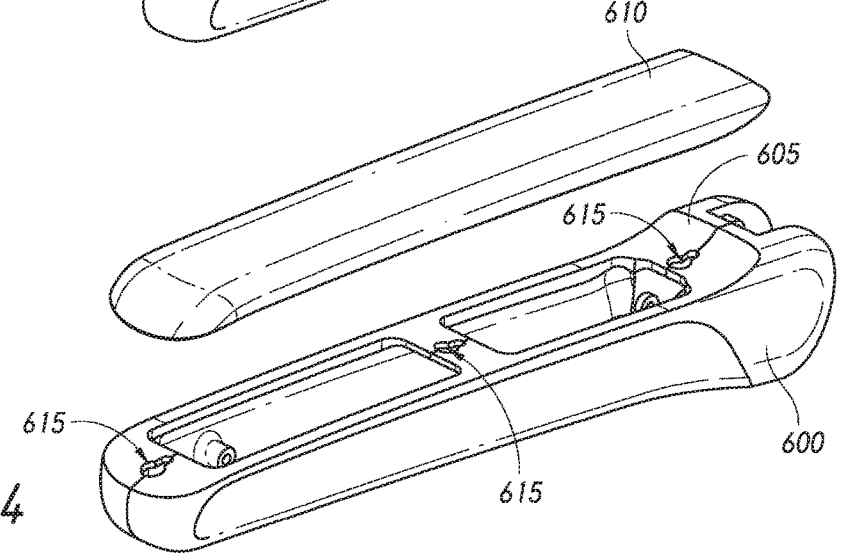
FIG. 34 is a perspective view of the armrest of FIG. 33 in a partially assembled state.
Figure 35:
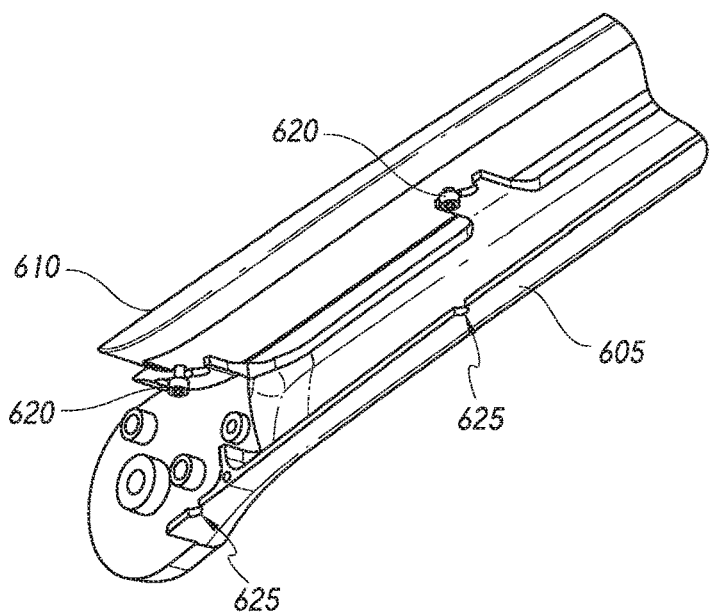
FIG. 35 is a bottom perspective view of components of the armrest of FIG. 33 in an assembled state.

With reference to FIGS. 33-35, in some embodiments the armrest 125 can be formed from multiple portions. For example, as shown in the illustrated embodiment, the armrest 125 can be formed from a first base portion 600, a second base portion 605, and a cap portion 610. The first base portion 600 and the second base portion 605 can be mated to form a base of the armrest 125. As shown in the illustrated embodiment, the first base portion 600 and the second base portion 605 are mated at a symmetric centerline of the base; however, these portions can be mated at other locations. The first base portion 600 and the second base portion 605 can be fastened together using mechanical fasteners, such as screws, bolts, turnbuckles, and the like, and/or chemical fasteners, such as an adhesive. The first base portion 600 and the second base portion 605 can include keyed features, such as pins, to ensure that the mating surfaces are properly aligned prior to fastening.

As shown in the illustrated embodiment, the first base portion 600 and the second base portion 605 can form keyways 615 to facilitate connection of the cap portion 610 to the armrest assembly. Mounting screws 620 can be partially threaded into the cap portion 610 prior to alignment. The mounting screws 620 can be sized such that the head can pass through the large opening of the keyway 615 and the cap portion 610 can be translated along the keyway 615 into proper alignment with the base of armrest 125. The base of the armrest 125 can include holes 625 along a bottom portion to allow mounting hardware, such as a screwdriver, to pass therethrough for tightening the mounting screws 620 after the cap portion 615 is aligned with respect to the base of the armrest 125. This arrangement can beneficially facilitate installation and removal of the cap portion 610 from the armrest 125.

Figure 36:
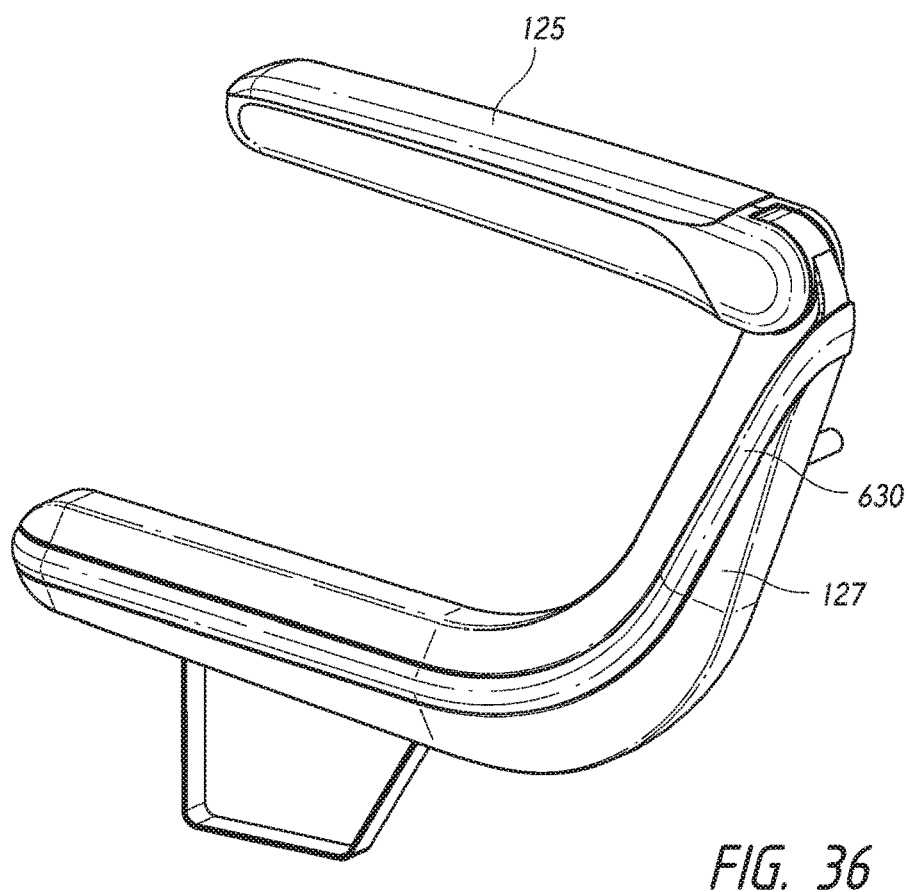
FIG. 36 is a perspective view of an embodiment of a spreader with a photo luminescent material.
Figure 37:
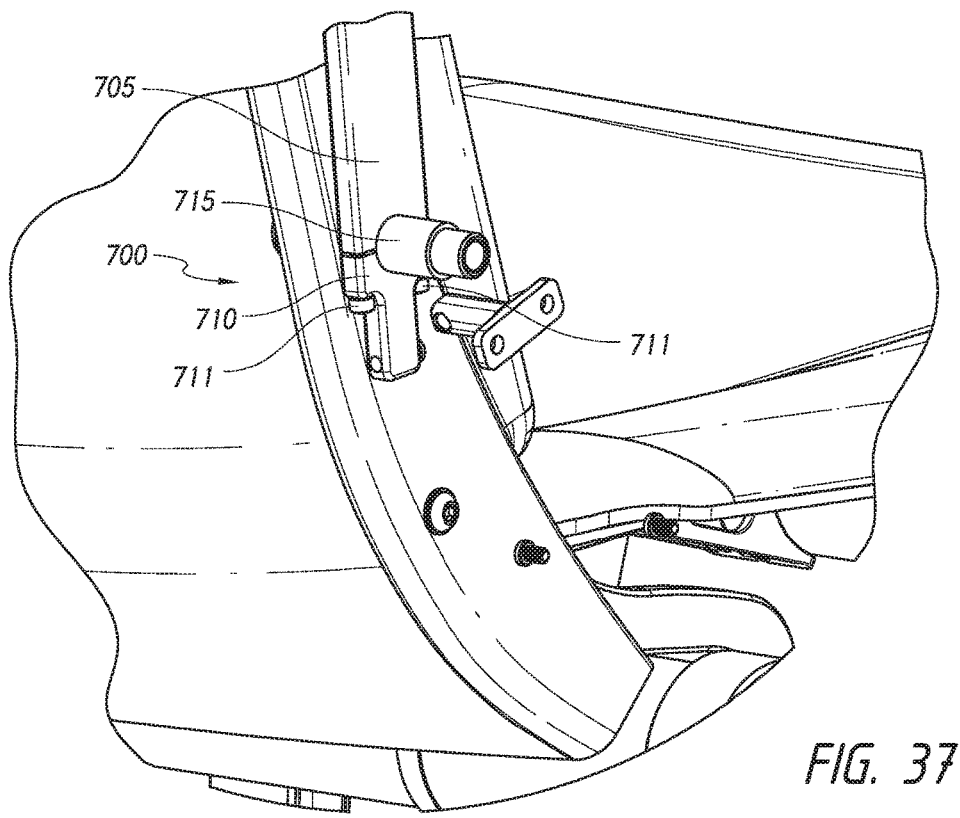
FIG. 37 is a perspective view of an embodiment of an arm for a tray table.

With reference to FIG. 36, in some embodiments the spreader 127 can include a photo luminescent material 630. This photo luminescent material 630 can be used as a proximity light when light within the cabin is reduced. For example, the photo luminescent material 630 can provide passengers with an indicator as to positioning of the various rows of aircraft seating assemblies. In some embodiments, the photo luminescent material 630 can have various colors or shapes to provide passengers with additional information. For example, the photo luminescent material 630 can provide passengers with information for offboarding the plane during an emergency operation. This can beneficially eliminate having to include a proximity light to the assembly and can advantageously decrease weight, decrease assembly time, and improve reliability Tray Table With reference to FIGS. 12 and 37, in some embodiments the aircraft seat 105a can include a tray table 130. The tray table 130 can be coupled to the aircraft seat 105a via a cross bar 750 attached to arms 700. As shown in the illustrated embodiment, the arms 700 can include an elongate member 705 and a clamp member 710 which can be tightened against the elongate member 705. In some embodiments, the clamp member 710 can be tightened via two fasteners 711, such as screws, bolts or the like, on opposite sides of an aperture for receiving a rotatable coupling, such as a pivot shaft 715, of the arm 700. Use of fasteners 711 on opposite sides of the pivot shaft 715 can provide a more consistent distribution of clamping force against the rotatable coupling and can reduce looseness in the arm 700 thereby reducing looseness in the tray table 130. Moreover, the illustrated design can beneficially allow for quick adjustment of the friction force to rotate the tray table 130 from a stowed position to a use position where the tray table 130 can be used as a table by the passenger and vice versa. For example, the fasteners can be tightened to increase friction force and can be loosened to reduce friction force. Additionally, the illustrated embodiment can facilitate installation and removal of the arms 700. In some embodiments, a friction bearing insert can be positioned between the clamp member 710 and the elongate member 705 to provide a more consistent friction force. One or both arms 700 can include a stop member 720 to limit rotation of the arm 700 and thereby limit rotation of the tray table 130. For example, the stop member 720 can limit rotation of the tray table 130 such that it can only rotate to a position generally parallel to the floor of the aircraft.

Figure 38:
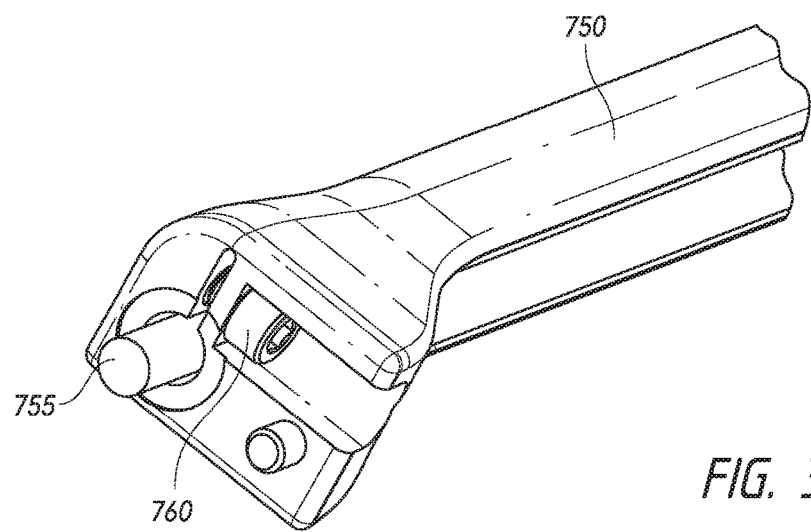
FIG. 38 is a perspective view of an embodiment of a cross bar for a tray table.

With reference to FIG. 38, in some embodiments the cross bar 750 can be rotatably coupled to the arms 700 via a shaft 755. In some embodiments, the shaft 755 can be coupled relative to the cross bar 750 such that the shaft 755 applies a frictional force to the cross bar 750 as the cross bar 750 is rotated relative to the shaft 755. This can beneficially help control deployment of the tray table 130 from a stowed position to a use position and vice versa. To adjust friction force during deployment of the tray 130, the cross bar 750 can include a fastener 760, such as a screw, bolt or the like, to increase or decrease friction on the shaft 755. The illustrated clamp design on the cross bar 750 can advantageously provide consistent clamping force on shaft 755. Moreover, the clamp design provides quick adjustment of friction force and adjustment for play/looseness in tray 130 and associated components. For example, the fastener 760 can be tightened to increase friction force and can be loosened to reduce friction force. In some embodiments, a friction bearing insert can be positioned between the cross bar 750 and the shaft 755 to provide a more consistent friction force.

Figure 39:
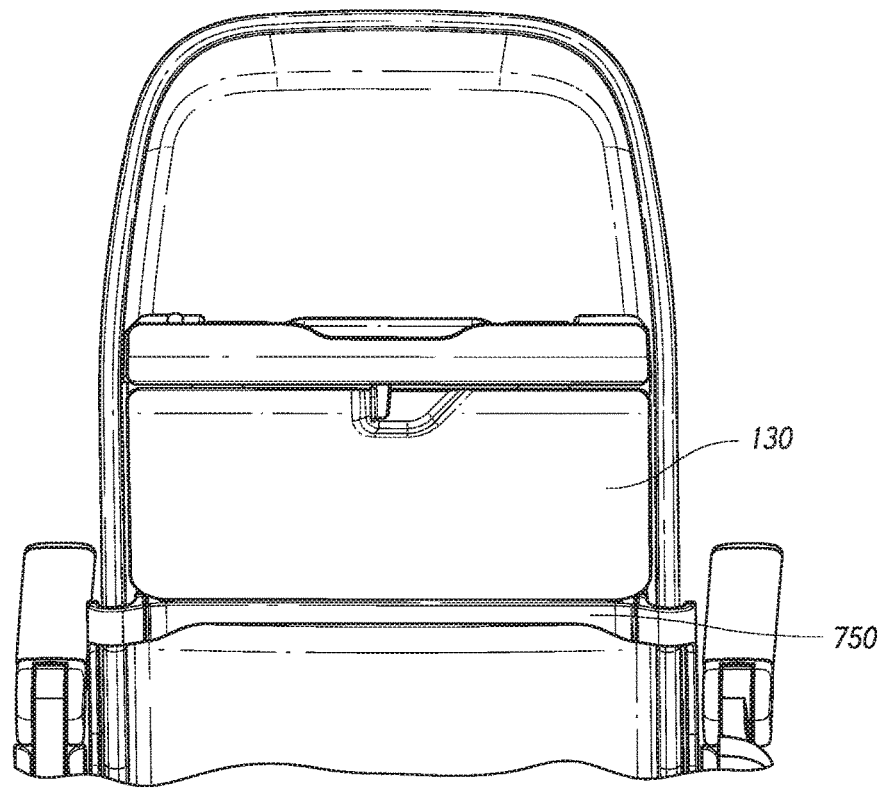
FIG. 39 is a rear view of an embodiment of an aircraft seat with a arms of FIG. 37 and cross bar of FIG. 38.
Figure 40:
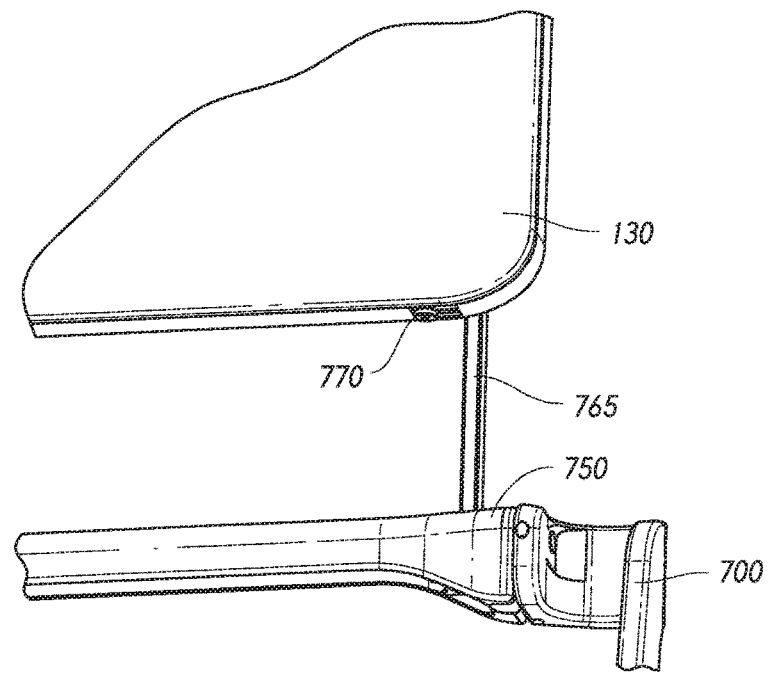
FIG. 40 is a perspective view of an embodiment of a cross bar for a tray table having an elongate member.

With reference to FIGS. 39 and 40, in some embodiments the cross bar 750 can include an elongate member 765 which can extend into a cavity of the tray table 130. In some embodiments, the tray table 130 can slidably translate along the elongate member 765 and can be retained in a specific position, relative to the elongate member 765, by tightening a fastener 770, such as a screw, bolt or the like, which can clamp the tray table 130 to the elongate member 765. This can beneficially allow the vertical spacing of the tray table 130 relative to the cross bar 750 to be adjusted to ensure that the tray 130 is properly positioned with respect to the seat 105a. This can help to ensure that the tray 130 can be properly retained in the stowed position by a latch assembly.

Figure 41:
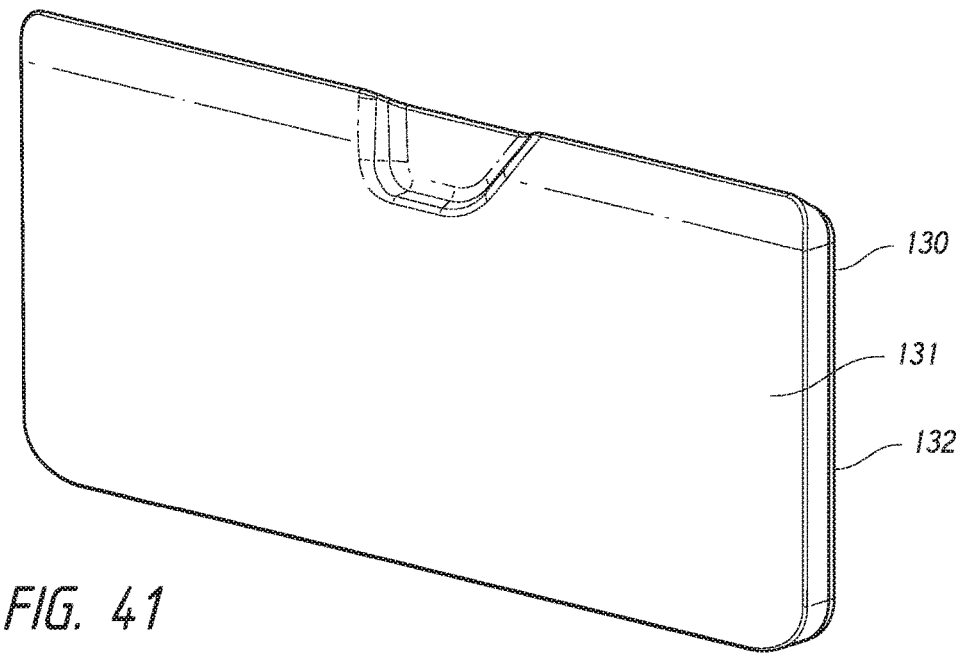
FIG. 41 is a perspective view of an embodiment of a tray table.
Figure 42:
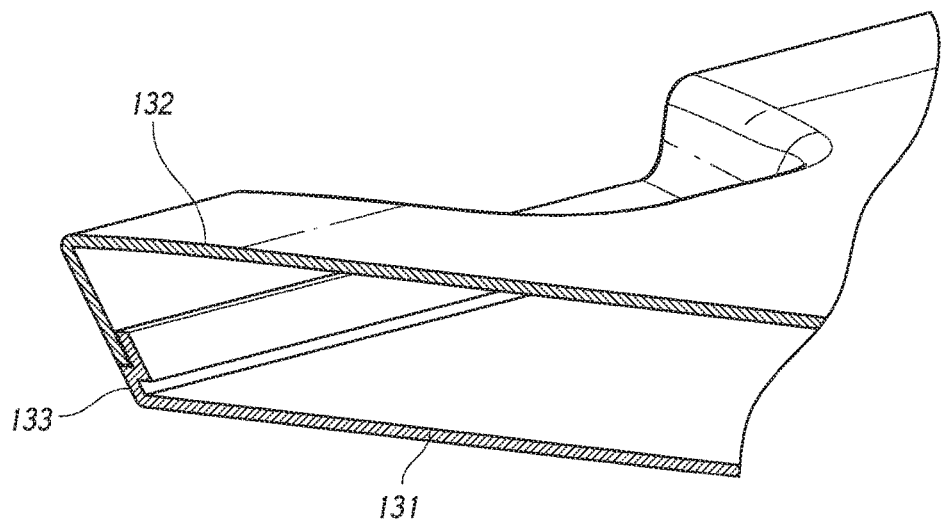
FIG. 42 is a cross-sectional view of the tray table of FIG. 41.

With reference to FIGS. 41 and 42, in some embodiments the tray table 130 can be formed from a first portion 131 coupled to a second portion 132. The first portion 131 and the second portion 132 can form a clamshell design and have an interlocking feature 133 to retain the tray table 130 in an assembled state. This two piece clamshell design can advantageously allow the two portions 131, 132 to mate with one another around the exterior surfaces of the shells which can include straight surfaces, curved surfaces, drafted surfaces, and undercuts. Moreover, this design can advantageously allow various components to be positioned within the tray table 130.

Figure 66:
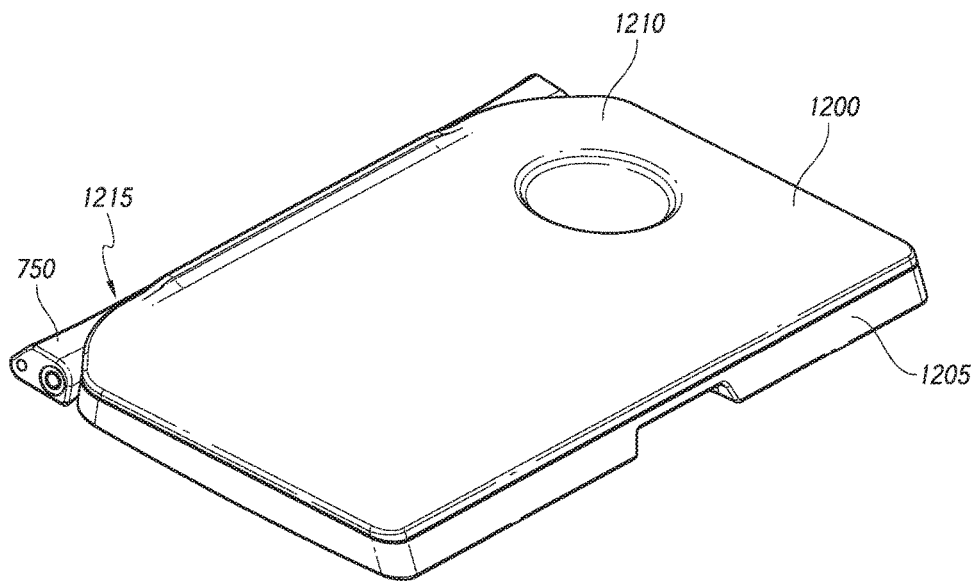
FIG. 66 is a top perspective view of another embodiment of a tray table.

With reference to FIG. 66, in some embodiments a tray table 1200 can include a first portion 1205, such as a bottom portion, and a second portion 1210, such as a top portion. The tray table 1200 can be coupled to a cross bar, such as cross bar 750. The second portion 1210 can extend over the cross bar 750 along a front portion 1215 of the second portion 1210. This can beneficially enhance the usable surface area of the tray table 1200. In the stowed position, the second portion 1210 can be positioned adjacent a seat back. In the stowed position, the front portion 1215 can be positioned between the seat back and at least a portion of the cross bar 750.

Figure 43:
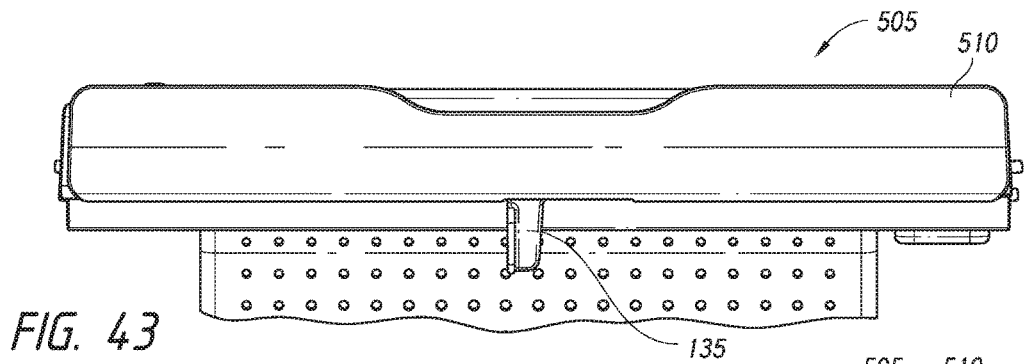
FIG. 43 is a rear view of an embodiment of a latch in a latched position.
Figure 44:
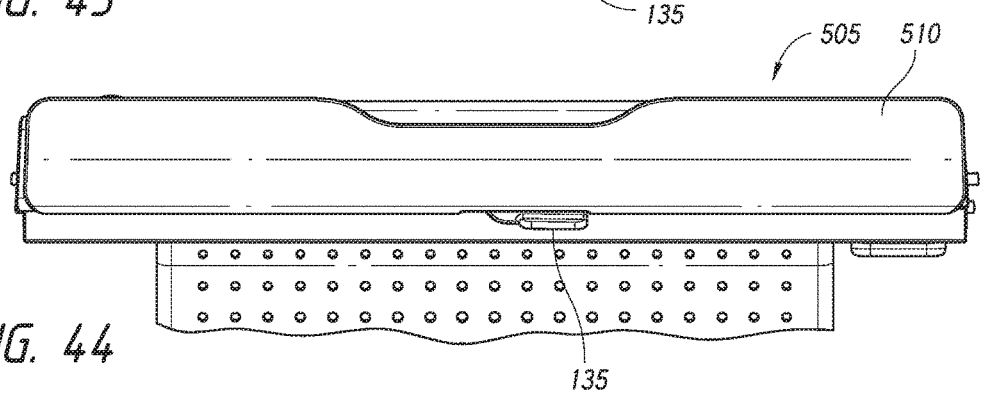
FIG. 44 is a rear view of the latch of FIG. 43 in an open position.
Figure 45:
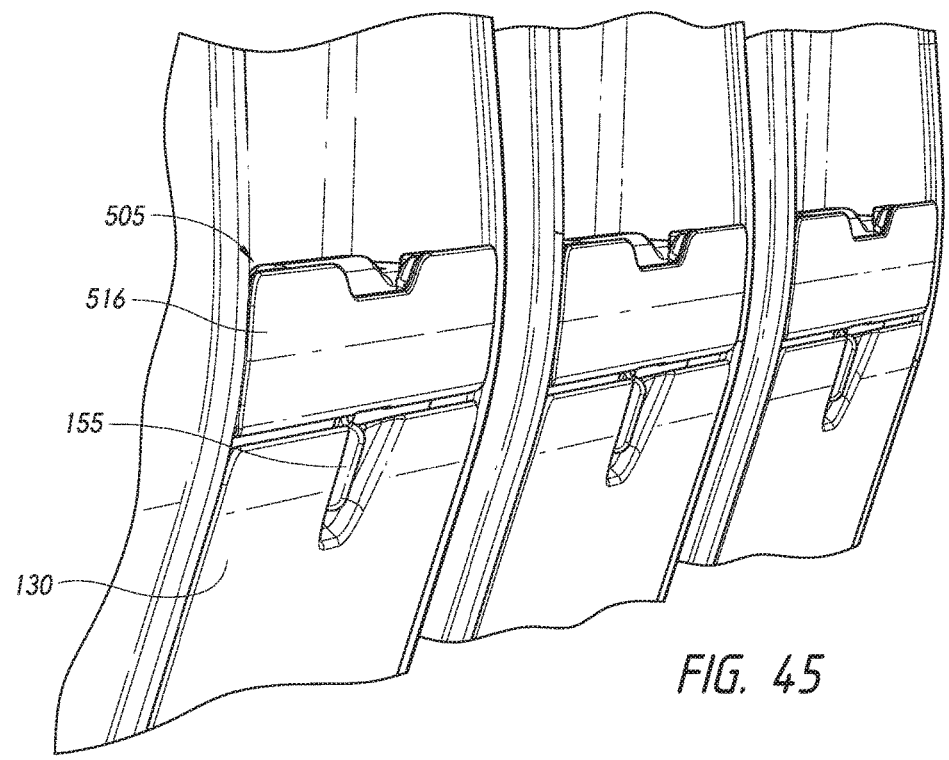
FIG. 45 is a perspective view of the latch of FIG. 43 in a latched position.

With reference to FIGS. 43-45, in some embodiments the tray tables 130, 1200 can be retained in a stowed position via a latch 135. The latch 135 can be rotatably coupled to the retention system 505, such as the base member 515. Accordingly, when in an unlatched position as shown in FIG. 44, the latch 135 can be positioned between the base member 515 and the clamp member 510. This can beneficially protect a passenger's head from strike against the latch 135 during abrupt movements of the aircraft. As shown in the illustrated embodiment, the latch 135 can be rotated from a latched position to an unlatched position via approximately a one-quarter turn rotation.

Cable Routing

Figure 46:
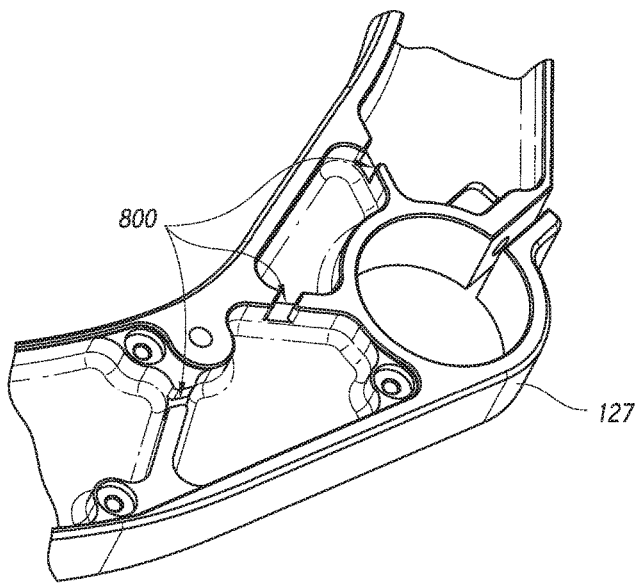
FIG. 46 is a perspective view of an embodiment of a cable management system in support structures of an aircraft seat.
Figure 47:
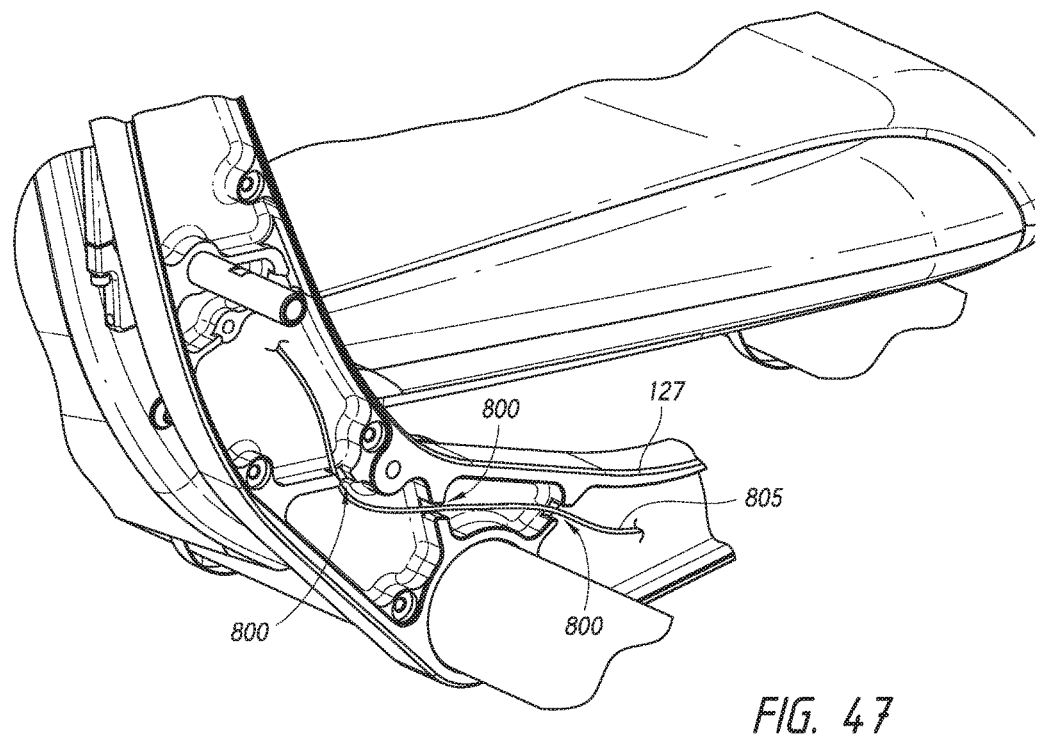
FIG. 47 is a perspective view of an embodiment of a cable management system in support structures of an aircraft seat.

With reference to FIGS. 46-50, in some embodiments the structures of the aircraft seating assembly 100 can include cable management systems to beneficially improve packaging and increase the living space for passengers. For example, as shown in FIGS. 46-47, back support 115 can include recesses 800 configured to allow cables 805 and other components to pass therethrough. As another example, as shown in FIG. 48, cables 805 and other components can pass through a cavity 810 of the back support frame 300. As yet another example, as shown in FIGS. 49 and 50, the retention system 505 can include a channel 597 to allow a wire to pass through towards the PED 400c.

Flush Design

With reference to FIGS. 51 and 52, in some embodiments aircraft seating assembly 100 be designed such that components, such as the tray table 130, the retention system 505, and/or the lower net pocket 140, are positioned to be flush with, or at least substantially flush with, a rearmost portion of the back support 115. In some embodiments, the aircraft seating assembly 100 can be designed such that the components, such as the tray table 130, the retention system 505, and/or the lower net pocket 140, are sub-flush with, or at least substantially sub-flush with, a rearmost portion of the back support 115. This can advantageously provide increased passenger living space.

In some embodiments, the arms 700 of the tray table 130 are positioned laterally outward of the back support 115. This can beneficially increases reliability, stability, and ease of removal/servicing/adjustment by having tray arms not nested in back structure.

Other Embodiments

Any value of a threshold, limit, duration, etc. provided herein is not intended to be absolute and, thereby, can be approximate. In addition, any threshold, limit, duration, etc. provided herein can be fixed or varied either automatically or by a user. Furthermore, as is used herein relative terminology such as exceeds, greater than, less than, etc. in relation to a reference value is intended to also encompass being equal to the reference value. For example, exceeding a reference value that is positive can encompass being equal to or greater than the reference value. In addition, as is used herein relative terminology such as exceeds, greater than, less than, etc. in relation to a reference value is intended to also encompass an inverse of the disclosed relationship, such as below, less than, greater than, etc. in relations to the reference value.

While certain embodiments have been described, these embodiments have been presented by way of example only, and are not intended to limit the scope of the disclosure. Indeed, the novel devices, system and methods described herein may be embodied in a variety of other forms. Furthermore, various omissions, substitutions and changes in the systems and methods described herein may be made. The accompanying claims and their equivalents are intended to cover such forms or modifications as would fall within the scope of the disclosure. Accordingly, the scope of the present disclosure is defined only by reference to the claims presented herein or as presented in the future.

Features, materials, characteristics, or groups described in conjunction with a particular aspect, embodiment, or example are to be understood to be applicable to any other aspect, embodiment or example described in this section or elsewhere in this specification unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The protection is not restricted to the details of any foregoing embodiments. The protection extends to any novel one, or any novel combination, of the features disclosed in this specification (including any accompanying claims, abstract and drawings), or to any novel one, or any novel combination, of the steps of any method or process so disclosed.

Furthermore, certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as a subcombination or variation of a subcombination.

For purposes of this disclosure, certain aspects, advantages, and novel features are described herein. Not necessarily all such advantages may be achieved in accordance with any particular embodiment. Thus, for example, those skilled in the art will recognize that the disclosure may be embodied or carried out in a manner that achieves one advantage or a group of advantages as taught herein without necessarily achieving other advantages as may be taught or suggested herein.

Conditional language, such as "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

The scope of the present disclosure is not intended to be limited by the specific disclosures of preferred embodiments in this section or elsewhere in this specification, and may be defined by claims as presented in this section or elsewhere in this specification or as presented in the future. The language of the claims is to be interpreted broadly based on the language employed in the claims and not limited to the examples described in the present specification or during the prosecution of the application, which examples are to be construed as non-exclusive.

What is claimed is:

1. An aircraft seating assembly for installation in an aircraft, the assembly comprising:
   a back support; and
   a retention system coupled to the back support, the retention system configured to retain an object in place by clamping a lower portion of the object, the retention system comprising:
   a base member; and
   a clamp member rotatably coupled to the base member at a lower portion of the base member;
   wherein the retention system is configured to clamp a front surface of the lower portion of the object and a back surface of the lower portion of the object between the base member and the clamp member to retain the object in place.

2. The aircraft seating assembly of claim 1, wherein the retention system is coupled to the back support along an upper portion of the back support.

3. The aircraft seating assembly of claim 1, wherein the clamp member comprises a protrusion extending from an inner surface of the clamp member, the protrusion configured to form a surface upon which a bottom portion of the object can be placed.

4. The aircraft seating assembly of claim 1, wherein the clamp member comprises at least one ridge extending from an inner surface of the clamp member.

5. The aircraft seating assembly of claim 4, wherein the ridge comprises a first portion and a second portion, wherein a thickness of the first portion is different from a thickness of the second portion.

6. The aircraft seating assembly of claim 1, wherein the retention system further comprises a channel configured to allow a wire to pass therethrough.

7. The aircraft seating assembly of claim 1, wherein the retention system is configured to engage the object only at the lower portion of the object.

8. The aircraft seating assembly of claim 1, wherein the retention system further comprises a biasing component configured to bias the clamp member toward a closed configuration.

9. The aircraft seating assembly of claim 1, wherein the back support comprises a recessed area and the clamp member is configured to retain the object in the recessed area when the front and back surfaces of the lower portion of the object are clamped between the base member and the clamp member.

10. The aircraft seating assembly of claim 9, wherein the clamp member is positioned within the recessed area.

11. The aircraft seating assembly of claim 1, further comprising one or more ports configured to provide at least one of a power connection and a data connection.

12. The aircraft seating assembly of claim 11, wherein the one or more ports are positioned on the clamp member.

13. An aircraft seating assembly for installation in an aircraft, the assembly comprising:
   a back support; and
   a retention system coupled to the back support, the retention system configured to retain an object in place when in a closed configuration, the retention system comprising:
   a base member; and
   a clamp member coupled to the base member;

wherein the retention system is configured to engage a lower portion of the object between the base member and the clamp member;

wherein the clamp member comprises at least one ridge extending from an inner surface of the clamp member; and wherein the ridge comprises a first portion and a second portion, wherein a thickness of the first portion is different from a thickness of the second portion.

14. The aircraft seating assembly of claim 13, wherein the clamp member comprises a protrusion extending from an inner surface of the clamp member, the protrusion configured to form a surface upon which a bottom portion of the object can be placed.

15. The aircraft seating assembly of claim 13, wherein the clamp member is configured to engage at least a front surface of the object.

16. The aircraft seating assembly of claim 15, wherein the base member is configured to engage at least a rear surface of the object.

17. The aircraft seating assembly of claim 13, wherein the retention system further comprises a biasing component configured to bias the clamp member into the closed configuration.

18. The aircraft seating assembly of claim 13, wherein back support comprises a recessed area and the clamp member is configured to retain the object in the recessed area when in a closed configuration.

19. The aircraft seating assembly of claim 18, wherein the clamp member is positioned within the recessed area.

* * * * *